United States Patent
Park

(10) Patent No.: US 11,187,557 B2
(45) Date of Patent: Nov. 30, 2021

(54) MULTI-PHASE DIFFERENTIAL SYNTHESIS RESOLVER APPARATUS

(71) Applicant: Chun Soo Park, Seoul (KR)

(72) Inventor: Chun Soo Park, Seoul (KR)

( * ) Notice: Subject to any disclaimer, the term of this patent is extended or adjusted under 35 U.S.C. 154(b) by 0 days.

(21) Appl. No.: 17/246,933

(22) Filed: May 3, 2021

(65) Prior Publication Data

US 2021/0310832 A1 Oct. 7, 2021

Related U.S. Application Data

(62) Division of application No. 17/170,038, filed on Feb. 8, 2021.

(30) Foreign Application Priority Data

Apr. 3, 2020 (KR) .......................... 10-2020-0040974

(51) Int. Cl.
| | |
|---|---|
| *H02K 1/14* | (2006.01) |
| *H02K 11/21* | (2016.01) |
| *G01D 5/20* | (2006.01) |

(52) U.S. Cl.
CPC ............. *G01D 5/2093* (2013.01); *H02K 1/14* (2013.01); *H02K 11/21* (2016.01)

(58) Field of Classification Search
CPC ................................. H02K 1/14; H02K 11/21
USPC ............. 310/49.13, 49.33, 68 B; 324/207.17
See application file for complete search history.

(56) References Cited

U.S. PATENT DOCUMENTS

| | | |
|---|---|---|
| 6,137,204 A | 10/2000 | Kuwahara |
| 7,030,532 B2 | 4/2006 | Kobayashi et al. |
| 8,928,310 B2 | 1/2015 | Ocket et al. |

(Continued)

FOREIGN PATENT DOCUMENTS

| | | |
|---|---|---|
| JP | 59-079808 A | 5/1984 |
| JP | 2008-082996 A | 4/2008 |
| JP | 2008-241405 A | 10/2008 |

(Continued)

OTHER PUBLICATIONS

Chang-Sung Jin et al., "Proposal of Improved Winding Method for VR Resolver", IEEE Transactions on Magnetics, vol. 51, No. 3, Mar. 2015.

(Continued)

*Primary Examiner* — Jose A Gonzalez Quinones
(74) *Attorney, Agent, or Firm* — LRK Patent Law Firm

(57) ABSTRACT

A novel multi-phase resolver topology and apparatus is provided for measuring a displacement of movement body more precisely and economically. In variable reluctance (VR) resolvers, N coil-poles are placed at N equally spaced positions over one turn of the stator, N being an odd number greater than or equal to 5. Each coil serves both as an excitation and a sensing coil, and all N coils are wound with the same number of turns at an identical electrical polarity. Depending on the installed rotor lobe shape, N sinusoidal or quasi-square waveform displacement signals are sensed on multi-phase resolver, and from which two-phase orthogonal displacement signals are optimally and differentially synthesized. The multi-phase resolver topology and differential synthesis method is also applied to other types of resolvers, such as wound-rotor, inductance, capacitive, and magnetic resolvers.

7 Claims, 41 Drawing Sheets

(56) References Cited

U.S. PATENT DOCUMENTS

| | | | |
|---|---|---|---|
| 10,084,472 B1 | 9/2018 | Kushihara et al. | |
| 2014/0225596 A1* | 8/2014 | Nakamura | G01D 5/145 |
| | | | 324/207.2 |

FOREIGN PATENT DOCUMENTS

| | | | | |
|---|---|---|---|---|
| JP | 2010139405 A | * | 6/2010 | |
| JP | 2013-062973 A | | 4/2013 | |
| JP | 2014178310 A | * | 9/2014 | |
| JP | 2015-012667 A | | 1/2015 | |
| JP | 2018-121404 A | | 8/2018 | |
| KR | 10-0895765 B1 | | 4/2009 | |
| KR | 20170125723 A | * | 11/2017 | |
| KR | 10-1937266 B1 | | 1/2019 | |
| KR | 10-2067938 B1 | | 1/2020 | |
| KR | 10-2144254 B1 | | 8/2020 | |
| WO | 2014-091032 A2 | | 6/2014 | |
| WO | 2020/149489 A1 | | 7/2020 | |

OTHER PUBLICATIONS

Chengjun Liu et al., "Analysis of Novel Variable Reluctance Resolver with Asymmetric Teeth on the Stator", Hindawi Publishing Corporation Mathematical Problems in Engineering vol. 2013, Article ID 958747, 9 pages.

X. Ge et al., "A Novel Variable Reluctance Resolver for HEV/EV Applications", IEEE Transactions on Industry Applications, vol. 52, No. 4, Jul./Aug. 2016.

"Synchro and Resolver Engineering Handbook", 2004 Moog Components Group Inc. MSG90020 Dec. 2004

KIPO Office Action, dated May 29, 2020, for Korean Patent Application No. 10-2020-0040974, which corresponds to the above-identified U.S. application.

Search Report and Written Opinion, dated Jun. 30, 2021, for International Application No. PCT/KR2021/003389.

* cited by examiner

Vout = (a1 * V1) + (a2 * V2) + (-a3 * V3) + (-a4 * V4) + (a5 * V5)

MULTI-PHASE DIFFERENTIAL SYNTHESIS RESOLVER APPARATUS

CROSS-REFERENCE TO RELAYED APPLICATIONS

The present application is a division of U.S. patent application Ser. No. 17/170,038, filed Feb. 8, 2021, which claims priority to Korean Patent Application No. 10-2020-0040974, filed Apr. 3, 2020, the disclosure of which is incorporated by reference herein in their entirety.

BACKGROUND OF THE INVENTION

1. Field of the Invention

The claimed subject matter relates to a resolver apparatus, and more particularly, to a novel multi-phase resolver topology, and the differential synthesis method, to obtain the precise orthogonal or three-phase displacement signals of circularly or linearly moving objects.

2. Description of Related Art

Typical resolvers are electromechanical sensors that measure the displacement of moving objects using the principle of electrical transformer. However, there are many types of resolvers. One commonly used resolver is a wound-rotor (WR) resolver that comprises of a stator and a rotor, where one primary excitation winding is sinusoidally distributed on the rotor and two secondary sensing windings are on the stator. The secondary windings are arranged at 90° phase offset each other so that the two-phase orthogonal displacement signals, $\sin(\theta)$ and $\cos(\theta)$, are generated from the secondary windings, as the magnetic flux from the rotor varies sinusoidally. The displacement position ($\theta$) of the rotor is calculated by taking the arctangent of the two-phase orthogonal displacement signals. Another widely used resolver is a variable reluctance (VR) resolver in which the primary and secondary windings are on the stator as shown in FIG. 1. The reluctance between the stator and rotor lobe varies according to the saliencies of the rotor lobe as the rotor rotates, even without a brush to drive the excitation winding. As the rotor displacement varies, the carrier V $\sin(\omega t)$ excited on primary coil ($L_P$) induces a magnetic flux in the stator, and the induced current flows at sine coil ($L_S$) and cosine coil ($L_C$), sensing two-phase orthogonal voltage signals that are amplitude modulated by the excitation carrier signal $\sin(\omega t)$. The synchro has three stator windings installed at 120° offsets, while the resolver has two stator windings with 90° offsets.

When the rotor lobe is stationed at 0°, the induced sine displacement signal on the sine coil ($L_S$) should be zero. When the rotor lobe is stationed at 90°, the induced cosine displacement signal on the cosine coil ($L_C$) should also be zero, which implies that the sine and cosine displacement signals are to be 100% amplitude modulated by the carrier. To detect the displacement signal precisely, maintaining the proper magnetic flux balance in VR resolver is a primary design factor. It requires a sophisticated design and precise manufacturing of the physical locations of $L_P$-$L_S$-$L_C$ as well as their winding turns and directions of each coil winding. When the load resistor ($R_S$) or ($R_C$) is connected to the secondary coils, the load current flows to each coil that also causes a magnetic flux distortion at the stator coils due to an interaction of the consequently induced magnetic flux.

U.S. Pat. No. 10,084,472B1 discloses employing two primary coils and two secondary coils. Most commercially used VR resolvers have either one excitation coil or two excitation coils, and sine and cosine sensing coils, which are all configured as even-numbered multiple coil-poles in order to obtain two-phase orthogonal signals that are 100% amplitude modulated under a state of symmetrically maintaining the magnetic flux balance, as illustrated in FIG. 2.

In FIG. 2, the primary driving (excitation) coils ($L_{P1}$, $L_{P2}$, ..., $L_{PN}$), sine-signal sensing coils ($L_{S1}$, $L_{S2}$, ..., $L_{SN}$) and cosine-signal sensing coils ($L_{C1}$, $L_{C2}$, ..., $L_{CN}$), are wound separately, and coils of each type are serially connected in alternating coil-winding directions, where N is an even number. Therefore, the magnetic flux ($\Phi_{Pn}$, $\Phi_{Sn}$, $\Phi_{Cn}$) directions induced at each pair of coils result in the magnetic flux balance in the stator.

However, the configuration and coil-winding of VR resolvers varies widely depending on the manufacturers. Chang-Sung Jin, et al. ("Proposal of Improved Winding Method for VR Resolver," IEEE Trans. Magnetics, vol. 51, no. 3, March 2015) discloses that a shift winding method is employed in order to mitigate the complicated coil-winding and increase the suitability for mass production of VR resolvers. In U.S. Pat. No. 8,928,310 B2, some excitation ($L_P$) coils and some sensing coils (sine ($L_S$) and cosine ($L_C$)), are partially removed in order to manufacture more efficiently and economically, and improve the accuracy. In U.S. Pat. No. 6,137,204, each even-numbered coil is wound clock or counter-clockwise between two coils to maintain the magnetic flux balance in three-phase wiring, as illustrated in FIG. 5 of U.S. Pat. No. 6,137,204.

As the number of VR resolver winding coil-poles increases to improve the accuracy, in sensing the precise displacement signals while maintaining the balanced magnetic flux in the stator, design consideration parameters grow exponentially and its manufacturability becomes more challenging.

Another main cause of the distortion in the orthogonal signals is imperfect rotor lobe shape. To mitigate this problem, Chengjun Liu et al. ("Analysis of Novel Reluctance Resolver with Asymmetric Teeth on the Stator," Mathematical Problems in Engineering, vol. 2013, Article ID 958747, 9 pages) discloses extra compensating coils can be added to the excitation ($L_P$), sine ($L_S$), and cosine ($L_C$) coils. U.S. Pat. No. 7,030,532 B2 discloses a method of designing the rotor lobe shape to take the high accuracy position information. However, the rotor lobe shape curve is very complex and reducing the tolerance of rotor lobe eccentricity increases its cost.

Moreover, the conventional VR resolver topology makes it difficult to achieve the single (1×) speed resolver due to its physical and structural constraints, and does not allow for flexibly installing a variety of multi-speed rotor lobes in a given fixed configuration of the stator and coil windings. The position sensing accuracy also abruptly gets worse at the position where the angle of sine signal changes from positive (+) to negative (−). Another prominent and common problem in the VR resolver is that the counter-electromotive force also arises at sine ($L_S$) and cosine ($L_C$) coils due to its load current when the rotor lobe rotates at high speed, which results in a diminished voltage of the sensed orthogonal signal and a poor detection of position information.

The resolvers have been the only technology of choice for reliably providing position feedback under very harsh environments. Most efforts that have been made to resolvers so far are improving the position sensing accuracy while reducing the manufacturing difficulties in the context of conventional resolver topology, as illustrated in FIG. 2. The present invention seeks a solution in the context of a novel multi-phase resolver topology and a signal processing technique of its multi-phase signals.

In International Application Publication No. WO 2020/149489 by the present inventor, it is disclosed that N sequentially phase-delayed displacement signals over one electrical period can be represented by a system of linear equations with two unknown variables, namely the two-phase orthogonal signals of sine and cosine. Therefore, the two-phase orthogonal signals can be mathematically calculated by solving the system of linear equations that involves a matrix inversion. Applying the inverse matrix to N phase-delayed displacement signals to recover their two-phase orthogonal signal is analogous to applying zero-forcing (ZF) linear equalization (or simply "Zero-Force (ZF) Transformation"). Thus, the optimal two-phase orthogonal displacement signals that are distortion minimized can be synthesized from the implemented op-amp circuitry having synthesis coefficients calculated and obtained from the ZF transformation. It also discloses a simple idea for the resolver and capacitive encoder application, where the sensed N-phase signals are presupposed to be 100% amplitude modulated by the driving carrier, and the synthesized two-phase orthogonal signals are assumed to be ideally de-modulated.

However, actual resolvers are very sensitive and complex in sensing the displacement from the subtle magnetic flux variation. Thus, more complicated and sophisticated rotor, stator and coil winding techniques are required to attain the 100% amplitude modulated and precise displacement signals in the conventional resolvers. To mitigate these obstacles, the present invention discloses a novel and comprehensive multi-phase resolver design. The multi-phase resolver topology is simple but very effective in generating N sequentially phase-delayed displacement signals that are amplitude modulated (AM) by the carrier of driving (or excitation) signal, in which the attained signals are allowed to be either under-modulated or 100% modulated.

SUMMARY OF THE INVENTION

The present invention has been made in view of the aforementioned background, and discloses a novel multi-phase resolver topology in detail and its signal processing based on the principle of the ZF transformation and differential synthesis method.

In one general aspect, there is provided a multi-phase resolver apparatus for measuring a displacement position of a circular body movement or a linear body movement, the multi-phase resolver apparatus including: a stator including: an N number of coils each wound on a pole, N being an odd integer greater than or equal to 5, the pole being equidistant over a mechanical period or an electrical period of the stator from another pole, and the N number of coils having a same electrical polarity; a plurality of winding turns for each coil, wherein each coil includes a same number of winding turns as the N number of coils; and a carrier signal source adapted to parallelly excite the N number of coils, wherein each coil is further adapted to perform at least one of an excitation function and a sensing function; a rotor including: a lobe defining at least one electrical period on the stator over one period of the rotor; and an airgap between the stator and the lobe adapted to induce a displacement signal on the coil-poles; and a magnetic flux induced by the carrier signal source and forming around each of the N number of coils, wherein the magnetic flux from other coil-poles is equally and symmetrically distributed around each of the poles.

The stator may further include a plurality of phase-delayed displacement signals sensed as the rotor rotates, wherein each one of the displacement signals is sequentially phase-delayed, the displacement signals are amplitude under-modulated by the carrier signal source and obtained from the N number of coils, and the number of the plurality of displacement signal is the same as the N number of coils over one mechanical turn of the rotor.

Each of the N number of coils may be subdivided into a k number of coils, k being an integer greater than or equal to 3, wherein a number of the lobe is identical to the k number of subdivided coils on the stator, the k number of subdivided coils is positioned at the same electrical angle positions with the k rotor lobe periods on the stator, the k number of subdivided coils is serially connected to one another, and the k number of coils generate one of a plurality of phase-delayed displacement signals.

Each of the N number of coils may be subdivided into two sub-excitation-sensing coils on the stator which are positioned symmetrically at a 180° angle apart from one another in a mechanical angle with an opposite electrical polarity, wherein the two sub-excitation-sensing coils are serially connected such that the two sub-excitation-sensing coils generate one of a plurality of phase-delayed displacement signals.

The two sub-excitation-sensing coils may be placed at a dual-stator wherein the dual-stator includes a stator-A and a stator-B on a shared axis, wherein a first of the two sub-excitation-sensing coils is placed on the stator-A whereas a second of the two sub-excitation-sensing coils is placed on the stator-B, wherein the two sub-excitation-sensing coils are placed at a same electrical angle position and with an opposite electrical polarity, wherein the two sub-excitation-sensing-coils are serially connected; and a magnetic flux path A of the stator-A and a magnetic flux path B of the stator-B may be independently formed, and each of the magnetic flux path A and the magnetic flux path B may be balanced such that the displacement signal is free of common mode noise induced by a directional external magnetic flux toward the multi-phase resolver apparatus.

Each of the N number of coils may include a primary coil and a secondary coil, wherein the primary coils are excitation-coils, wherein each one of the primary coils has a same number of winding turns with an identical electrical polarity as the other primary coils, wherein the secondary coils are sensing-coils, wherein each one of the secondary coils has a same number of winding turns with an identical electrical polarity as the other secondary coils, and wherein an electric path of the primary coils and an electric path of the secondary coils are isolated such that a Galvanic isolation is achieved.

The multi-phase resolver apparatus may have a speed of k number, wherein a rotor lobe has a plurality of saliencies, wherein the number of saliencies is k, wherein the k number of saliencies produce k electrical periods through one mechanical turn of the rotor, k being a number selected from 1 to N minus 1 except a non-trivial divisor of N and any-multiple of any non-trivial divisor of N, wherein the rotor lobe expands an electrical angle to k times 360° per one mechanical turn and having a speed of k number of electrical periods per one mechanical turn of the rotor such that the N number of sequentially phase-delayed displacement signals and carrier modulated displacement signals are obtained from the N coil-poles.

The multi-phase resolver apparatus has a speed of k number, wherein k is an integer greater than or equal to 15, wherein a rotor has a plurality of teeth, wherein the number of rotor teeth is k, wherein each coil-pole includes a number of teeth between two teeth and ten teeth, wherein a period of each tooth on the rotor defines one electrical period of 360°, wherein the teeth on each coil-pole are constructed such as its teeth period is delayed successively by an inverse of its Nth number against the rotor teeth through the N coil-poles, and wherein with a speed of k number of electrical periods per one mechanical turn of the rotor such that the N number of sequentially phase-delayed displacement signals and carrier modulated displacement signals are obtained from the N coil-poles.

The rotor lobe may further includes a rotor lobe for a quasi-square waveform signal generation wherein a circumference of the rotor lobe is divided into an arc shape section of a constant airgap and a slope shape section of a linearly varying airgap between the stator and rotor lobe, wherein the arc shape section has two saliencies that are symmetrically located with different radii such as one is larger than the other, while the slope shape section has two saliencies that are symmetrically located with the slope, but with opposite direction, and wherein as the rotor lobe being displaced, the arc shaped section generates one of a higher level signal or a lower level signal upon the two different radii, whereas the slope shaped section generates either a rising edge or falling edge signal of the quasi-square waveform signal.

The stator may be non-contiguously separated into a number of stator-bodies wherein the number of stator-bodies is the same as the N number of coil-poles, wherein the number of stator-bodies being physically separated and evenly placed at a same electrical position before a separation, wherein each of the coil-poles is placed at each of the stator-bodies, and wherein the stator-body is structured such that it can attain an inductance deemed effective between the stator-body and the rotor lobe, wherein when the rotor is displaced, the inductance varies between the stator-bodies and the rotor lobe and N sequentially phase-delayed and amplitude modulated displacement signals are sensed.

In another general aspect, there is provided a multi-phase capacitive resolver apparatus for measuring a displacement of a circular movement body, the multi-phase capacitive resolver apparatus including: a stator including: an N number of metal plates placed at N equally divided positions over one mechanical or an electrical period of the stator, wherein the N number of metal plates establishes an N number of stator electrodes, N being an odd number greater than or equal to 5; a rotor including: a rotatable plate having at least one lobe, wherein the rotatable plate establishes a rotor electrode, wherein the rotor electrode is installed in parallel to the N number of stator electrodes with an airgap, wherein the N number of stator electrodes react as an N number of capacitive elements against the rotor electrode when the rotor rotates, wherein the N number of capacitive elements are excited by a driving carrier signal, wherein capacitive variations are caused between the N number stator electrodes and the rotor electrode as the rotor rotates, wherein a displacement signal having at least one electrical period is induced on each of the N number of stator electrodes per one mechanical turn, wherein the induced displacement signal is amplitude modulated by the driving carrier signal and is sequentially phase-delayed.

In a further general aspect, there is provided a multi-phase wound-rotor (WR) resolver apparatus for measuring a displacement position of a circular movement body, the multi-phase WR resolver apparatus including: a stator including: an N number of coil-poles placed at N equally divided positions over a mechanical or an electrical period of the stator, N being an odd number greater than or equal to 5, wherein the N coils have an identical electrical polarity, and are wound with an equal number of winding turns, and the N number of coils sense a displacement of the rotor; and a wound-rotor, wherein a coil is wound with a sinusoidally distributed winding, a driving signal carrier is applied to the coil wound on the wound-rotor, and one or more periods of sinusoidal electrical signals are induced on each of the N number of coils on the stator per one turn of the wound-rotor such that N sequentially phase-delayed and amplitude modulated displacement signals are sensed from the N number of coils on the stator.

Each of the N number of coils may be subdivided into two sensing-coils on the stator, wherein the two sensing-coils are located at 180° difference in mechanical or electrical angle on the stator, wherein the two sensing-coils have an opposite electrical polarity, and are serially connected such that the N number of sequentially phase-delayed and amplitude modulated displacement signals are obtained from N sets of two subdivided sensing coils.

The two sensing-coils may be placed at a dual stator on a shared axis, wherein the dual-stator includes a stator-A and a stator-B on a shared axis, wherein the two sensing-coils are separately placed on the stator-A and the stator-B at a same electrical angle position, with an opposite electrical polarity, and are serially connected, wherein a phase-delayed displacement signal, free of a common mode noise induced from a directional external magnetic flux toward the resolver, is attained through the two sensing-coils on the dual stator and wherein the N number of sequentially phase-delayed and amplitude modulated displacement signals are obtained from N sets of the two sensing coils on the dual stator.

In a still further general aspect, there is provided a differential synthesis apparatus adapted to sense a plurality of amplitude modulated phase-delayed displacement signals and outputs amplitude modulated two-phase orthogonal displacement signals, wherein the differential synthesis apparatus utilizes sine synthesis coefficients and cosine synthesis coefficients being selectable from a Zero-Force transformation, and wherein the differential synthesis apparatus removes at least one of a common mode noise induced by an external disturbance flux and an unmodulated carrier signal component.

The differential synthesis apparatus may be realized by an electrical circuitry and include: a differential sine synthesis module implemented in an OP-amp circuitry, wherein the OP-amp circuitry includes: an N number of sensing resistors, each connected to a primary differential OP-amp, wherein the N number of sensing resistors are sorted into a group of negative-sign sensing resistors for the negative sine synthesis coefficients and a group of positive-sign sensing resistors for the positive sine synthesis coefficients; and the primary differential OP-amp, wherein the negative-sign sensing resistors are connected to a negative (−) input port of the primary OP-amp, and the positive-sign sensing resistors are connected to a positive (+) input port of the primary OP-amp, wherein the negative input port and an output of the primary OP-amp is connected by a primary feedback gain register, while the positive input port and the reference level (ground) is connected by a primary match register such that each resistor value is determined by a ratio between the value of the primary feedback gain resistor and the value of corresponding sine synthesis coefficient under a specific condition that the value of the primary feedback gain register is equal to that of the primary match register, wherein an un-modulated carrier signal component and common mode noise in a signal, if any included, is removed through the primary differential OP-amp as a common mode noise rejection; and a differential cosine synthesis module implemented in an OP-amp circuitry, wherein the OP-amp circuitry includes: an N number of sensing resistors, each connected to a secondary differential OP-amp, wherein the N number of sensing resistors are sorted into a group of negative-sign sensing resistors for the negative cosine synthesis coefficients and a group of positive-sign sensing resistors for the positive cosine synthesis coefficients; and the secondary differential OP-amp, wherein the negative-sign sensing resistors are connected to the negative (−) input port of the secondary OP-amp, and the positive-sign sensing resistors are connected to the positive (+) input port of the secondary OP-amp, wherein the negative input port and the output of the secondary OP-amp is connected by a secondary feedback gain register, while the positive input port and the reference level (ground) is connected by a secondary match register such that each resistor value is determined by the ratio between the value of the secondary feedback gain resistor and the value of a corresponding cosine synthesis coefficient under a specific condition that the value of the secondary feedback gain register is equal to that of the secondary match register, wherein an un-modulated carrier signal component and common mode noise in a signal, if any included, is removed through the secondary differential OP-amp as a common mode noise rejection.

The differential synthesis apparatus may further include: a stator including an N number of magnetic sensors, wherein N being an odd integer greater than or equal to 5, wherein the magnetic sensors being equidistant over a mechanical period or an electrical period of the stator from another magnetic sensor; and a rotor including a plurality of magnets wherein each turn of the rotor generates at least one electrical period on the stator, wherein the stator outputs a plurality of phase-delayed displacement signals as the rotor rotates, wherein each one of the displacement signals is sequentially phase-delayed, wherein a plurality of displacement signals are obtained from the N number of magnetic sensors, and wherein the number of the plurality of displacement signal is the same as the N number of magnetic sensors over one mechanical turn of the rotor.

The differential synthesis apparatus may further include: a mover including an N number of magnetic sensors, wherein N being an odd integer greater than or equal to 5, wherein the magnetic sensors being equidistant over a mechanical period or an electrical period of the mover from another magnetic sensor; and a stator including a plurality of magnets wherein a displacement of the mover generates at least one electrical period on the stator, wherein the mover outputs a plurality of phase-delayed displacement signals as the mover moves, wherein each one of the displacement signals is sequentially phase-delayed, wherein a plurality of displacement signals are obtained from the N number of magnetic sensors, and wherein the number of the plurality of displacement signals is the same as the N number of magnetic sensors over one mechanical turn of the mover.

The differential synthesis apparatus may further include: a phase-sensitive demodulator to demodulate the amplitude modulated two-phase orthogonal displacement signals, and converts them into two-phase orthogonal displacement signals without the carrier; and an interpolator to determine an absolute position or incremental position of a rotor.

The differential synthesis apparatus may further include: an A/D converter adapted to convert an orthogonal displacement signal into a digital signal and outputs a digital orthogonal displacement signal; a Hilbert Transformer adapted to shift the carrier phase of the digital orthogonal displacement signal by 90°; an adder adapted to add the output signal of the Hilbert Transformer and the original signal of which carrier phase is not shifted and outputs an complex signal; and an absolute calculator adapted to calculate an absolute value of the complex signal and outputs a carrier-removed orthogonal displacement signal.

The differential synthesis apparatus may output amplitude modulated three-phase displacement signals, wherein the amplitude modulated three-phase displacement signals have phases of 0°, 120°, and 240°, wherein the differential synthesis apparatus utilizes three sets of synthesis coefficients being selectable from a Zero-Force transformation.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF THE INVENTION

Figure 1:
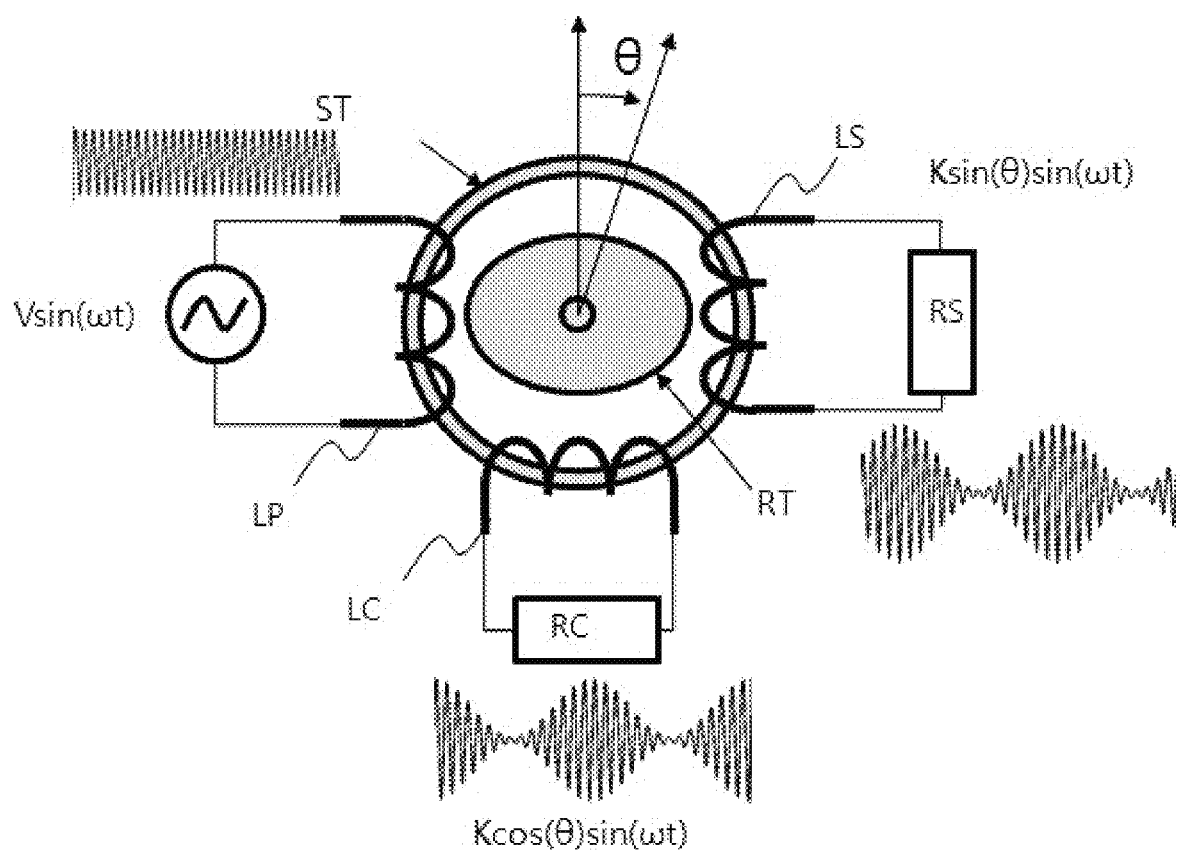
FIG. 1 illustrates the conventional variable reluctance (VR) resolver architecture and its operational principle.

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

To facilitate understanding the present invention, a following glossary of terms is provided. The glossary is intended to provide the reader with a general understanding of various terms as they are used in the specification and claims, and is not intended to limit the scope of these terms.

Glossary of Terms

Amplitude modulated (AM) signal—The term "amplitude modulated (AM) signal" as used herein in this specification, is defined as a signal that is amplitude modulated by the carrier of a high frequency driving (or excitation) signal. An AM signal can be either under-modulated (modulation index is less than 1.0) or 100% modulated (modulation index is 1.0).

Balance-wired—The term "balance-wired" as used herein in this specification, is defined as a configuration of coil-poles such that at least two sensing coils or excitation-sensing coils are wound on different poles to maintain flux balance between the coil-poles and to sense a rotor displacement signal at a certain phase.

Coil-pole—The term "coil-pole" as used herein in this specification, is defined as a pole on which one or multiple coils are wound.

Differential synthesis—The term "differential synthesis" as used herein in this specification, is defined as a method and an apparatus that synthesizes two-phase orthogonal or three-phase displacement signals from sequentially phase delayed displacement signals sensed on the multi-phase resolver by performing the Zero-Force transformation in a differential way.

Double-wound—The term "double-wound" as used herein in this specification, is defined as a configuration of coil-poles such that a primary coil for excitation and a secondary coil for sensing are wound on a same pole or other separate pole to achieve Galvanic isolation and to sense a rotor displacement signal at a certain phase.

Excitation-sensing coil—The term "excitation-sensing coil" as used herein in this specification, is defined as a coil wound on a pole, which performs both an excitation function on a driving carrier signal and a sensing function on the rotor displacement.

Multi-phase—The term "multi-phase" as used herein in this specification, is defined as the number of phases of displacement signals, sensed from the resolver body, which is greater than or equal to 5. In conventional resolvers, typically two-phase or three-phase displacement signals are sensed.

N-phase—The term "N-phase" as used herein in this specification, is defined as an N number of phases that are equally divided over one mechanical or electrical period of 360°. In N-phase of multi-phase resolver, N phase-delayed displacement signals are sensed over one mechanical turn or electrical period of the rotor displacement.

Pole—The term "pole" as used herein in this specification, is defined as a protruding shape like tooth on the stator, on which one or multiple coils may or may not be wound.

Primary coil (or winding)—The term "primary coil (or winding)" as used herein in this specification, is defined as a coil wound on a pole that performs an excitation function on a driving carrier signal.

Resolver—The term "resolver" as used herein in this specification, is defined as an apparatus adapted to measure the position of a moving object. The resolver comprises at least one stator and at least one rotor.

Lobe—The term "lobe" as used herein in this specification, is defined as a part of rotor, of which saliencies (or teeth) produce one or multiple electrical periods over one mechanical turn of the rotor.

Secondary coil (or winding)—The term "secondary coil (or winding)" as used herein in this specification, is defined as a coil wound on a pole that performs a sensing function on the rotor displacement.

Single-wound—The term "single-wound" as used herein in this specification, is defined as a configuration of coil-poles such that single excitation-sensing coil doing excitation and sensing simultaneously is wound on a pole to sense a rotor displacement signal at a certain phase.

Synthesis coefficients—The term "synthesis coefficients" as used herein in this specification, is defined as a set of numbers that is selected from the ZF transformation and is utilized in the differential synthesis. The method of selecting synthesis coefficients is disclosed in International Application Publication No. WO 2020/149489.

Zero-Force (ZF) transformation—The term "Zero-Force (ZF) transformation" as used herein in this specification, is defined as a $1^{st}$ order linear transformation in mathematics or electrical engineering such that an N number of sequentially phase delayed signals are transformed into two-phase orthogonal signals or three-phase displacement signals in zero-forcing criterion. The method and apparatus of the ZF transformation is disclosed in International Application Publication No. WO 2020/149489.

The present invention disclosure provides a remarkably simplified and flexible multi-phase resolver topology and its differential signal processing method that significantly reduces the manufacturing cost and quality control requirements, while improving the position detection accuracy.

The embodiment of the invention mainly describes VR resolvers because of their simplicity and cost effectiveness but it can also be fully applied to WR resolvers or other types of resolvers that share the basic principles.

The multi-phase resolver apparatus includes largely two parts; one is a multi-phase resolver body that relates to the architecture of the resolver coil windings, the stator and the rotor; the other is a signal processing unit that includes exciting the carrier signal, sensing the displacement signal from the multi-phase resolver body, differential synthesizing on synthesis coefficients, removing the common-mode signals such as un-modulated carrier, and recovering the carrier modulated displacement position signal such as single-phase, two-phase orthogonal, or three-phase synchro compatible signals, and resolver-to-digital conversion.

Let N be a phase-division number that divides one electrical or mechanical period of 360° equally into N positions, then the angle between two adjacent positions, which is referred to as "phase-division angle" (or simply "phase") becomes 360°/N, where N is an odd number greater than or equal to 5 in the present invention, unless otherwise noted. Considering the size of the stator practically used in the industries, however, N would be around 5 to 99.

Figure 2:
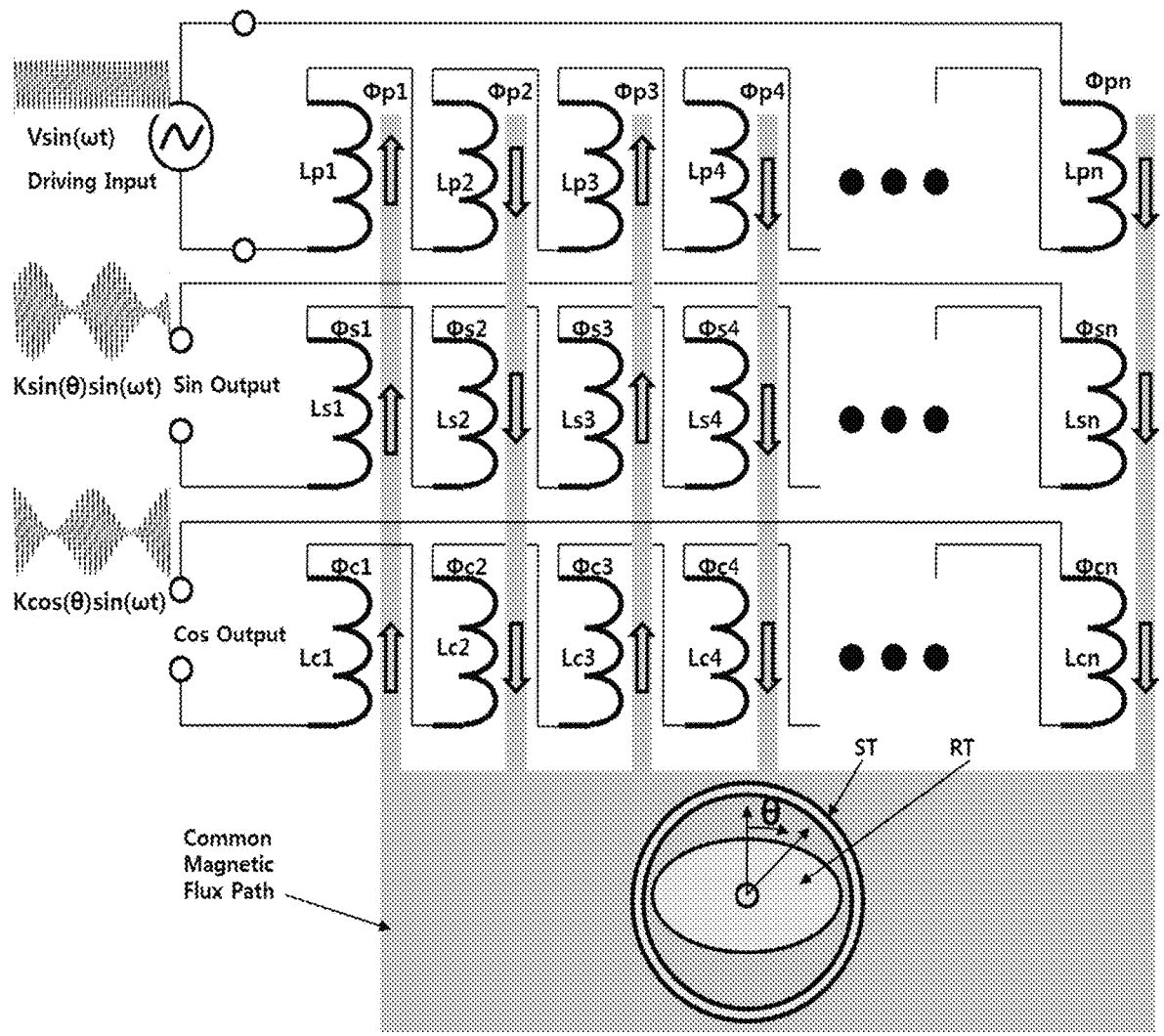
FIG. 2 illustrates an exemplary coil-winding of the conventional VR resolver.
Figure 3A:
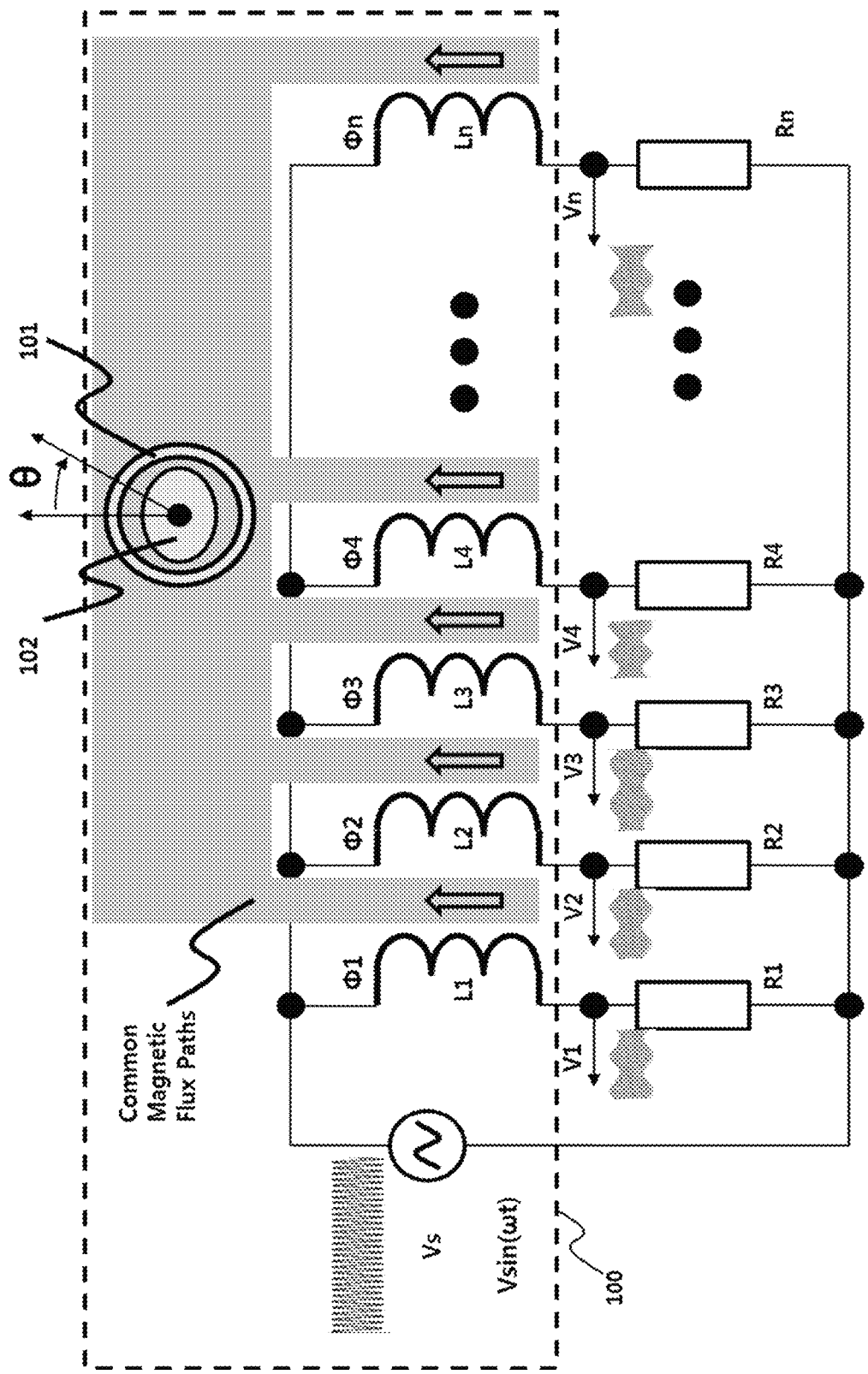
FIG. 3A illustrates an exemplary coil-winding of N coil-poles, single-wound N-phase VR resolver according to the present invention.

The multi-phase resolver has a new topology compared with that of conventional resolvers. An exemplary schematic circuit diagram of a generic single-wound N-phase VR resolver according to the present invention is illustrated in FIG. 3A, where N coils, $L_1, L_2, \ldots, L_N$, are wound on the poles of the stator and connected in parallel, and N is an odd number greater than or equal to 5. Physically, N coils are allocated at evenly spaced positions, more exactly, at the electrical positions on N equally divided over one mechanical or electrical period of the stator, where the electrical period is formed by the rotor lobe. In FIG. 3A, each coil has the function of simultaneously excitation (driving) and sensing, whereas generally three types (excitation, sine-signal sensing, and cosine-signal sensing) of coils are wound on each pole in conventional VR resolvers as shown in FIG. 2. In the generic single-wound multi-phase VR resolver, all coils are wound at the same electrical polarity with an identical number of turns.

Compared with the conventional VR resolver, the major distinct features in single-wound multi-phase VR resolver are as follows: (1) multi-phase VR resolver is configured to have an odd-numbered N coil-poles, which are connected and excited in parallel, whereas generally an even number of coil-poles are configured in conventional VR resolvers, which are connected serially; (2) single coil is wound on each pole for the purpose of exciting and sensing the signal, whereas in conventional VR resolvers, generally three types of coils are overlappingly wound on each pole for excitation, sine signal sensing, and cosine signal sensing; (3) all coils have the same number of turns and identical electrical polarity, whereas in conventional VR resolvers, generally the number of coil turns varies from pole to pole and depends on the signal type of coils with a varying winding direction; (4) AM under-modulation is allowed, whereas 100% modulation is necessary in conventional VR resolvers; (5) as the rotor rotates, successively N phase-delayed sinusoidal displacement signals are sensed on N coils, whereas in conventional VR resolvers, two-phase orthogonal displacement signals are directly sensed through multiple sine and cosine sensing coils; and (6) differential signal processing is applied to N phase-delayed sinusoidal displacement signals to produce the two-phase orthogonal displacement signals.

Feature (1) of the multi-phase resolver topology enables to sense a displacement signal at each coil-pole independently without being disturbed by the carrier magnetic flux interferences from other coil-poles. Features (2) and (3) of the multi-phase VR resolver significantly reduce the complicated task of fabricating three layers of coil windings in conventional VR resolver manufacturing, as well as increase the reliability of the resolver as it is possible for the three types of coils to short circuit due to insulation damage in the slender coil wire. Feature (4) significantly relaxes the tight requirements of coil winding and configuration in multi-phase resolvers, which are critical to achieve 100% amplitude modulated signals in conventional resolvers. Feature (5) describes that the sum of all N phase-delayed displacement signals sensed on the multi-phase resolver becomes zero as the sum of all N equally phase-delayed periodic signals is mathematically zero in one period. In other words, the stator is in a balanced magnetic flux state at any position. This balanced magnetic flux state together with feature (1)'s topology obviates the need to perform complicated tasks to maintain the magnetic flux balance required in conventional VR resolvers. Feature (5) also offers a means of monitoring the integrity of a manufactured multi-phase VR resolver as the sum of all carrier signal components in N phase-delayed displacement signals is assumed to be constant under the ideal condition. The signal processing described in Feature (6) of the multi-phase VR resolver minimizes the noise and distortion induced in the sensed signals.

Figure 3B:
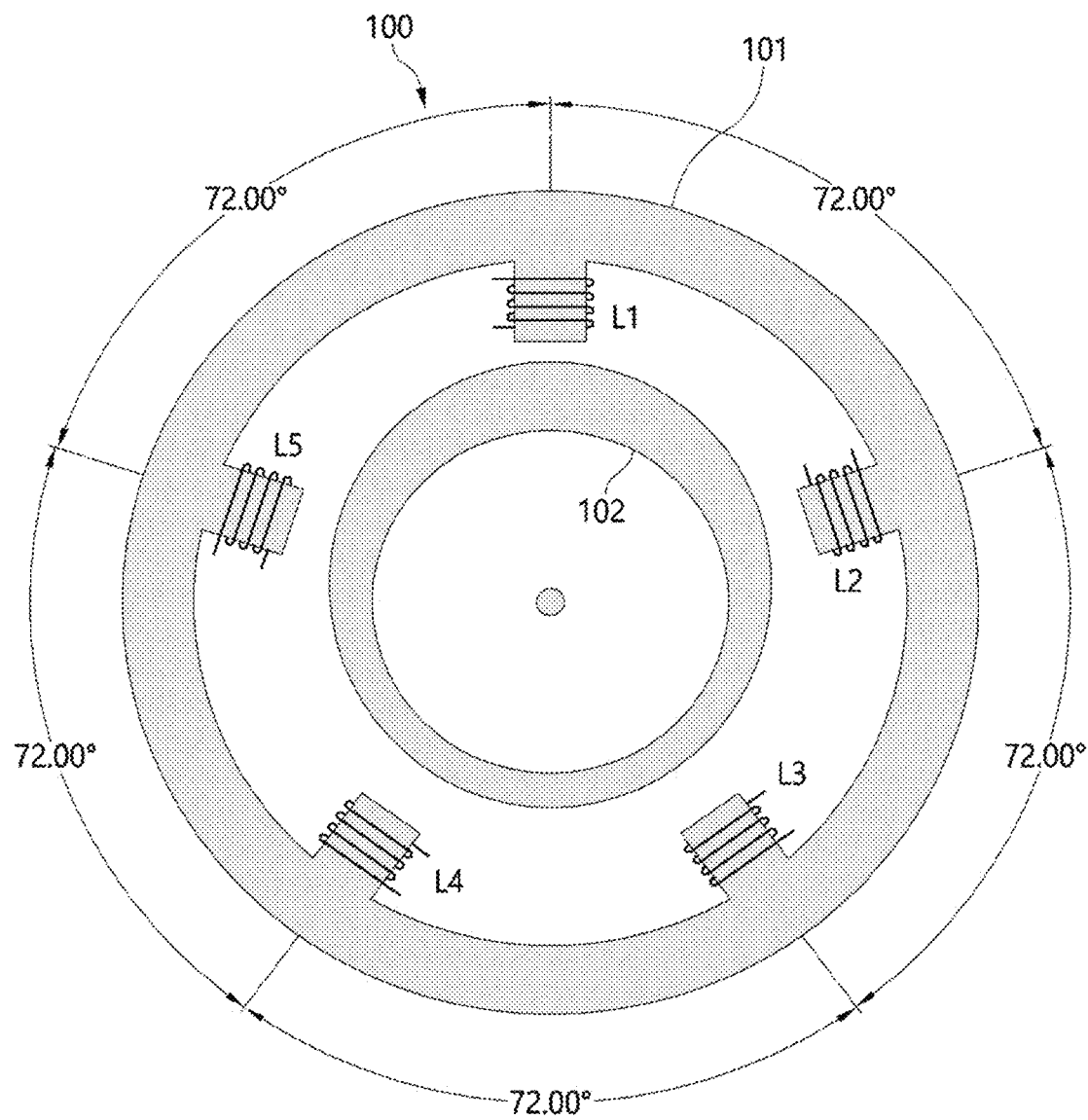
FIG. 3B illustrates an exemplary topology of 5 coil-poles, single-wound 5-phase VR resolver according to the present invention.

FIG. 3B illustrates a topology of generic single-wound 5 coil-poles, N=5, so 5-phase VR resolver according to the present invention; 5 excitation-sensing coils, $L_1$, $L_2$, $L_3$, $L_4$, and $L_5$, are located at 0°, 72°, 144°, 216°, and 288° phase-angle positions, respectively, around the stator (101) by the phase-division angle 360°/5=72°. Thus, as the rotor rotates, sequentially 5-phase sinusoidal displacement signals are generated on the five coils. The same topology can be applied to a multi-phase WR resolver, where odd-numbered N sensing coils are equally spaced on the stator.

A driving carrier signal excites in parallel the excitation-sensing coils, L1, L2, . . . , Ln. When the rotor starts to rotate, the magnetic field is established throughout the whole stator and on the excitation-sensing coils according to the rotated position of the rotor through the air-gap permeance formed by the particular shape of rotor (102) lobe. A distinctive characteristic of multi-phase VR resolver topology is that the carrier induced magnetic flux distribution around the stator is optimally balanced in sensing the displacement signal of the rotor by the configuration of evenly spaced layout of odd-numbered N coil-poles with a proper carrier excitation. From the perspective of a certain coil-pole position, the flux weighed on the coil-pole on the right side is balanced with the flux weighed on the coil-pole on the left side as they are symmetrically located with equal distance but with the opposite magnetic flux directions. Therefore, each excitation-sensing coil is able to sense a clean phase-delayed displacement signal independently without interference from the other coil-poles.

When an even number of coil-poles are placed at evenly divided positions on the stator, the carrier magnetic flux induced to a certain excitation-sensing coil interferes with other coil-poles as the flux balance weighed on that coil-pole is unbalanced due to the broken symmetricity from the resultant odd number of coil-poles around the coil-pole.

When the driving carrier excitation signal, $V_S$, is excited to excitation-sensing coils L1, L2, . . . , Ln, a successively phase-angle delayed current flows through each coil and consequently, the magnetic flux $\Phi_1$, $\Phi_2$, . . . , $\Phi_N$, is formed as the rotor rotates. A signal that is amplitude modulated by the carrier is sensed at each excitation-sensing coil, L1, L2, . . . , Ln, by the connecting sensing resister, $R_1$, $R_2$, . . . , $R_N$, to each coil, respectively.

The total sum of currents caused by displacement signals flowing through all excitation-sensing coils must be zero since the sum of all N equally phase-delayed periodic signals is zero in one period mathematically. Therefore, the sum of all magnetic flux in the stator must be zero mathematically as in EQ. (1).

$$\Phi_1 + \Phi_2 + \ldots + \Phi_N = 0 \qquad \text{EQ. (1)}$$

EQ. (1) implies that the stator is physically in a balanced magnetic flux state when the rotor lobe is at any stationary position.

When the rotor starts to rotate, the sensed signal, $V_1$, $V_2$, . . . , $V_N$, is expressed as follows with carrier frequency ω:

$$V_1 = K(1 + m \times \sin(\theta - \theta_1)) \times \sin(\omega t) \qquad \text{EQ. (2)}$$
$$V_2 = K(1 + m \times \sin(\theta - \theta_2)) \times \sin(\omega t)$$
$$\vdots$$
$$V_3 = K(1 + m \times \sin(\theta - \theta_N)) \times \sin(\omega t)$$

In EQ. (2), $\theta_n$ is an electrical angle at which $L_n$ excitation-sensing coil is located, $$\theta_n = \frac{360}{N} \times (n-1)$$

for n=1, 2, . . . , N. K is a VR resolver transfer ratio and m represents a modulation ratio. The VR resolver transfer ratio (K) is determined from several factors such as the number of turns of coil, the length of magnetic circuit, construction structure, resolver materials and the airgap length between the rotor lobe and the stator.

EQ. (2) states that N successively phase delayed (or simply "N-phase") displacement signals are sensed without any interference from the other coil-poles.

Figure 3C:
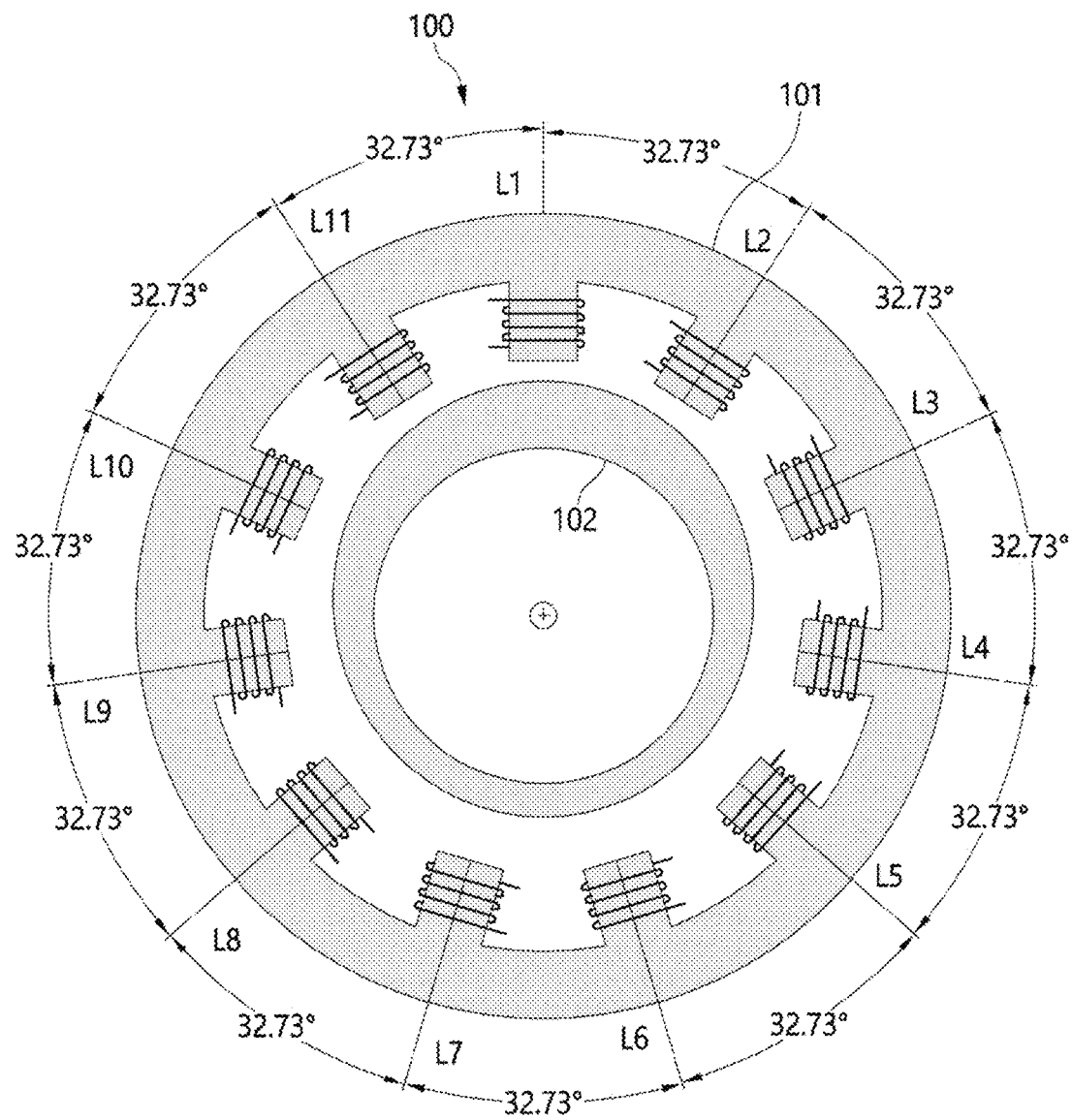
FIG. 3C illustrates an exemplary topology of 11 coil-poles, single-wound 11-phase VR resolver according to the present invention.

In FIGS. 3B and 3C, a topology of 5 coil-poles (N=5) and 11 coil-poles (N=11) of generic single-wound VR resolver is drawn, where the phase-division angle is 360°/5=72° and 360°/11=32.73°, respectively.

Figure 4:
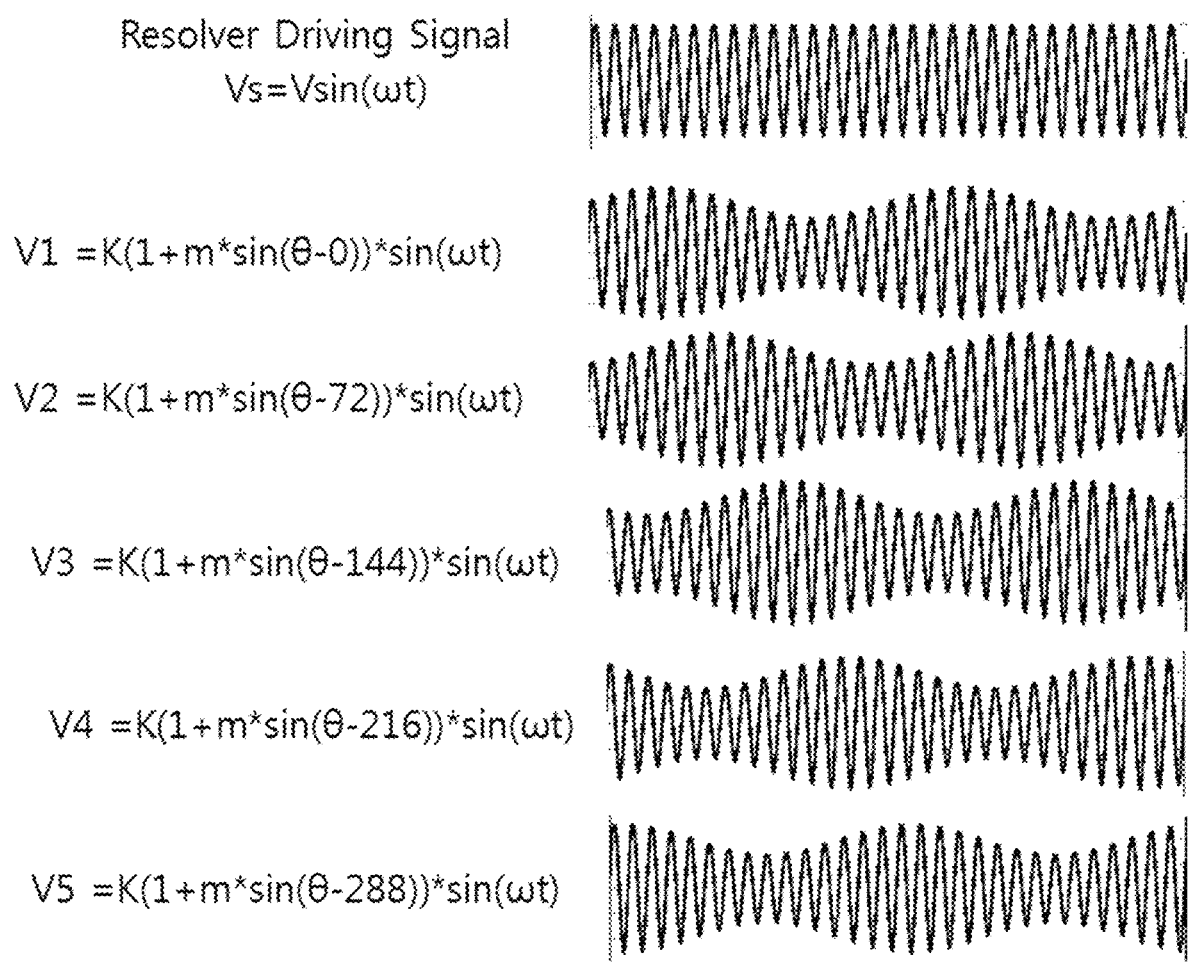
FIG. 4 shows an exemplary driving (excitation) signal and 5-phase amplitude modulated displacement signals sensed on 5-phase VR resolver of FIG. 3B.

For the 5 coil-poles, 5-phase VR resolver in FIG. 3B, the waveforms of excitation signal, $V_S=V \sin(\omega t)$, and amplitude modulated sensed signals, $V_1$, $V_2$, $V_3$, $V_4$, and $V_5$, are shown in FIG. 4, respectively. It is seen that the envelope of $V_1$, $V_2$, $V_3$, $V_4$, and $V_5$ signal is a sequentially 72° phase-delayed displacement signal.

The amplitude modulated sensed multi-phase signals are usually under-modulated for the single-wound windings. To obtain two-phase orthogonal displacement signals, which are amplitude modulated by the carrier and are compatible with conventional resolvers, a proper signal processing is required.

Figure 5:
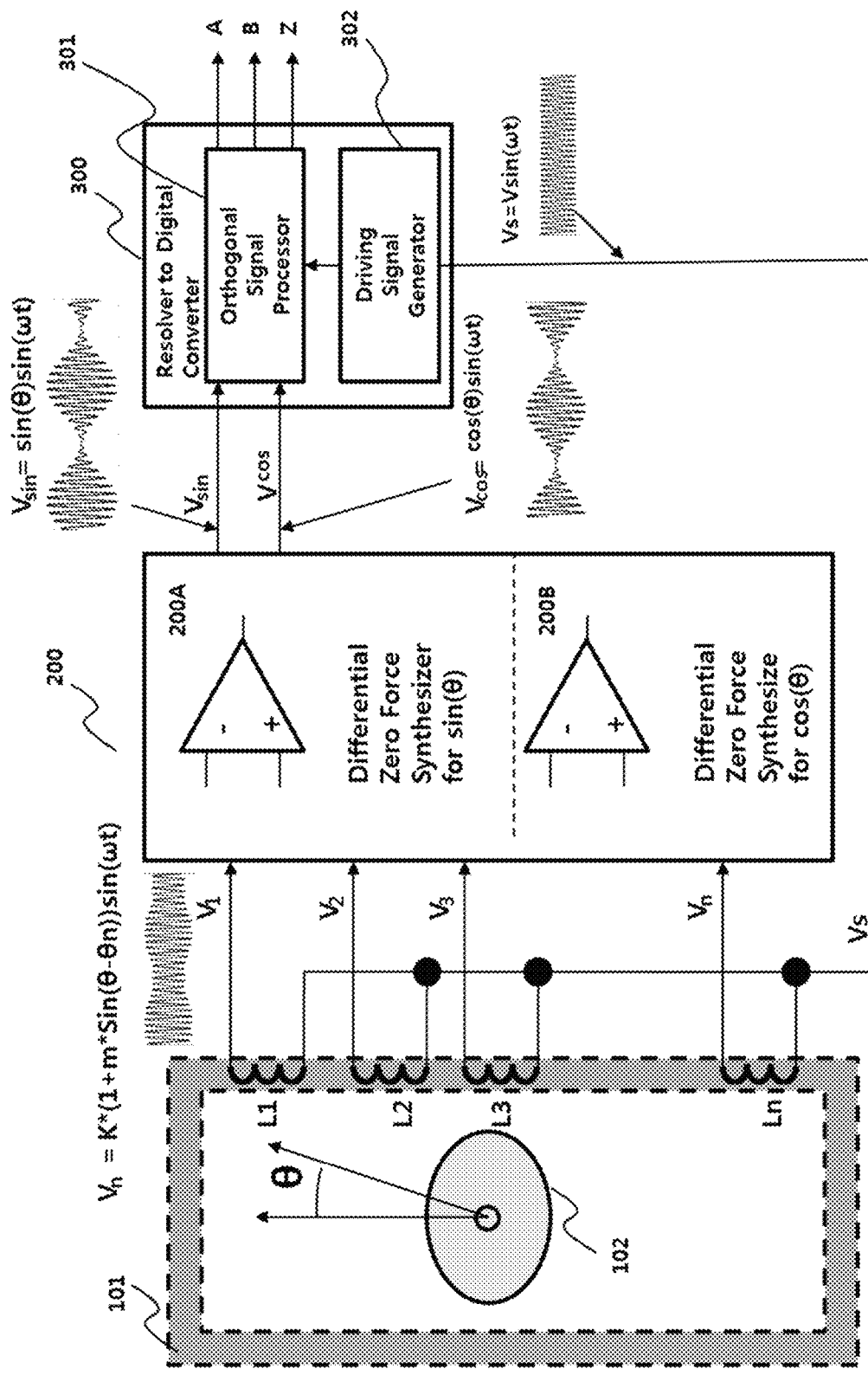
FIG. 5 shows an exemplary block diagram of multi-phase VR resolver according to the present invention.

FIG. 5 illustrates an exemplary block diagram of multi-phase VR resolver according to the present invention. It mainly consists of the resolver body (100) and the differential synthesis module (200). The excitation carrier signal $V_S$ generator (302) can be included in a commercially available R/D converter.

In implementing the circuitry of removing the component of un-modulated carrier signal while processing the differential synthesis, the ordinary differential OP-amp circuits with odd number of input cannot be easily applied as the sensed signals are asymmetry in number and phase. By exploiting the inherent characteristics of ZF transformation when N is an odd number, however, the invention presents a differential synthesis module realized by the ingenious differential OP-amp circuitry in canceling the carrier signal component through the common mode signal rejection. The sensing gain resistors that correspond to the synthesis coefficients are also conveniently determined.

In response to the carrier signal $V_S$ from driving (excitation) signal source, the resolver body (100) generates sequentially N phase-delayed displacement signals in EQ. (2). The differential synthesis module (200), which comprises a sine synthesis module (200A) and a cosine synthesis module (200B), processes the N-phase signals and produces the amplitude modulated two-phase orthogonal displacement signals, $V_{sin}$ and $V_{cos}$.

Figure 6:
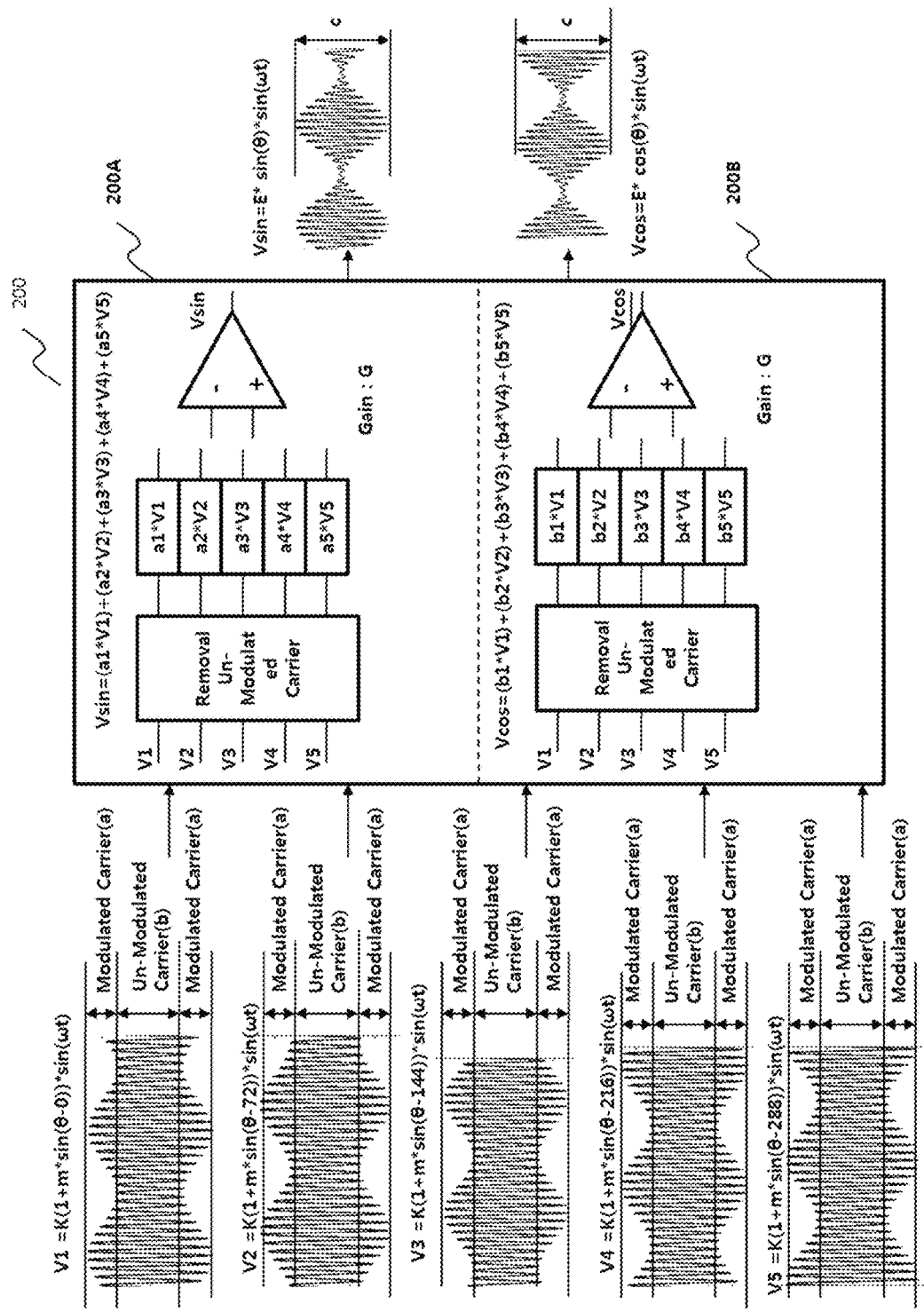
FIG. 6 shows an exemplary input and output signals of differential synthesis module (200) for 5-phase resolver according to the present invention.

In FIG. 6, 5-phase amplitude under-modulated signals, $V_1$, $V_2$, $V_3$, $V_4$, and $V_5$, are illustrated in detail. The amplitude under-modulated signal can be divided into two signals: one is a modulated signal that contains a displacement information $\sin(\theta-\Delta\theta)$, and the other is an un-modulated carrier signal $\sin(\omega t)$. The un-modulated carrier signal $\sin(\omega t)$, which is common to all signals, can be removed by a differential amplification. The $\sin(\theta-\Delta\theta)$ signals contain the information of rotor displacement position.

When sine addition formula, $\sin(\theta-\Delta\theta)=\sin(\theta)*\cos(\Delta\theta)-\cos(\theta)*\sin(\Delta\theta)$, is applied, the amplitude modulated 5-phase displacement signals can be expressed as follows after ignoring the carrier signal:

$$V_1 = \sin(\theta - \Delta\theta_1) = \sin(\theta)*\cos(\Delta\theta_1) - \cos(\theta)*\sin(\Delta\theta_1)$$
$$V_2 = \sin(\theta - \Delta\theta_2) = \sin(\theta)*\cos(\Delta\theta_2) - \cos(\theta)*\sin(\Delta\theta_2)$$
$$V_3 = \sin(\theta - \Delta\theta_3) = \sin(\theta)*\cos(\Delta\theta_3) - \cos(\theta)*\sin(\Delta\theta_3)$$
$$V_4 = \sin(\theta - \Delta\theta_4) = \sin(\theta)*\cos(\Delta\theta_4) - \cos(\theta)*\sin(\Delta\theta_4)$$
$$V_5 = \sin(\theta - \Delta\theta_5) = \sin(\theta)*\cos(\Delta\theta_5) - \cos(\theta)*\sin(\Delta\theta_5)$$

The above 1st degree system of linear equations with two variables, $\sin(\theta)=V_{sin}$ and $\cos(\theta)=V_{cos}$, can be solved by finding the inverse transformation of the linear system matrix. In other words, $\sin(\theta)$ and $\cos(\theta)$ is synthesized from $V_1$, $V_2$, $V_3$, $V_4$, and $V_5$ in differential way to remove the un-modulated carrier signal component.

Let the solution of the above equations be (a1, a2, a3, a4, a5), sine synthesis coefficients for the synthesis of $\sin(\theta)$ variable, and (b1, b2, b3, b4, b5), cosine synthesis coefficients for the synthesis of $\cos(\theta)$ variable, then $V_{sin}$ and $V_{cos}$ is the linear combination of the 5-phase displacement signals as follows:

$$V_{sin} = (a1*V_1) + (a2*V_2) + (a3*V_3) + (a4*V_4) + (a5*V_5)$$
$$V_{cos} = (b1*V_1) + (b2*V_2) + (b3*V_3) + (b4*V_4) + (b5*V_5)$$

The coefficient in the above linear equation has its normalized value between $-1\sim1$, and using the property of ZF transformation, the equation can be suitably implemented by a differential operational amplifier (OP-amp) circuitry. For both V sin and V cos calculations, signals having plus coefficient (positive sign) are input to the positive Op-amp input port and signals having minus coefficient (negative sign) are input to the negative Op-amp input port. A sensing resistor value for each signal that represents the absolute value of each corresponding synthesis coefficient becomes the gain of the signal.

The two-phase orthogonal displacement signals produced are completely compatible with the signal generally found in conventional resolvers as expressed in EQ. (3).

$$V_{sin} = E \times \sin(\theta) \times \sin(\omega t) \quad \text{EQ. (3)}$$
$$V_{cos} = E \times \cos(\theta) \times \sin(\omega t)$$

In the following, the implementation of OP-amp circuitry of the differential synthesis module (200) is explained in detail.

Differential Synthesis of the Two-Phase Orthogonal Displacement Signals

Figure 7:
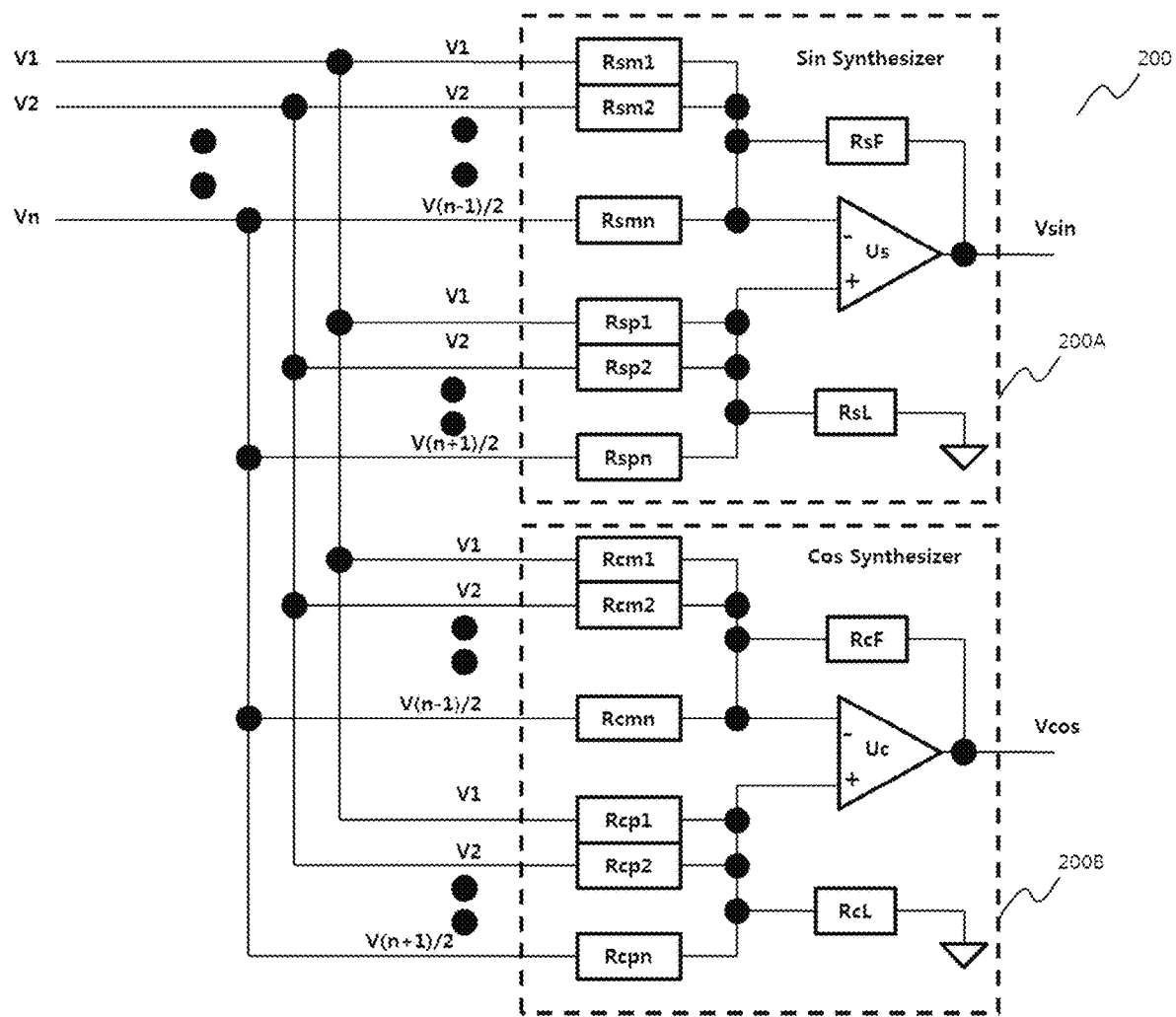
FIG. 7 shows an exemplary detailed schematic of differential synthesis module (200) for N-phase resolver according to the present invention.

As illustrated in FIG. 7, in N-phase VR resolver, the differential sine synthesis module (200A) for V sin signal comprises a group of maximal (N−1)/2 minus-sign sensing resistors, $Rsm_1$, $Rsm_2$, ..., $Rsm_n$ (n=1, 2, ..., (N−1)/2), that are connected to the negative (−) input port of the primary OP-amp (Us), and another group of maximal (N+1)/2 plus-sign sensing resistors, $Rsp_1$, $Rsp_2$, ..., $Rsp_n$ (n=1, 2, ..., (N+1)/2), that are connected to the positive (+) input port of the primary OP-amp. The negative input port and the output of OP-amp (Us) is connected by a primary feedback gain register (RsF), and the positive input port and the reference level (ground) is connected by a primary match register (RsL).

Likewise, the differential cosine synthesis module (200B) for V cos signal comprises a group of maximal (N−1)/2 minus-sign sensing resistors, $Rcm_1$, $Rcm_2$, ..., $Rcm_n$ (n=1, 2, ..., (N−1)/2), that are connected to the negative (−) input port of the secondary OP-amp (Uc) and another group of maximal (N+1)/2 plus-sign sensing resistors, $Rcp_1$, $Rcp_2$, ..., $Rcp_n$ (n=1, 2, ..., (N+1)/2), that are connected to the positive (+) input port of the secondary OP-amp. The negative input port and the output of OP-amp (Uc) are connected by a secondary feedback gain register (RcF) and the positive input port and the reference level (ground) are connected by a secondary match register (RcL).

The sensed signal on the single-wound resolver coil is under-modulated and includes a certain amount of un-modulated carrier signal. To recover the 100% carrier modulated displacement signal, the un-modulated carrier signal must be cancelled out. Thus, the differential OP-amp circuitry of (Us) and (Uc) are constructed so as to the un-modulated carrier signal is regarded and processed as a common mode noise. As the common mode rejection ratio (CMRR) of widely used differential OP-amp is generally greater than 10,000, the signal (b) portion in FIG. 6 is removed through the differential OP-amp, whereas effective displacement signal (a) portion is amplified with a certain gain associated with its synthesis coefficient.

In determining the sensing resistor value in association with the synthesis coefficient, as an example, its conversion principle is explained for the case of N=5.

The sensed 5 displacement signals contain their orthogonal displacement signal components such that $\sin(\theta)$ signal component in $V_1$, $V_2$, $V_3$, $V_4$, and $V_5$ signal is 100%, 30.9%, −80.9%, −80.9%, and 30.9%, respectively, and the $\cos(\theta)$ signal component in $V_1$, $V_2$, $V_3$, $V_4$, and $V_5$ signal is 0%, −95.1%, 58.8%, −58.8%, and 95.1%, respectively. The synthesis coefficients are optimally selected after solving the system of linear equations by taking the ZF transformation in zero-forcing criterion.

The resultant synthesis coefficients for N=5 case is sine synthesis coefficients (a1, a2, a3, a4, a5)=(0.4, 0.1236, −0.3236, −0.3236, 0.1236) for V sin synthesis and cosine synthesis coefficients (b1, b2, b3, b4, b5)=(0.0, −0.3804, −0.2352, 0.2352, 0.3804) for V cos synthesis. The resultant V sin and V cos, two-phase orthogonal displacement signals, are synthesized as follows:

$$V\sin = 0.4 * V_1 + 0.1236 * V_2 - 0.3236 * V_3 - 0.3236 * V_4 + 0.1236 * V_5$$

$$V\cos = 0.0 * V_1 - 0.3804 * V_2 - 0.2352 * V_3 + 0.2352 * V_4 + 0.3804 * V_5$$

The sensing resistors (R1, R2, R3, R4, R5) represent the absolute values of sine synthesis coefficients (a1, a2, a3, a4, a5). To determine the values of sensing resistors (R1~R5, OP-amp input gains), following generalized linear equation can be set:

$$V_{out} = (a1*V_1) + (a2*V_2) + (-a3*V_3) + (-a4*V_4) + (a5*V_5) \quad \text{EQ. (4)}$$

Figure 8:
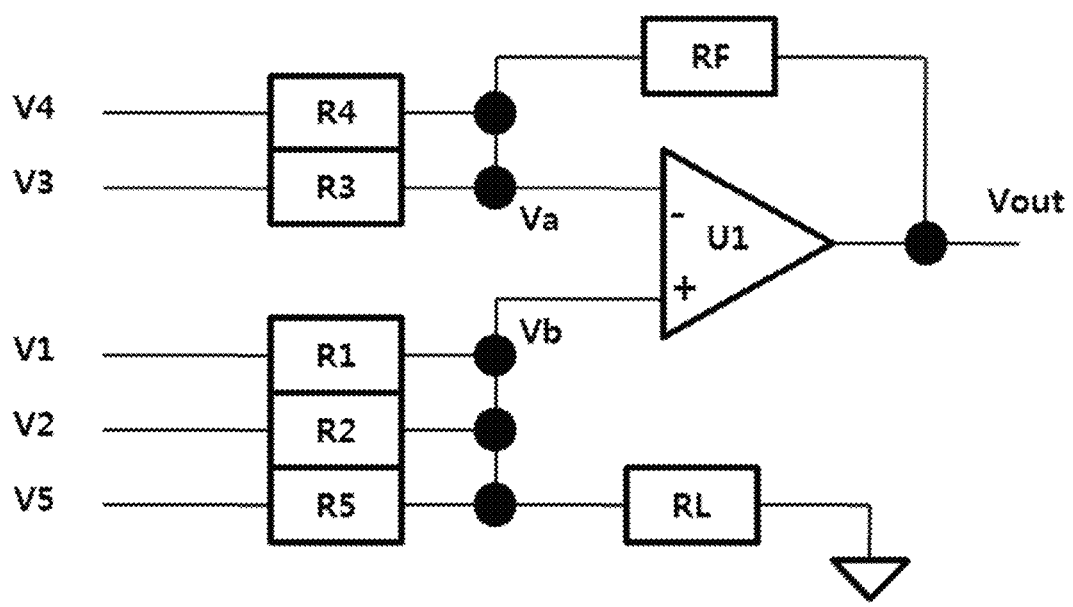
FIG. 8 shows an exemplary detailed schematic of differential synthesis module (200) for 5-phase resolver according to the present invention.

In EQ. (4), a3 and a4 coefficient is negative and a1, a2, a5 coefficient is positive. Moreover, the sum of two negative coefficients is equal to that of three positive coefficients, which is one of the unique characteristics of ZF transformation when N is an odd number, and provides a fundamental condition in realization of the differential synthesis. Based on FIG. 7, OP-amp circuitry implementation of performing EQ. (4) is shown in FIG. 8.

In determining the values of sensing resistors R1~R5, feedback gain resistor (RF), and match resistor (RL), let Vout1 be the OP-amp output signal by $V_1$ signal component. Then each OP-amp output signal Vout1~Vout5 by each input signal $V_1$~$V_5$ can be represented by following equations in EQ. (5-1)~EQ. (5-5), respectively, after applying Thevenin's theorem and superposition theorem, where "||" notation denotes that resistors are connected in parallel.

$$Vout\,1 = \left(1 + \frac{RF}{R4\|R3}\right) * \left(\frac{R2\|R5\|RL}{R1 + (R2\|R5\|RL)}\right) * V_1 \quad \text{EQ. (5-1)}$$

$$Vout\,2 = \left(1 + \frac{RF}{R4\|R3}\right) * \left(\frac{R1\|R5\|RL}{R2 + (R1\|R5\|RL)}\right) * V_2 \quad \text{EQ. (5-2)}$$

$$Vout\,3 = -\frac{RF}{R3} * V_3 \quad \text{EQ. (5-3)}$$

$$Vout\,4 = -\frac{RF}{R4} * V_4 \quad \text{EQ. (5-4)}$$

$$Vout\,5 = \left(1 + \frac{RF}{R4\|R3}\right) * \left(\frac{R1\|R2\|RL}{R5 + (R1\|R2\|RL)}\right) * V_5 \quad \text{EQ. (5-5)}$$

The final output of the Op-amp is the sum of all signals Vout1~Vout5, and can be expressed as follows:

$$Vout = Vout1 + Vout2 + Vout3 + Vout4 + Vout5 \quad \text{EQ. (5-6)}$$

It would be difficult to find the resistor values (R1~R5, RF, RL) satisfying both EQ. (4) and EQ. (5.1)~EQ. (5-6) directly. The values of negative input port resistors, R3 and R4, in EQ. (5-3) and (5-4) can be found relatively easily. However, calculating the values of the positive input port resistors in EQ. (5.1), (5-2), (5-5), requires solving at least 3 degree system of equations with 3 variables. Furthermore, in cases when N is 7 or higher, it would be practically impossible to find the solution directly. In what follows, simplification is made in determining the gain resistor values.

Let Rm be the sub-total resistance to the negative (−) input port of OP-amp, then Rm is the resistance of R3 and R4 in parallel, which can be expressed as follows:

$$(-)\text{Input Port sub-total Resistance: } Rm = R4\|R3 = \frac{R4*R3}{R4+R3} \quad \text{EQ. (5-7)}$$

Feedback gain resistor (RF) is also connected to the negative (−) input port of OP-amp in parallel with Rm. Let Ra be the total resistance to the negative (−) input port of OP-amp, then Ra becomes, $$(-)\text{Input Total Resistance: } Ra = \quad \text{EQ. (5-8)}$$
$$R4\|R3\|RF = \frac{R4*R3*RF}{R4*R3 + R4*RF + R3*RF}$$

Likewise, total resistance to the positive (+) input port of OP-amp, Rb, becomes, $$(-)\text{Input Total Resistance: } Rb = R1\|R2\|R5\|RL = \quad \text{EQ. (5-9)}$$
$$\frac{R1*R2*R5*RL}{R1*R2*R5 + R1*R2*RL + R2*R5*RL + R1*R5*RL}$$

When R1 is excluded, the sub-total resistance to the positive (+) input port of OP-amp, Rb1, becomes, $$(+)\text{Input Total Resistance}(R1 \text{ is Excluded}): Rb1 = \quad \text{EQ. (5-10)}$$
$$R2\|R5\|RL = \frac{R2*R5*RL}{R2*R5 + R2*RL + R5*RL}$$

When R2 is excluded, the sub-total resistance to the positive (+) input port of OP-amp, Rb2, becomes, (+)Input Total Resistance($R2$ is Excluded): $Rb2 =$ EQ. (5-11)

$$R1 \| R5 \| RL = \frac{R1 * R5 * RL}{R1 * R5 + R1 * RL + R5 * RL}$$

When R5 is excluded, the sub-total resistance to the positive (+) input port of OP-amp, Rb5, becomes, (+)Input Total Resistance($R5$ is Excluded): $Rb5 =$ EQ. (5-12)

$$R1 \| R2 \| RL = \frac{R1 * R2 * RL}{R1 * R2 + R1 * RL + R2 * RL}$$

Now the Vout1 in EQ. (5.1) can be factored into two components: the input signal divider and the feedback component as expressed in EQ. (5-13).

Output by $V1$ Signal: $Vout1 =$ EQ. (5-13)

$$\left(1 + \frac{RF}{R4 \| R3}\right) * \left(\frac{R2 \| R5 \| RL}{R1 + (R2 \| R5 \| RL)}\right) * V_1 =$$

(Feedback_Component) * (Input_Signal_Divider) * $V1$

The Feedback_Component can be calculated as follows by using EQ. (5-7) and EQ. (5-8):

$$\left(1 + \frac{RF}{R4 \| R3}\right) = RF * \left(\frac{1}{RF} + \frac{R4 + R3}{R4 * R3}\right) =$$ EQ. (5-14)

$$RF * \left(\frac{R4 * R3 + R4 * RF + R3 * RF}{R4 * R3 * RF}\right) = \frac{RF}{R4 \| R3 \| RF} = \frac{RF}{Ra}$$

Likewise Input_Signal_Divider can be calculated as follows by using EQ. (5-9) after multiplying R1 to both numerator and denominator:

$$\left(\frac{R2 \| R5 \| RL}{R1 + (R2 \| R5 \| RL)}\right) =$$ EQ. (5-15)

$$\frac{1}{R1} * \left(\frac{R1 * R2 * R5 * RL}{R1 * R2 * R5 + R1 * R2 * RL + R2 * R5 * RL + R1 * R5 * RL}\right) =$$

$$\frac{1}{R1} * R1 \| R2 \| R5 \| RL = \frac{Rb}{R1}$$

Therefore, Vout1 can be rewritten by applying EQ. (5-14) and EQ. (5-15) to EQ. (5-13), and as follows:

$$Vout\ 1 = \frac{RF}{Ra} * \frac{Rb}{R1} * V_1$$ EQ. (5-16)

As a specific case, when Ra=Rb, then EQ. (5-16) is simplified as follows:

$$Vout\ 1 = \frac{RF}{R1} * V_1$$ EQ. (5-17)

Applying the assumption of Ra=Rb in EQ. (5-17) implies that the sum of all input voltages to the negative (−) input port is the same as that of all input voltages to the positive input port, and that the feedback resistor and the match resistor have the same value. Here, the unique characteristics of ZF transformation fully satisfy the specific Ra=Rb condition: the sum of all coefficients is zero, and the sum of all negative coefficients and the sum of all positive coefficients are equal. Therefore, if the feedback gain resistor (RF) and the match resistor (RL) in FIG. 8 are set to have the same resistance, then EQ. (5.1) can be simplified to EQ. (5-17).

The similar approach can be applied to Vout2 and Vout5 signal in FIG. 8, and can be simplified as follows:

$$Vout\ 2 = \frac{RF}{Ra} * \frac{Rb}{R2} V_2 = \frac{RF}{R2} * V_2$$ EQ. (5-18)

$$Vout\ 5 = \frac{RF}{Ra} * \frac{Rb}{R5} V_5 = \frac{RF}{R5} * V_5$$ EQ. (5-19)

Combining all Vout1~Vout5 signals, the output of OP-amp Vout in EQ. (5-6) can be also simplified as follows:

$$Vout = Vout1 + Vout2 + Vout3 + Vout4 + Vout5 =$$ EQ. (5-20)

$$\frac{RF}{R1} * V_1 + \frac{RF}{R2} * V_2 - \frac{RF}{R3} * V_3 - \frac{RF}{R4} * V_4 + \frac{RF}{R5} * V_5$$

EQ. (5-20) shows that when the signals are simultaneously input to the negative and positive input port of Op-amp, the gain for each input signal is determined by the ratio between the feedback resistor value and the input resistor value under a specific condition of Ra=Rb and RF=RL. Therefore, once the coefficients in EQ. (4) are determined, each sensing resistor value R1~R5 in FIG. 8 is determined by the following ratio: R1=RF/a1, R2=RF/a2, R3=RF/a3, R4=RF/a4, R5=RF/a5.

In summary, when the multi-phase VR resolver generates either amplitude under-modulated or 100% modulated N-phase displacement signals by N excitation-sensing coil-poles placed at phase-angle positions evenly divided by an odd number N (N≥5) over one period of electrical angle or mechanical angle, the common mode noise or un-modulated carrier signal component can be removed and two-phase orthogonal displacement signals are obtained by the differential synthesis, which is realized by the differential Op-amp circuitry. The values of the sensing resistors are conveniently determined by the ratio of the value of OP-amp feedback gain register to the corresponding synthesis coefficients.

The foregoing disclosures and explanations are for the generic multi-phase VR resolver topology in which each excitation-sensing coil is single-wound at each pole; however, other types of coil-windings can be used to achieve superior performances.

The Balance-Wired Multi-Phase Resolver

In the balance-wired multi-phase VR resolver, each single-wound N excitation-sensing coil in the generic N-phase VR resolver is subdivided into k number of coils, and the kX speed of rotor lobe is installed, where k is greater than or equal to 2. The k subdivided excitation-sensing coils are connected serially with alternating polarity. A magnetic flux balance is achieved between two coils having alternating polarities. Here, even-numbered k subdivided coils provide the full balanced flux; however, odd-numbered coils would still provide an almost balanced flux from the overall resultant flux layout of the odd-numbered N-phase on the stator. The k subdivided coils are aligned with every rotor lobe at the same electrical angle positions, and generate one phase-delayed displacement signal under the balanced flux. Thus, N sequentially phase-delayed and amplitude modulated displacement signals are obtained from N sets of k subdivided coils that are serially connected. The magnetic flux balance from multiple layers through the balance-wired coils results in a more precise position accuracy.

Figure 9A:
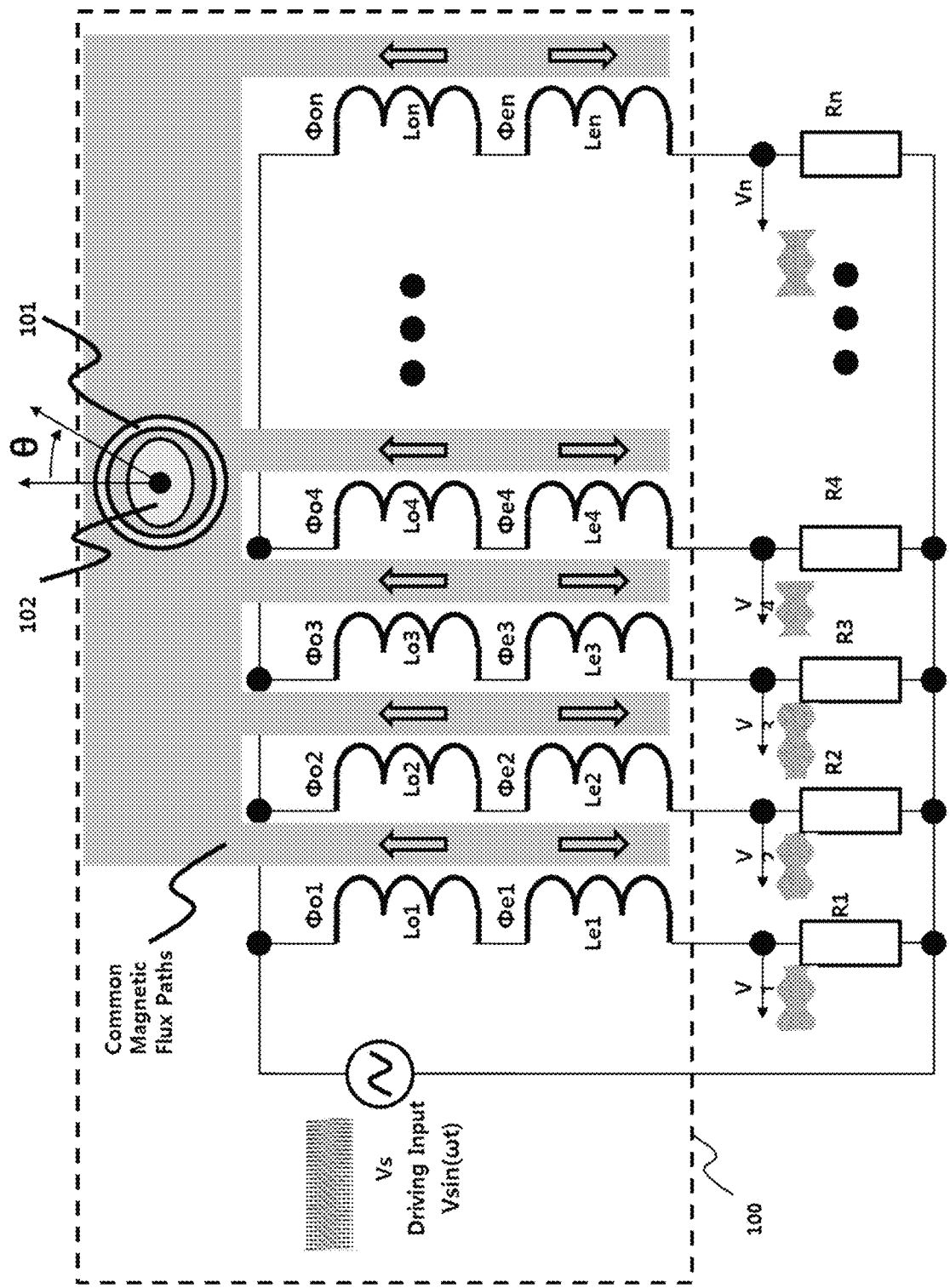
FIG. 9A illustrates an exemplary coil-winding of balance-wired N-phase VR resolver according to the present invention.

Compared with the single L1, L2, . . . , Ln excitation-sensing coil in FIG. 3A, in FIG. 9A, each coil is subdivided into two coils (k=2), Lo1 and Le1, Lo2 and Le2, . . . , Lon and Len. Physically, Lo and Le is positioned at symmetrically with 180° mechanical angle offsets. Although twice coil-windings are required compared to the generic single-wound resolver, the magnetic flux is balanced well with each other as the flux $\phi_{o1}$, $\phi_{o2}$, . . . , $\phi_{on}$ and the flux $\phi_{e1}$, $\phi_{e2}$, . . . , $\phi_{en}$ have the same magnitude, but 180° out of phase with each other, respectively. The topology of balance-wired multi-phase VR resolver offers a realization of the precise kX speed resolver.

When the resolver is configured to operate at kX speed, the total electrical angle is expanded to k*360° per one mechanical turn by the kX teeth rotor lobe. For example, when k is 2 for 2× teeth lobe, one mechanical turn (360°) yields two electrical cycles)(2×360°. Therefore, the subdivided k coils should be placed at the same electrical angle positions of the kX teeth rotor lobe.

Figure 9B:
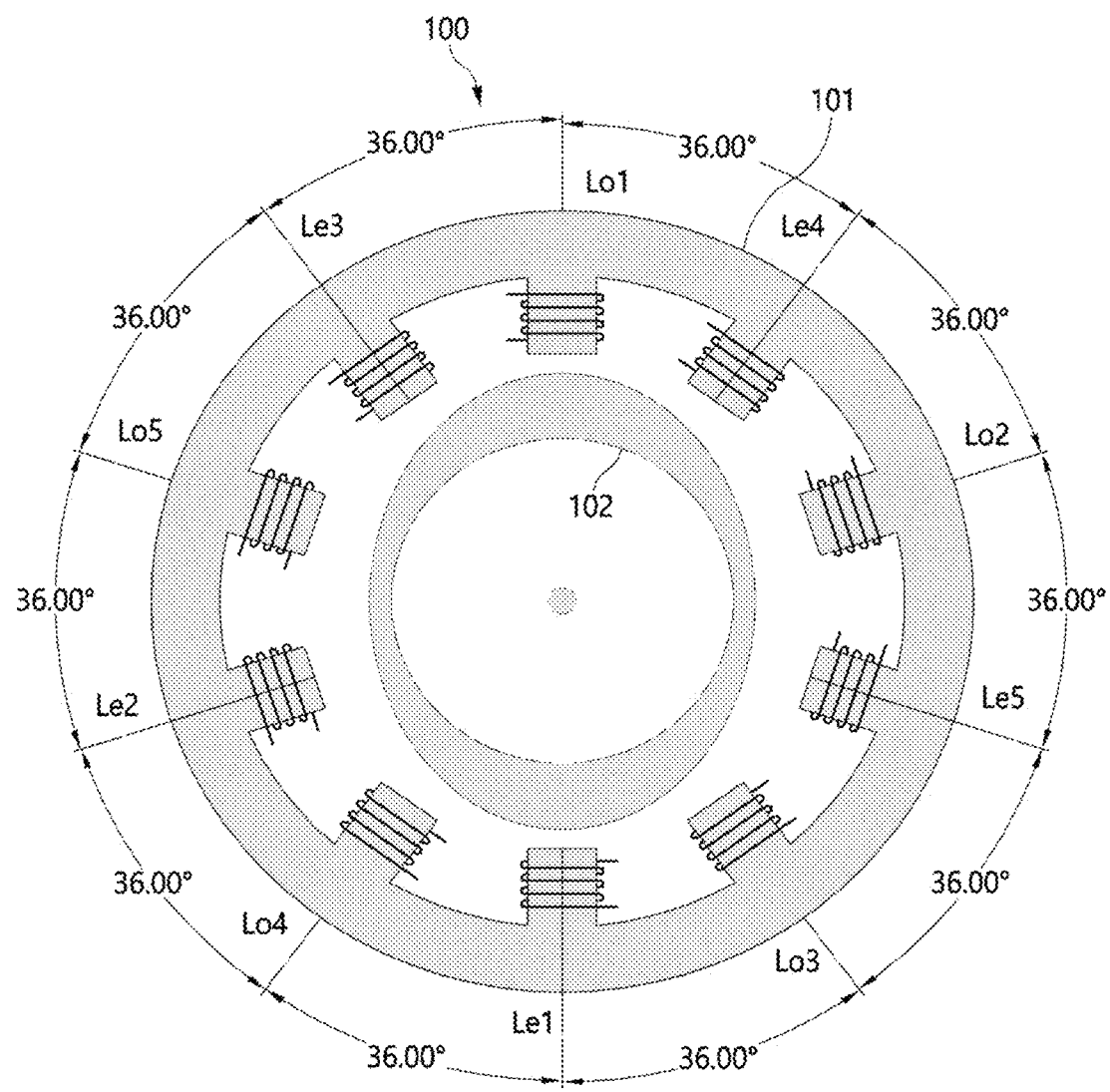
FIG. 9B illustrates an exemplary topology of balance-wired 5-phase VR resolver according to the present invention.

As an example, FIG. 9B illustrates the structure of the balance-wired multi-phase VR resolver for N=5 and k=2, where 2× sinusoidal-waveform rotor (102) lobe is installed. As can be seen in this figure, Lo1 of L1 is located at 0° and Le1 of L1 is symmetrically located at 180° position in mechanical angle (but both are 0° in electrical angle since the rotor lobe is 2×). Lo2 of L2 is located at 72° and Le2 of L2 is at 72+180=252° in mechanical angle (both 72° in electrical angle), and so on for L3, L4, and L5. The signal processing of the balance-wired multi-phase VR resolver is the same as that of single-wound case, as shown in FIG. 3B.

The balance-wired multi-phase VR resolver in FIG. 9B has the same electrical characteristic as that of the single-wound in FIG. 3B, but it provides a superior performance and relaxes the manufacturing tolerances of the rotor lobe.

In a balance-wired multi-phase WR resolver, each N sensing coil-poles of the N-phase WR resolver is subdivided into a plural number of coils that can be distributed along the stator such as to be magnetic flux balanced over the corresponding rotor installed.

The Dual Stator Balance-Wired Resolver

In the above balance-wired multi-phase VR resolver, all subdivided coils are distributed along the single magnetic flux path formed by a pair of stator and rotor. However, subdivided coils can be distributed along the multiple magnetic flux paths formed by multiple pairs of stators and rotors.

Figure 9C:
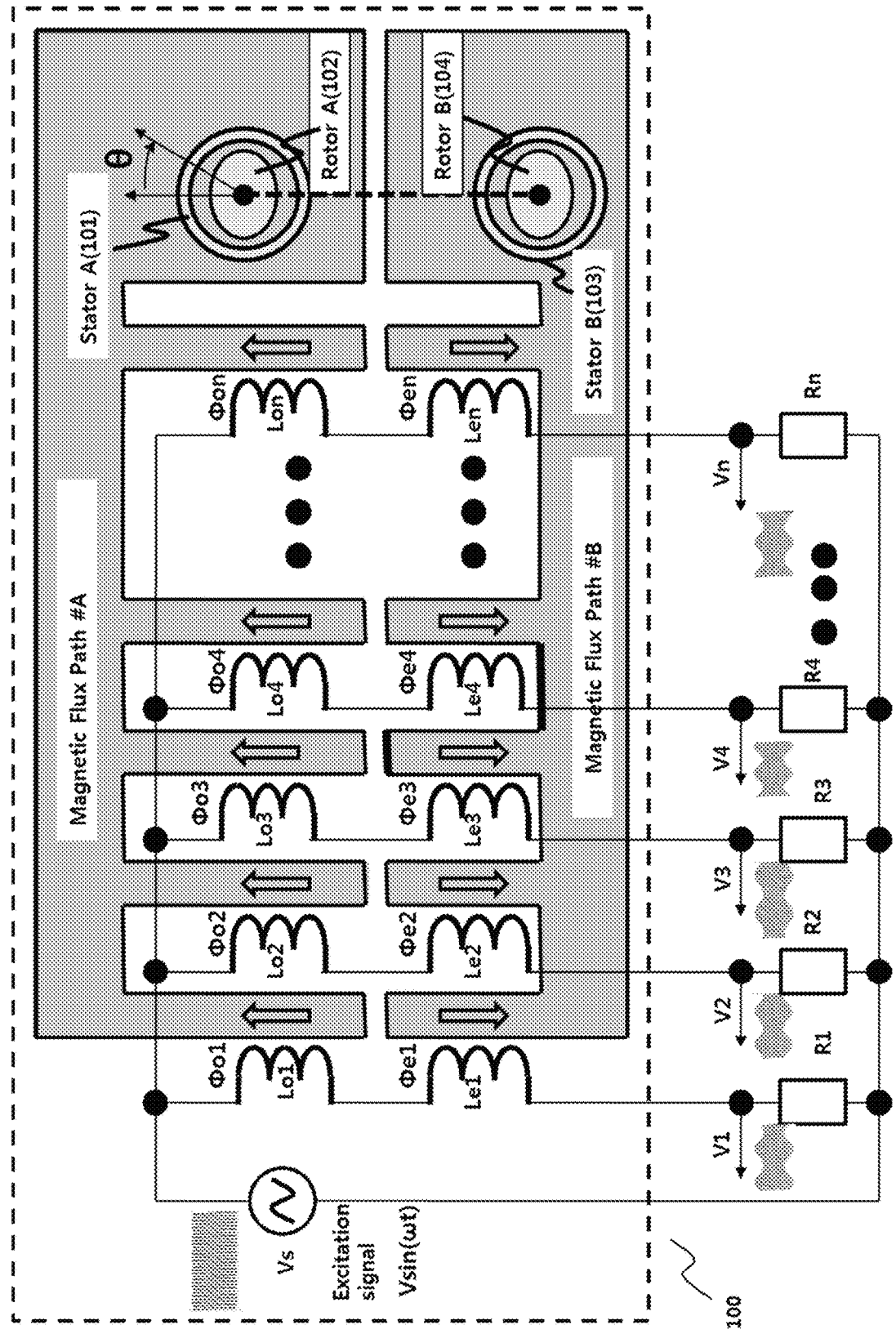
FIG. 9C illustrates an exemplary coil-winding of balance-wired multi-phase VR resolver having dual stators according to the present invention.

As an example, two (k=2) subdivided coils are separately placed on one pair of stators (101 and 103) on the shared axis and rotors (102 and 104) in FIG. 9C, where two subdivided coils are serially connected and placed at the same electrical angle position with an opposite electrical polarity. The rotor is composed of rotor A (102) and rotor B (104) that have an identical rotor lobe and share a common rotational body with the same electrical angle, and further can be integrated into a single rotor. A set of divided coils, Lo1, Lo2, . . . , Lon, generates flux $\phi_{o1}$, $\phi_{o2}$, . . . , $\phi_{on}$, such as the magnetic flux path #A formed by the stator A (101) and the rotor (102), whereas the other set of divided coils, Le1, Le2, . . . , Len, generates flux, $\phi_{e1}$, $\phi_{e2}$, . . . , $\phi_{en}$, such as the magnetic flux path #B formed by the stator B (103) and the rotor (104), where the dual magnetic flux paths are independently formed and balanced.

The advantage of employing dual stators is that aside from the desired displacement signals, all common mode noise induced from the directional external magnetic flux toward each coil pairs on the stators effectively cancel each other out. Therefore, the displacement signal without common mode noise is attained through each pair of subdivided coils on the dual stators over the dual paths of magnetic flux.

The Double-Wound Multi-Phase VR Resolver

Another type of multi-phase VR resolver topology to be disclosed is the double-wound coil-windings for each excitation-sensing coil. Each excitation-sensing coil in the generic single-wound multi-phase VR resolver is separated into the primary excitation coil and the secondary sensing coil.

Figure 9D:
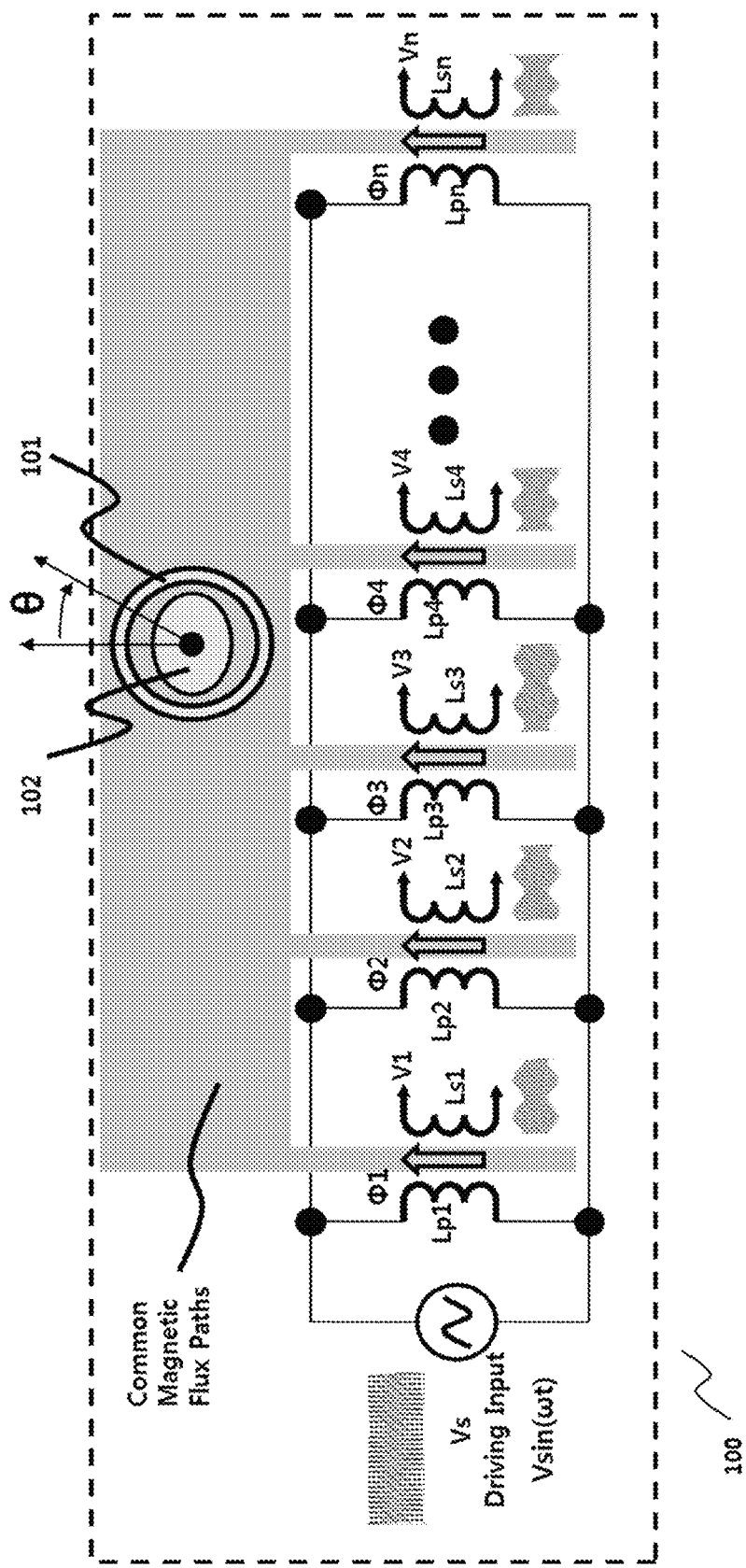
FIG. 9D illustrates an exemplary coil-winding of double-wound N-phase VR resolver according to the present invention.

Referring to FIG. 9D, an exemplary schematic circuit diagram of the double-wound multi-phase VR resolver is drawn, where N excitation-sensing coils are separated into N primary excitation coils (Lp1, Lp2, . . . , Lpn) and N secondary sensing coils (Ls1, Ls2, . . . , Lsn), thereby achieving Galvanic isolation by completely isolating the electric paths of the primary coils and the secondary coils.

With a certain ratio of number of winding turns between the primary and the secondary coils, all primary coils (or all secondary coils) have the same number of winding turns with an identical electrical polarity. The flux balance is maintained within all primary excitation coils and within all secondary sensing coils independently.

As the rotor rotates, the phase-delayed amplitude modulated displacement signals, $V_1$, $V_2$, . . . , $V_N$, are sensed at the secondary sensing coils, Ls1, Ls2, . . . , Lsn, under the excitation of driving signal at the primary coils, Lp1, Lp2, . . . , Lpn, respectively.

The Multi-Phase Variable Inductance Resolver

The multi-phase VR resolvers so far disclosed are constructed in a single body stator, integrating all coil-poles in one contiguous stator body. The magnetic flux generated by excitation or sensing coils is shared commonly among all magnetic circuits. However, the odd-numbered N coil-poles of the multi-phase VR resolver topology has a distinct characteristic such that the flux generated from each coil-pole does not interfere with the flux generated from the other coil-poles. Each coil-pole, which exists and operates independently, on the stator, can be placed non-contiguously from the other coil-poles. Consequently, even though N coil-poles are separated into N physical stator-bodies, it still legitimately generates N phase-delayed displacement signals upon the varying inductance at each coil-pole, as long as a suitable magnetic flux variation is maintained between the N separated stators and the rotor lobe.

Figure 9E:
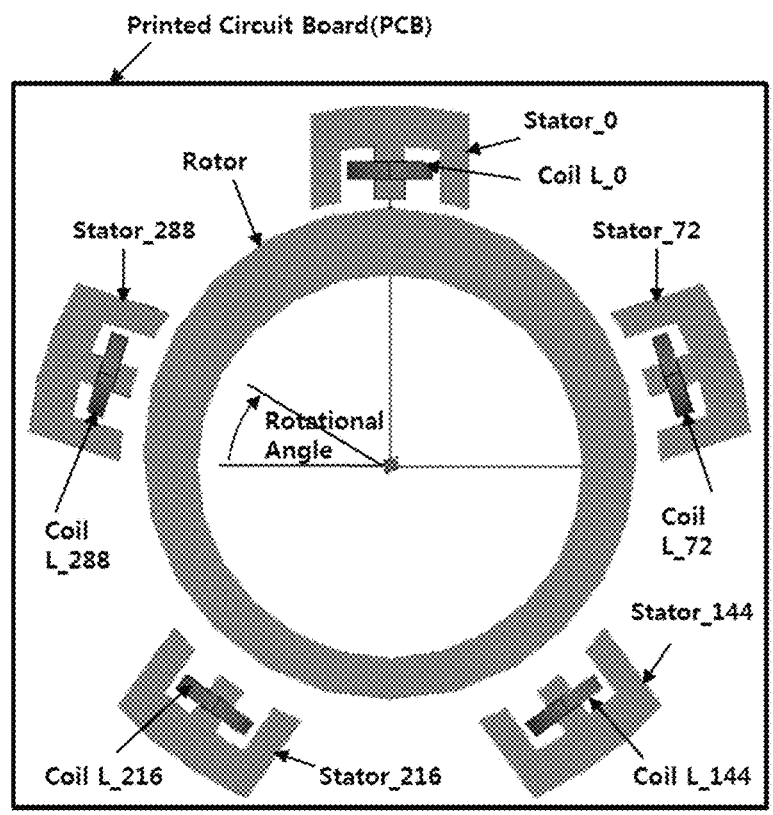
FIG. 9E illustrates an exemplary topology of 5-phase variable inductance resolver according to the present invention.

In FIG. 9E, as an exemplary illustration, 5-phase variable inductance resolver configuration is shown, where 5 stators are disjointly placed on the printed circuit board (PCB). It comprises a rotor and 5 separated stators (Stator_0, Stator_72, Stator_144, Stator_216, Stator_288) on which 5 excitation-sensing coils (Coil_0, Coil_72, Coil_144, Coil_216, Coil_288) are wound. The magnetic circuit formed at each coil-pole stays between each stator and rotor lobe, independently from the other stators.

Figure 9F:
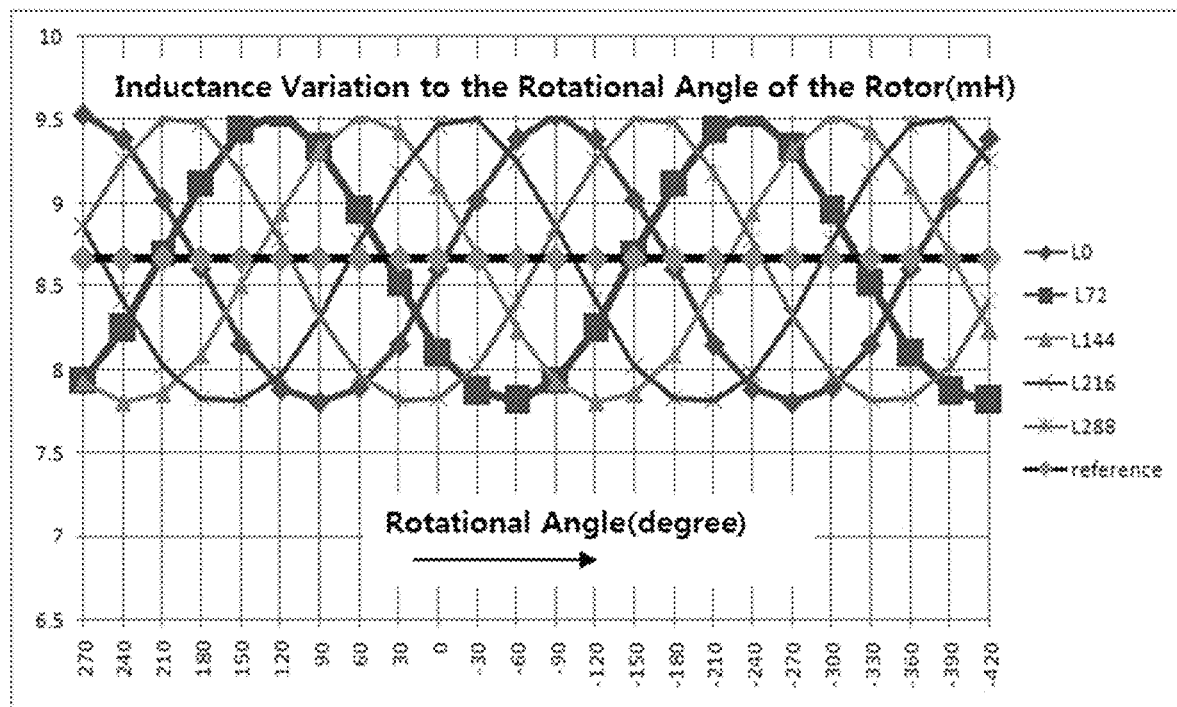
FIG. 9F plots exemplary inductance variations of the inductive resolver of 5-phase variable inductance resolver of FIG. 9E.

The separated stators can be fixed either on the PCB or around the rotor through other structures. FIG. 9F shows an exemplary inductance variation of the inductive resolver with 5 coil-poles on the separated stators that is successively 72° shifted with varying inductance between 7.8 mH~9.5 mH to the rotational angle of the rotor lobe at each coil.

When stators or rotors are implemented on the PCB, stator coils can be replaced by printed coil patterns. The stator cores can be replaced by other means that provide the optimal airgap and permeance depending on design factors such as the stator structure and its materials, the rotor shapes and its materials, or the excitation frequency that is as high as several hundred Hz to several MHz. Therefore, various kinds of multi-phase inductance resolvers are feasible to attain effective multi-phase displacement signals through varying inductance between the stator and the rotor.

Figure 9G:
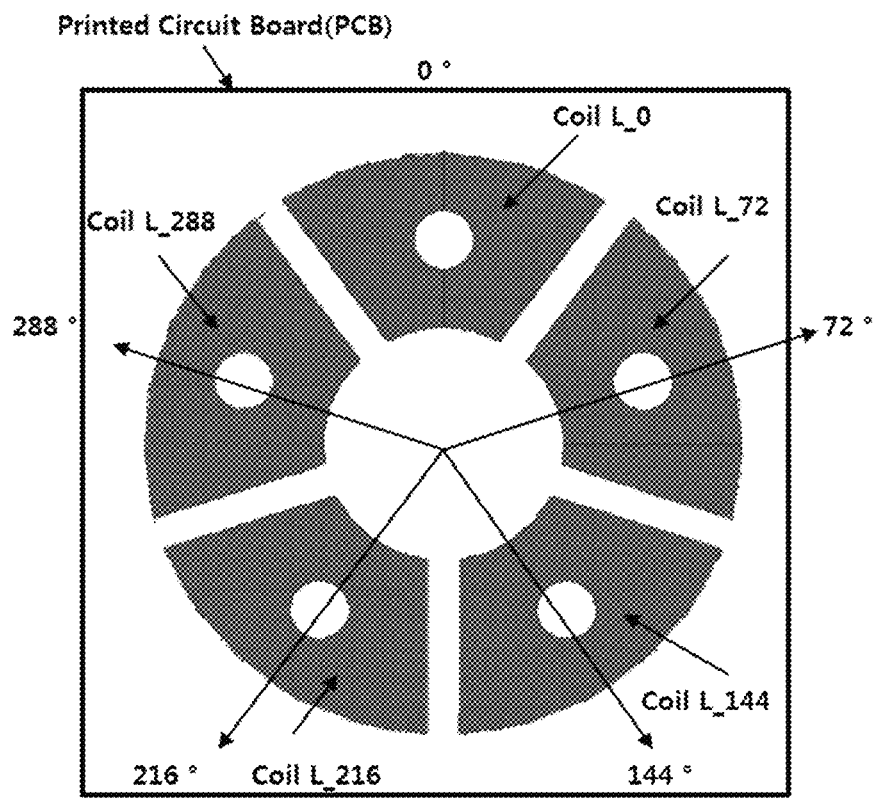
FIG. 9G illustrates an exemplary PCB type stator for the 5-phase variable inductance resolver according to the present invention.
Figure 9H:
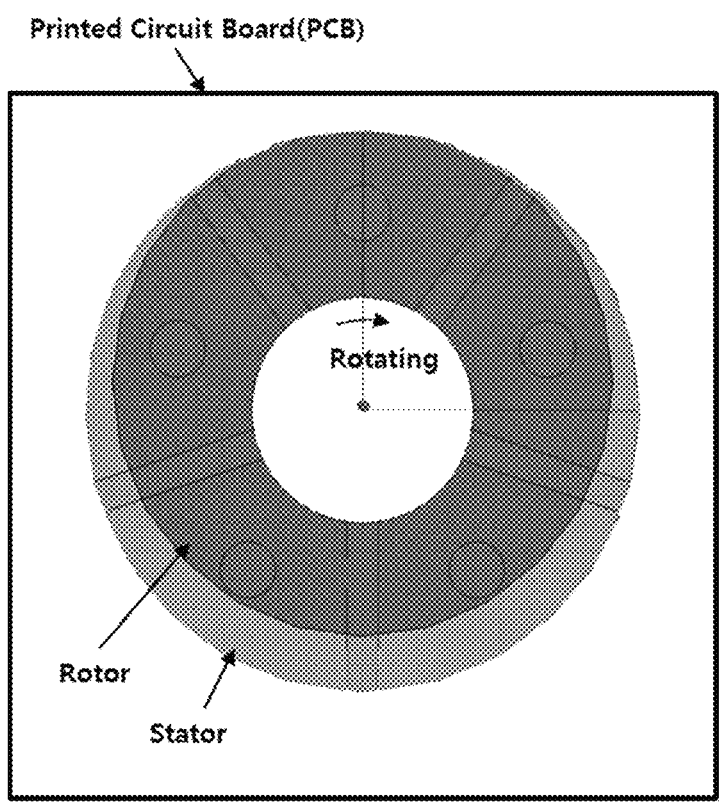
FIG. 9H illustrates an exemplary 1× rotor lobe installed in the PCB-type 5-phase variable inductance resolver according to the present invention.

FIG. 9G illustrates an exemplary PCB type stator, in which 5 printed coil patterns having a circular sector shape are evenly placed with 72° phase-angle on the PCB, in which iron plates having an appropriate permeability may be attached on the other side of the board. In FIG. 9H, an exemplary 1× rotor lobe in combination with the stator implemented by coil patterns on PCB is illustrated, where the rotor lobe is attached to the stator PCB in parallel with a certain airgap.

The Multi-Phase Magnetic Resolver

The topology of odd-numbered N sensors and differential synthesis is also applicable to the magnetic resolver (or encoder) having magnetic position sensors such as magneto-electric or magneto-resistive sensors. The N magnetic position sensors are placed at evenly placed electrical angle positions over one mechanical or electrical period of the stator, where at least one electrical period is formed on the stator by magnets of the rotor (or mover). The N sequentially phase-delayed displacement signals, where N is an odd number greater than or equal to 5, are attained and the two-phase orthogonal displacement signals are synthesized by the differential synthesis module, where the common mode noise induced from the external disturbance flux is also removed by common mode rejection of the differential OP-amp circuitry. As electrical noise is very critical in resolver applications, the differential synthesis is a very effective solution against the heavy electrical noise.

Figure 9I:
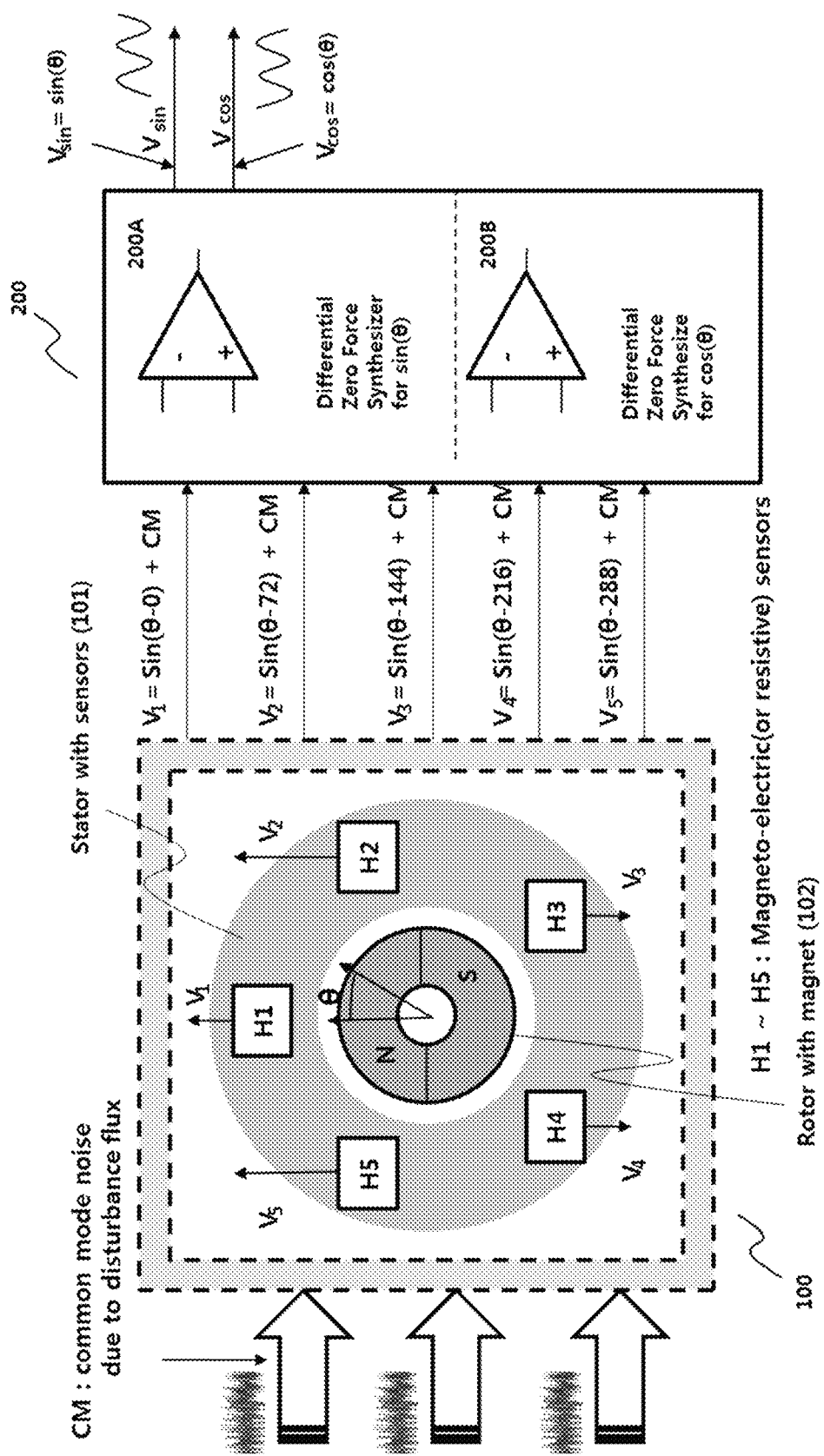
FIG. 9I illustrates an exemplary functional diagram of the 5-phase magnetic resolver according to the present invention.

FIG. 9I illustrates a functional diagram of the typical 5-phase magnetic resolver. As the rotor being displaced, sequentially 5 phase-delayed displacement signals, V1, V2, V3, V4, and V5 are sensed from 5 sensors (H1, H2, H3, H4, and for H5) upon the magnetic variations of the resolver body (100). The differential synthesis module (200) comprises a differential sine synthesis module (200A) and a differential cosine synthesis module (200B) in FIG. 9I, which has the same circuitry in FIG. 7 (or FIG. 8). Further, in some specific applications such as a linear resolver, the sensors, H1~H5, can be placed on the rotor (mover) to detect displacement signals upon the variations of magnets of the stator.

Rotor Lobe of Quasi-Square Waveform Saliencies

As rotor lobe saliencies directly affect the shape of resolver output signal, the rotor lobe requires a sophisticated design and a high precision manufacturing process in order to produce a precise displacement signal.

U.S. Pat. No. 6,137,204 discloses a curved shaped rotor lobe whose airgap permeance varies in accordance with a sinusoidal function as the rotor rotates. U.S. Pat. No. 7,030,532 B2 discloses a more complicated equation in designing rotor lobe saliencies that achieves an airgap having a pure sinusoidal varying property. However, a sophisticated shape of rotor saliencies would entail either an increase in manufacturing cost or problems in quality control, especially for 1× rotor lobe.

In International Application Publication No. WO 2020/149489, the following are disclosed: when N phase-delayed displacement signals are quasi-square waveforms that are sensed on magnetic sensors, and the sensed signals are ZF transformed, then the two-phase orthogonal displacement signals are stair step signals, of which the Lissajous graph is the shape of a 2N-gon; an accurate position information is determined after compensating the error signal between the 2N-gon and the pure circle by a piece-wise linear approximation technique, which is known a priori.

Figure 10A:
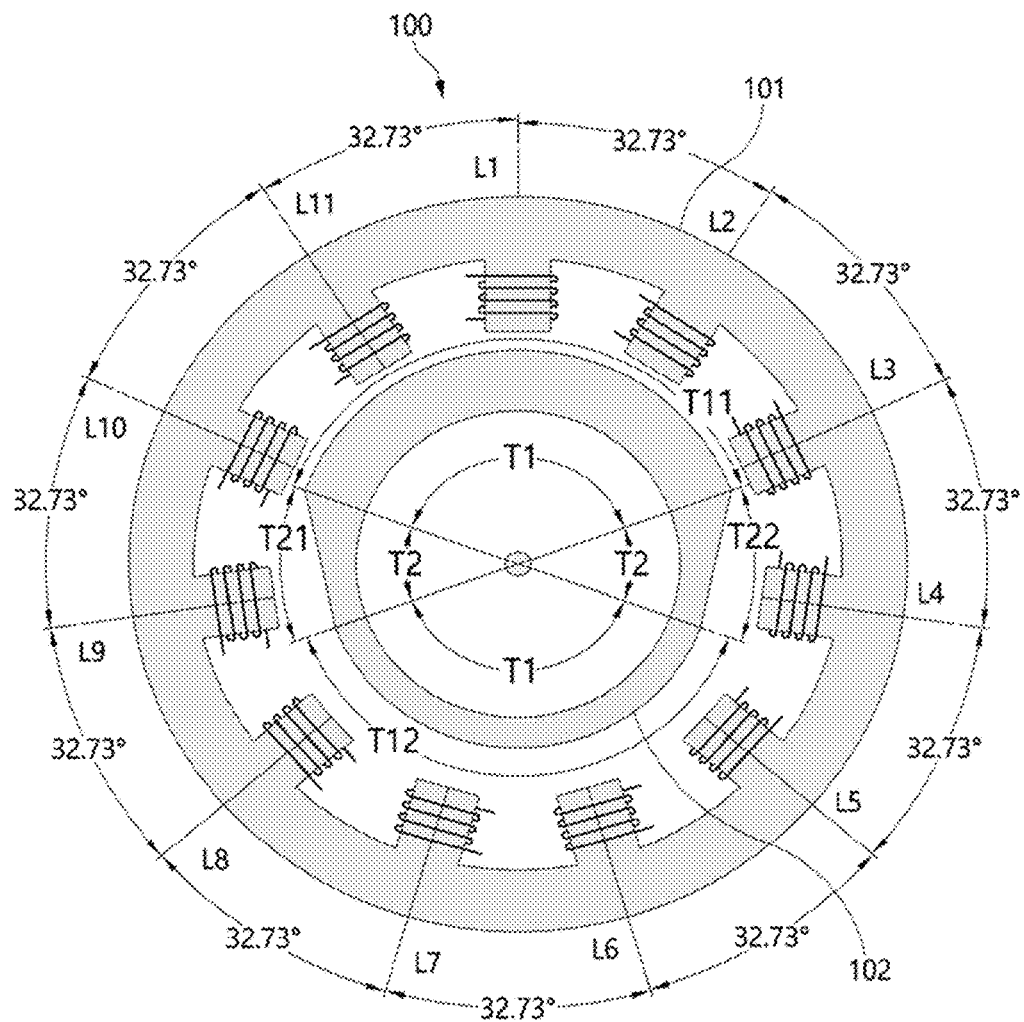
FIG. 10A illustrates an exemplary topology of 11-phase VR resolver installed with 1× quasi-square waveform rotor lobe according to the present invention.

The resolver is very unique and delicate analog equipment that is vulnerable to any impairments, interference or noise. However, the rotor lobe having quasi-square waveform saliencies produces a digital type signal that is generally more robust under harsh environment. In this regard, a specific shape of rotor lobe is disclosed to produce a quasi-square waveform signal (or trapezoidal signal). An exemplary rotor lobe of the quasi-square waveform is shown in FIG. 10A that is installed in single-wound 11-phase VR resolver topology.

The rotor lobe circumference having quasi-square waveform saliencies is largely divided into 2 sections; a constant airgap (between the stator and rotor lobe) section of T1 (arc shape), and a linearly varying airgap section of T2 (slope shape). T1 can be divided into two sections, T11 and T12, which have different radii from each other. T11 has a larger radius than T12, so the signal amplitude induced by T11 is bigger than the one by T12. T2 can also be divided into two sections, T21 and T22, both of which have identical slopes, but in opposite directions. T21 and T22 are symmetrically located at opposite sides. Since the T21 and T22 airgap is narrower, the signal induced by T21 and T22 varies quickly at the opposite direction.

Figure 10B:
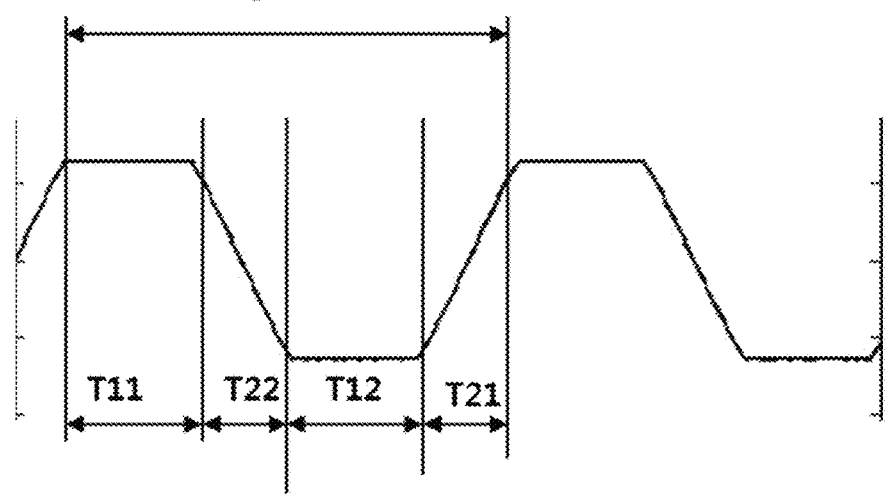
FIG. 10B illustrates an expected envelope of quasi-square waveform displacement signal by the quasi-square waveform rotor lobe according to the present invention.

The resultant quasi-square (or trapezoidal) waveform signal is shown in FIG. 10B. As the rotor rotates, the arc shaped section (T11 or T12) of the rotor lobe produces either a higher or lower level signal upon the two different radii; T11 produces the higher level signal and T12 produces the lower level signal. The slope shaped section (T21 or T22) produces either a rising edge signal (T21) or falling edge signal (T22).

Figure 10C:
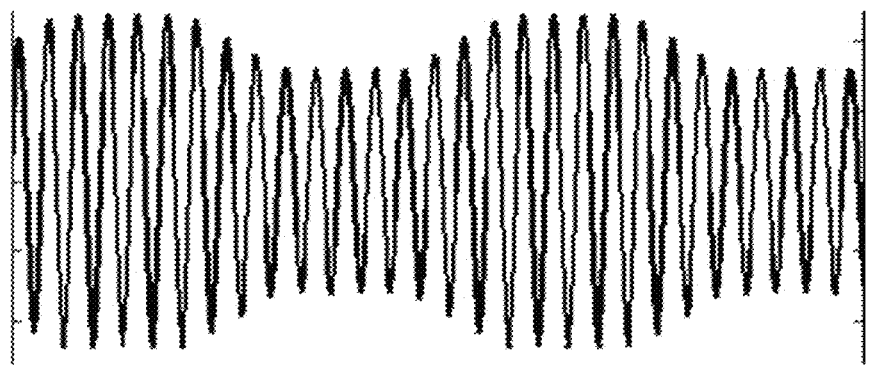
FIG. 10C illustrates an exemplary amplitude modulated quasi-square waveform displacement signal by the quasi-square waveform rotor lobe according to the present invention.

The signal sensed by the rotor lobe of quasi-square waveform saliencies (hereinafter referred to as "quasi-square waveform rotor lobe") is an amplitude modulated signal by the excitation carrier as shown in FIG. 10C, but its envelope is quasi-square waveform as shown in FIG. 10B. The 11-phase VR resolver will generate successively 32.73° phase-delayed displacement signals, $V_1, V_2, \ldots, V_{11}$, of which envelopes are the quasi-square waveforms.

To obtain the two-phase orthogonal displacement signals, those 11-phase displacement signals, $V_1, V_2, \ldots, V_{11}$, are fed into the differential synthesis module (200) in FIG. 5. The resultant synthesis equation is calculated from the ZF Transformation as follows:

$$V\sin = 0.1820*V_1 + 0.1531*V_2 + 0.0756*V_3 - \qquad \text{EQ. (6)}$$
$$0.0258*V_4 - 0.1191*V_5 - 0.1746*V_6 - 0.1746*V_7 -$$
$$0.1192*V_8 - 0.0259*V_9 + 0.0756*V_{10} + 0.1526*V_{11}$$
$$V\cos = 0.0983*V_2 + 0.1653*V_3 + 0.1798*V_4 +$$
$$0.1372*V_5 + 0.0511*V_6 - 0.0513*V_7 -$$
$$0.1374*V_8 - 0.1798*V_9 - 0.1652*V_{10} - 0.0989*V_{11}$$

Figure 10D:
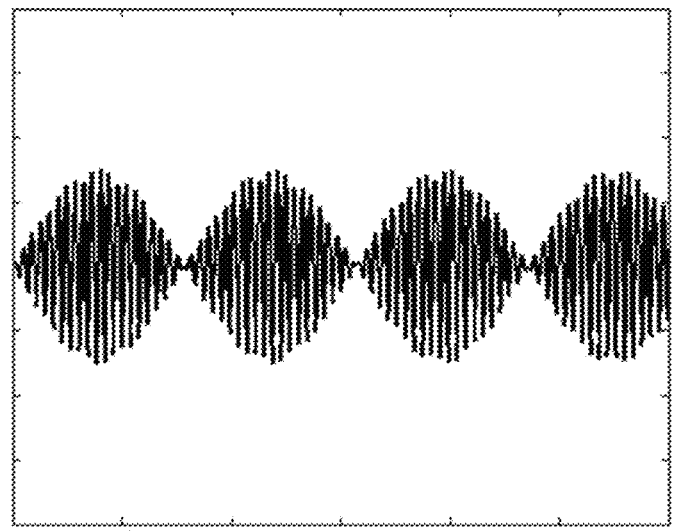
FIG. 10D illustrates an exemplary sine orthogonal signal (V sin), output of differential synthesis module (200A) when quasi-square waveform rotor lobe is installed.
Figure 10E:
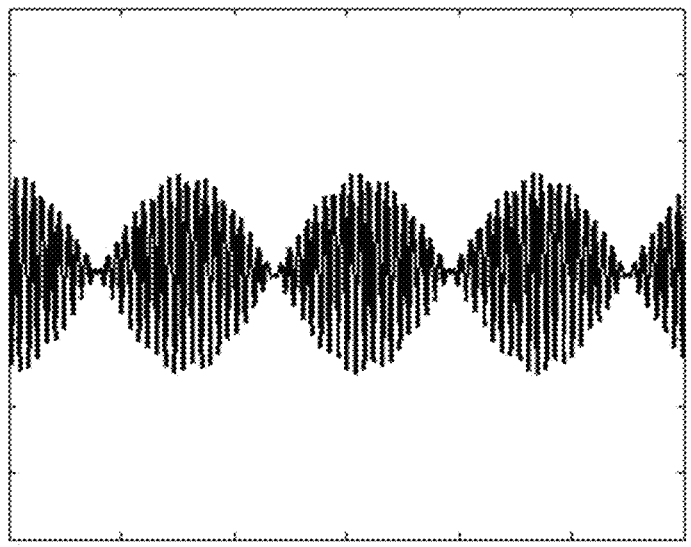
FIG. 10E shows an exemplary cosine orthogonal signal (V cos), output of differential synthesis module (200B) when quasi-square waveform rotor lobe is installed.
Figure 10F:
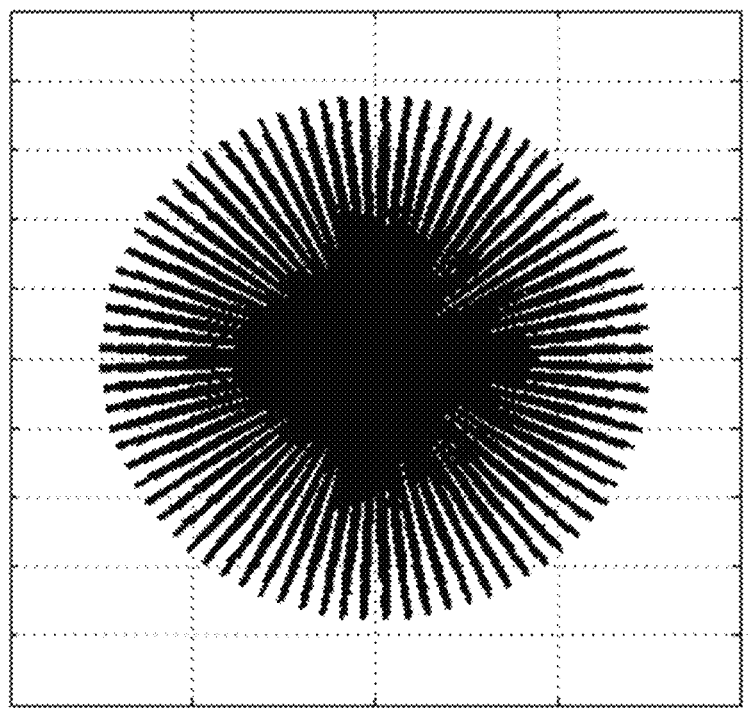
FIG. 10F shows a Lissajous graph of two-phase orthogonal displacement signals when quasi-square-waveform rotor lobe is installed.
Figure 10G:
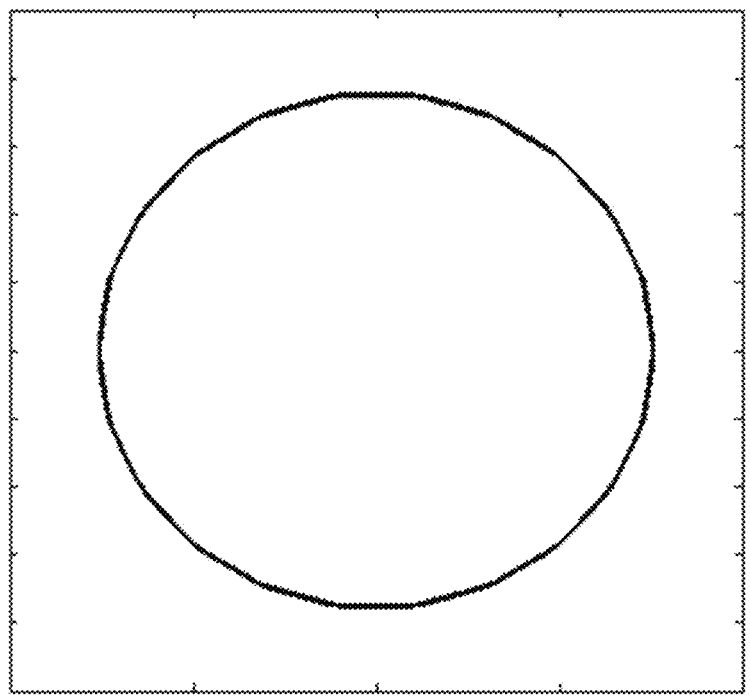
FIG. 10G shows a Lissajous graph of two-phase orthogonal displacement signals after removing the carrier signal component when quasi-square waveform rotor lobe is installed.

The calculated orthogonal V sin and V cos signal waveform of EQ. (6) is shown in FIGS. 10D and E, respectively, of which envelope is very close to sin(θ) and cos(θ) signal, respectively. To check the orthogonality of the V sin and V cos signals, the Lissajous graph is drawn in FIG. 10F, which shows that the outline of the Lissajous graph is a circle shape. The Lissajous graph after removing the carrier is drawn in FIG. 10G, and as expected, the shape is more precisely a 22-gon (2×11-gon). Further compensation processing can improve the accuracy of position detection in the orthogonal signals as noted earlier.

Figure 10H:
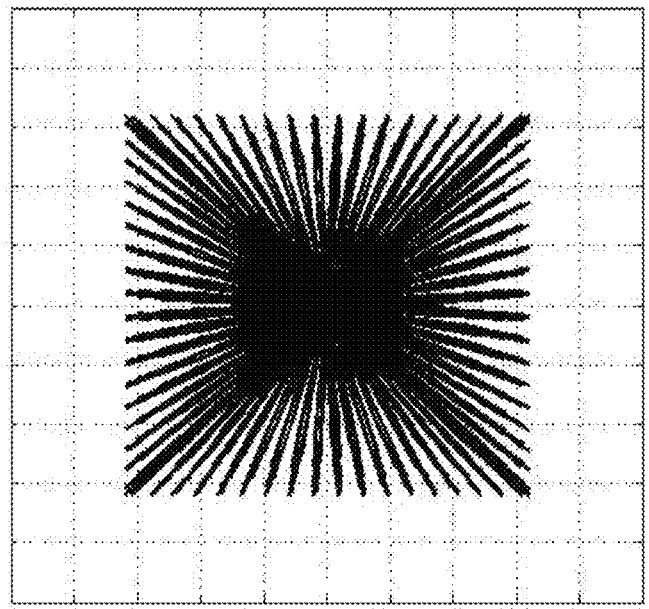
FIG. 10H shows a Lissajous graph of two-phase orthogonal displacement signals directly obtained from the conventional VR resolvers when quasi-square waveform rotor lobe is installed.

As a reference, in FIG. 10H, the Lissajous graph of two quasi-square wave orthogonal signals is drawn, which are directly obtained from the conventional VR resolvers. As expected, its shape is quite close to the square, which cannot produce any meaningful absolute position information.

Figure 11A:
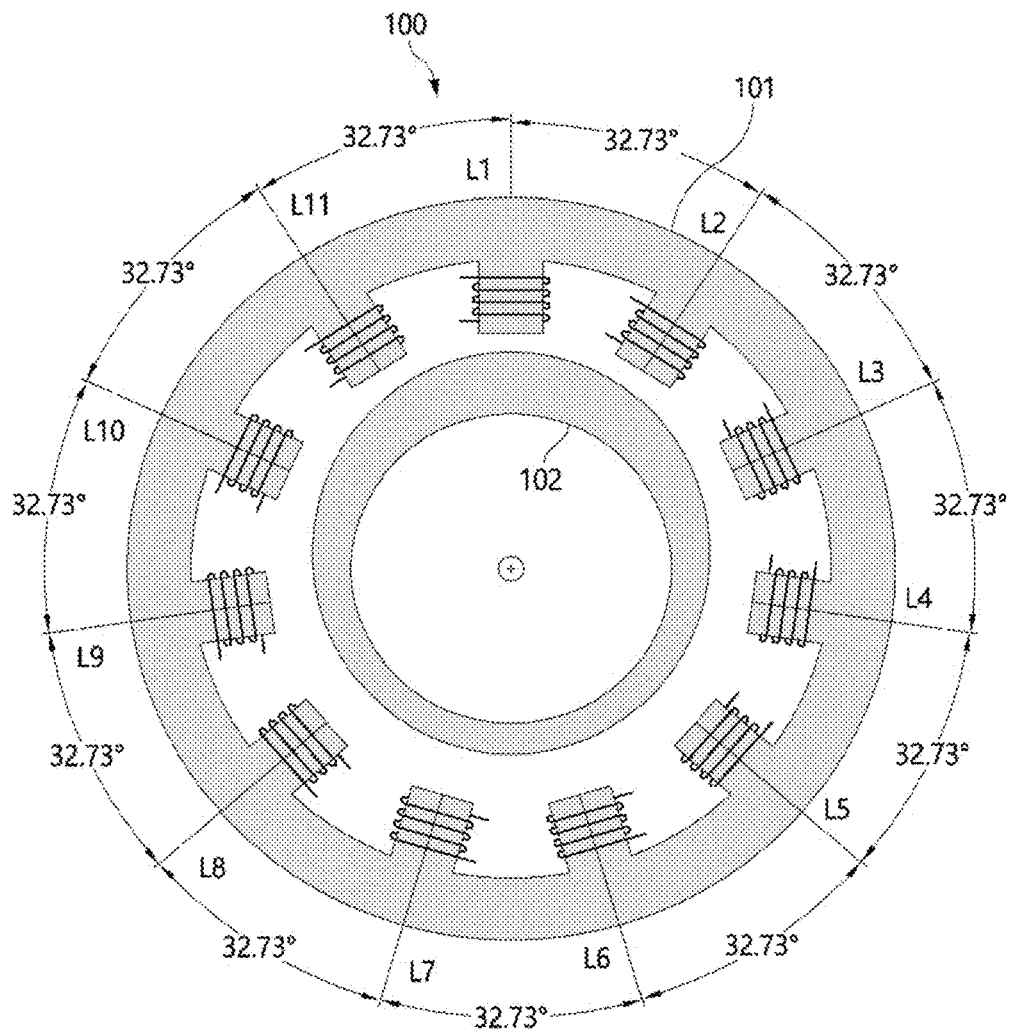
FIGS. 11A to 11J illustrates a topology of multi-speed 11-phase VR resolver when 1×~10× sinusoidal-waveform rotor lobe, respectively, is installed according to the present invention.
Figure 11B:
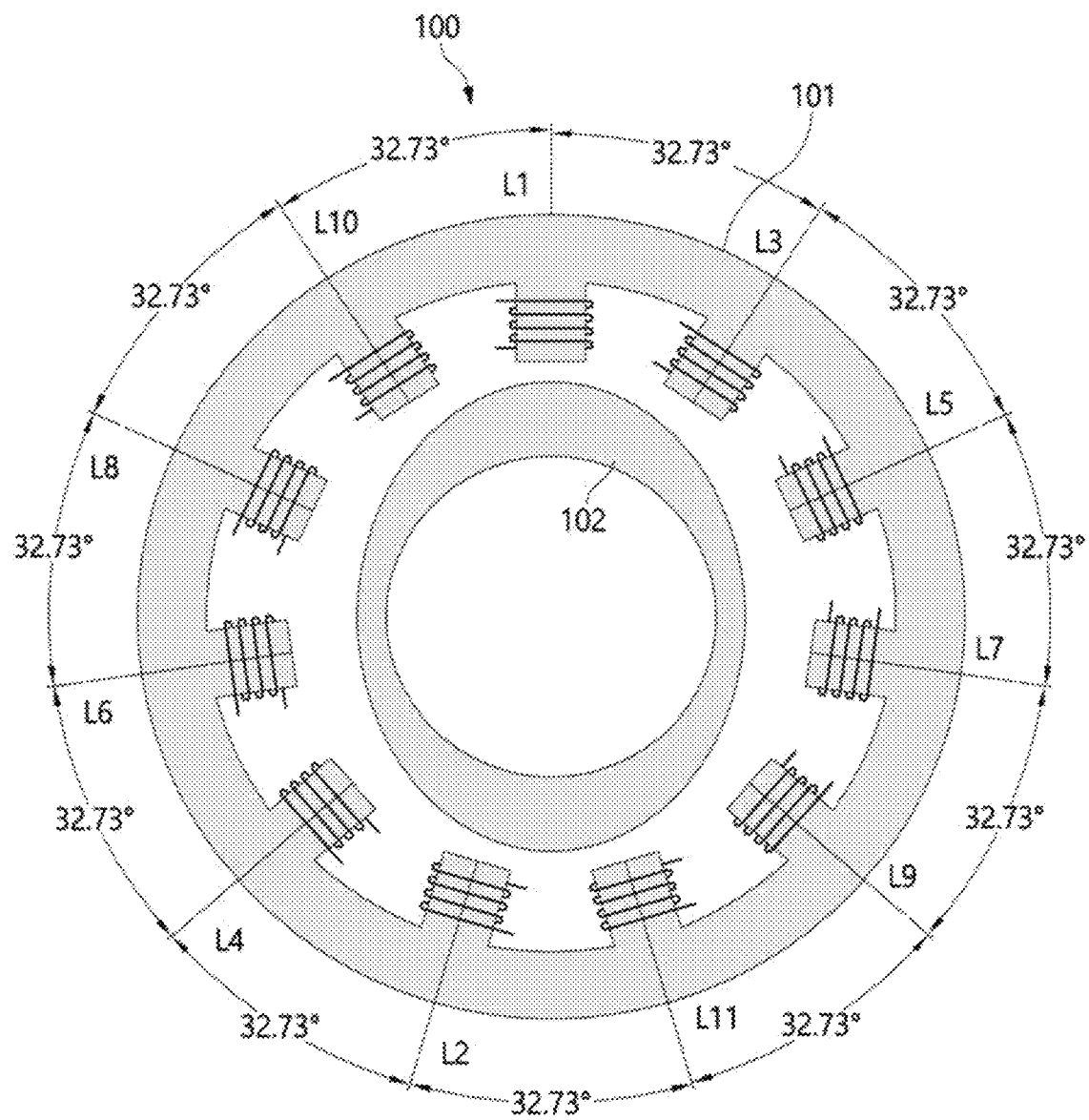
Figure 11C:
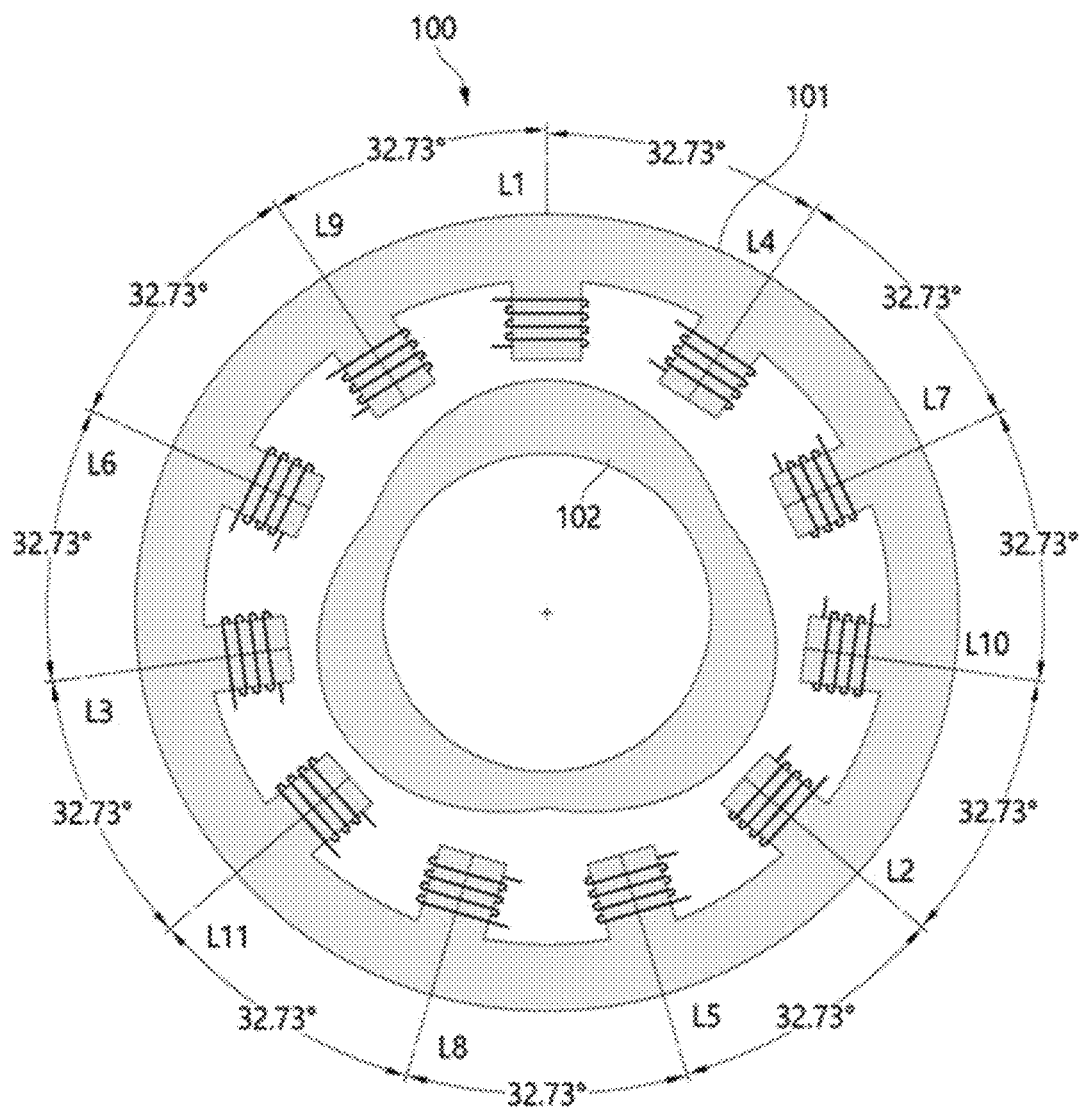

In FIG. 11A, the conventional rotor (102) lobe whose saliencies produce a sinusoidal signal (hereinafter referred to as "sinusoidal-waveform rotor lobe") is installed in single-wound 11-phase VR resolver. Certainly, a well-designed sinusoidal-waveform rotor lobe would produce a more precise sinusoidal signal, which results in more accurate position detection. However, when taking into consideration the difficulties in manufacturing a well-grounded sinusoidal-waveform rotor lobe, the quasi-square waveform rotor lobe is more advantageous.

The Multi-Speed (kX) Multi-Phase VR Resolver

As the number of coil-poles increases, a superior performance of the multi-phase VR resolver is expected. A higher speed of kX multi-phase VR resolver is preferred as well in order to achieve a higher accuracy of position detection.

In some applications, however, the multi-phase VR resolver needs to be operated at a higher speed of kX without increasing the number of coil-poles. In this regard, a certain type of multi-phase VR resolver topology can be constructed.

Usually in conventional resolvers, the matched configuration of the stator and the rotor lobe is required for the kX speed realization, and the kX speed operation is attained by employing the rotor lobe whose saliencies produce k-times of electrical period per one mechanical turn. This kind of approach makes it hard to install a various kX speed of rotor interchangeably in a fixed stator configuration because a particularly designed electrical angle deviation is necessary between each stator coil-pole and the angle of rotor lobe saliencies. However, the angle deviation between the rotational mechanical angle of the rotor lobe and the electrical angle is limited to some specific values, where the electrical angle is formed by the coil-winding configuration of the excitation coil, sine sensing coil, and cosine sensing coil. In X. Ge et al. ("A Novel Variable Reluctance Resolver with Nonoverlapping Tooth-Coil Windings," IEEE Trans. Energy Conversion, vol. 30, no. 2, June 2015), for instance, a VR resolver operated at three kinds of speed in the same stator configuration is realized by introducing a configuration of nonoverlapping tooth-coil windings on the stator.

On the other hand, the multi-phase resolver topology flexibly realizes various kX speeds by simply installing the rotor lobe of k teeth (saliencies) in a fixed stator configuration. One restriction is that when the kX (k is less than N) speed is considered in the N-phase VR resolver configuration, the angle between the rotor teeth (saliencies) becomes D=360°/k, then D cannot be an integer multiple of phase-division angle (360°/N). In other words, when N is an odd number, 1x~(N−1)X speed of rotor lobe saliencies are available, except for the speed of N's non-trivial divisors and their multiples (or equivalently, k cannot be a non-trivial divisor of N and k cannot be a multiple of any non-trivial divisor of N).

As an exemplary configuration, FIG. 11A shows the 1× VR resolver with N=11 coil-poles on the stator, in which any speed (k=1~10) of the rotor lobe can be installed interchangeably since N=11 is a prime number. FIGS. 11A to J illustrate all possible 1×~10× speeds of 11-phase VR resolver configurations installed with rotor lobe having 1~10 teeth (saliencies). There are k teeth (saliencies) at 360°/k phase-angle positions in one mechanical turn, resulting in no phase overlap with phase-division angle of the stator coil.

As the electrical angle is expanded by k*360° per one stator mechanical turn in the kX speed resolver, the electrical angle needs to take modulo 360° when the angle is over 360°. Therefore, the signal mapping from the coil-pole position to the differential ZF synthesis module, namely L1, L2, ..., L11 to OP-amp input index $V_1, V_2, ..., V_{11}$ needs to be shifted according to k in EQ. (6). Those shifted $V_1, V_2, ..., V_{11}$ signals are differentially synthesized (200) in the same way the 1× multi-phase VR resolver does. The resolver transfer ratio (K) in EQ. (2) also varies as the teeth number k of rotor lobe varies.

Since the design and manufacturing of the sinusoidal kX speed rotor is complex, the kX speed quasi-square waveform saliency rotor lobe can also be advantageously used as described in the foregoing sections.

Additionally, for some applications, the resolver needs to operate at tens of multiple speeds on a small size stator that cannot incorporate many coil-poles due to its limited space. In this case, referring to the 5-phase VR resolver in FIG. 11K, the angle between the stator teeth (101a) and rotor teeth (102a) is configured to be successively $\frac{1}{5}^{th}$ period deviated at each coil-pole tooth.

When the kX speed of N-phase resolver is considered, one rotor tooth is regarded as one electrical period of 360°, and the teeth on each stator coil are constructed such that the angle between the rotor teeth (102a) and the stator teeth (101a) is successively 0/Nth, 1/Nth, 2/Nth, 3Nth, ..., to $$\frac{N-1}{N}th$$

teeth period delayed through N stator coil-poles placed around the stator.

Figure 11D:
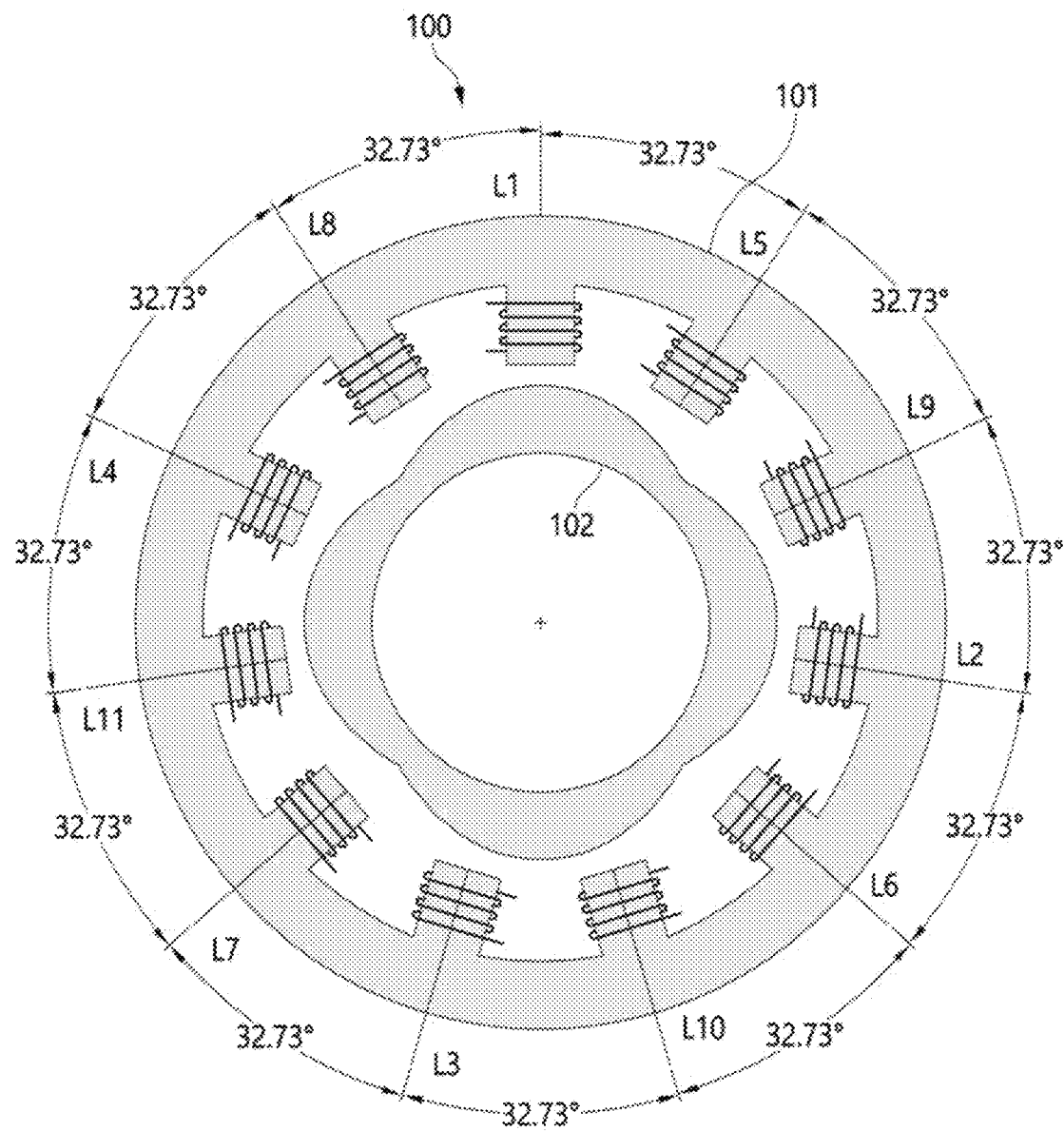
Figure 11E:
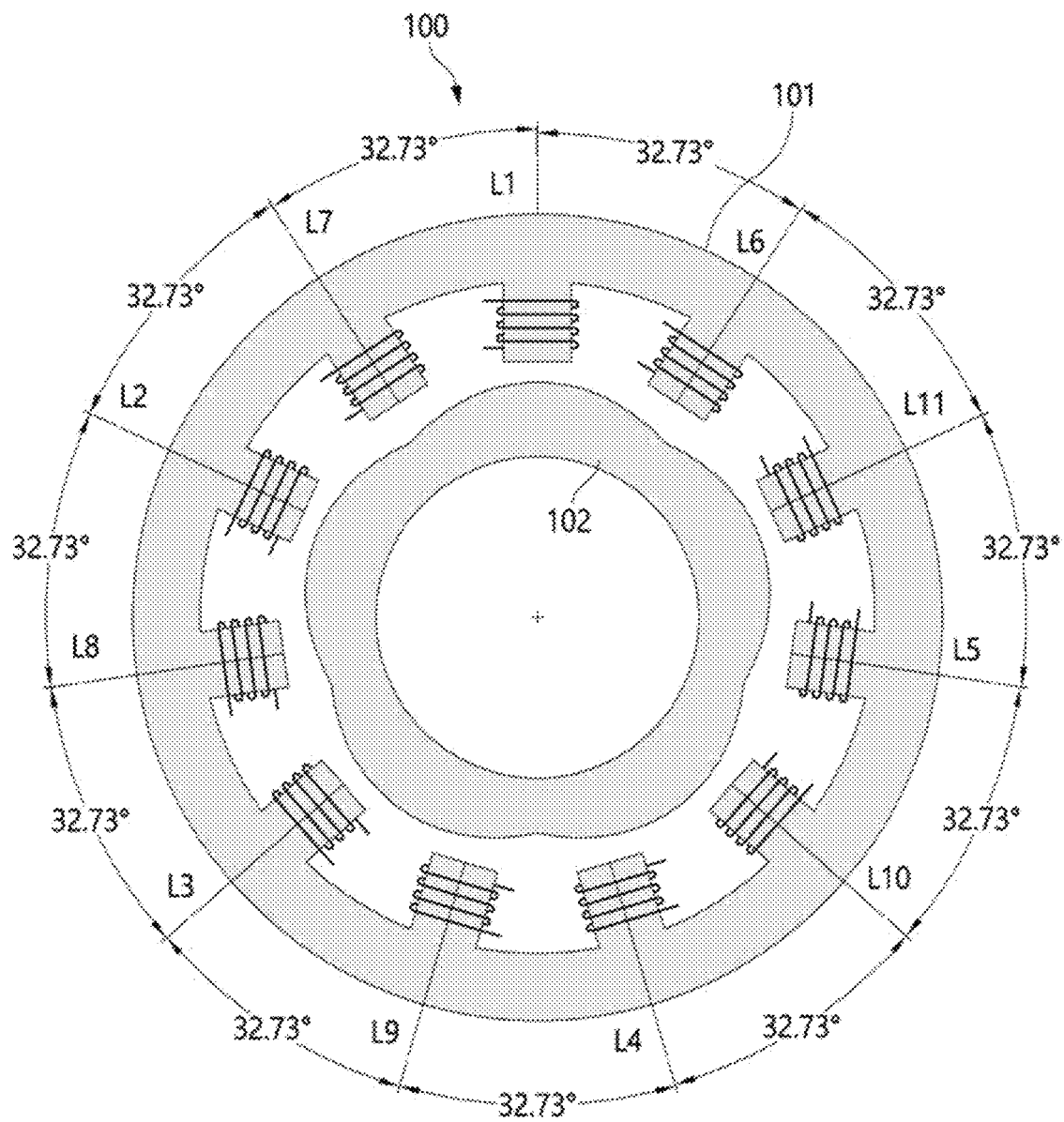
Figure 11F:
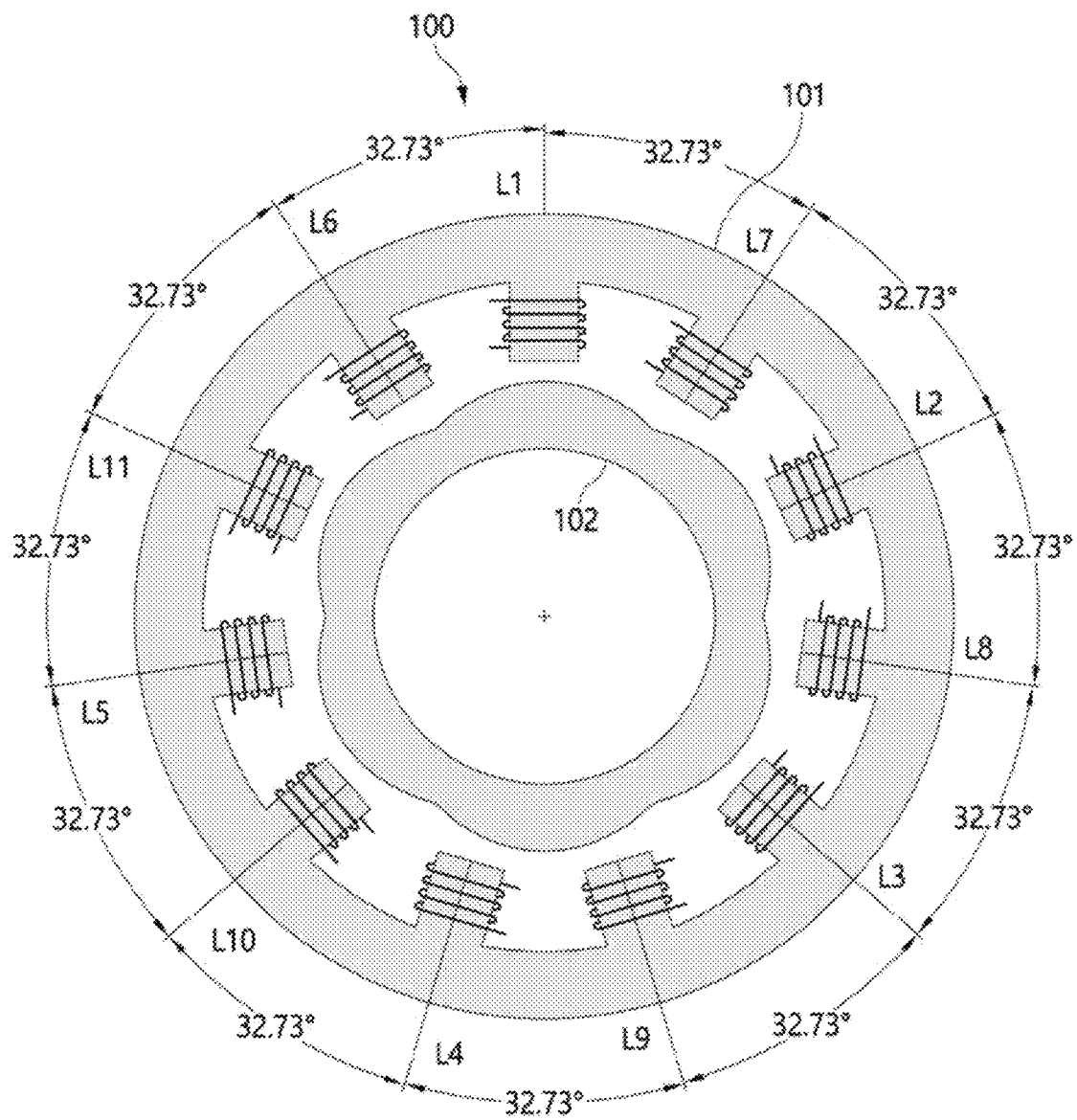
Figure 11G:
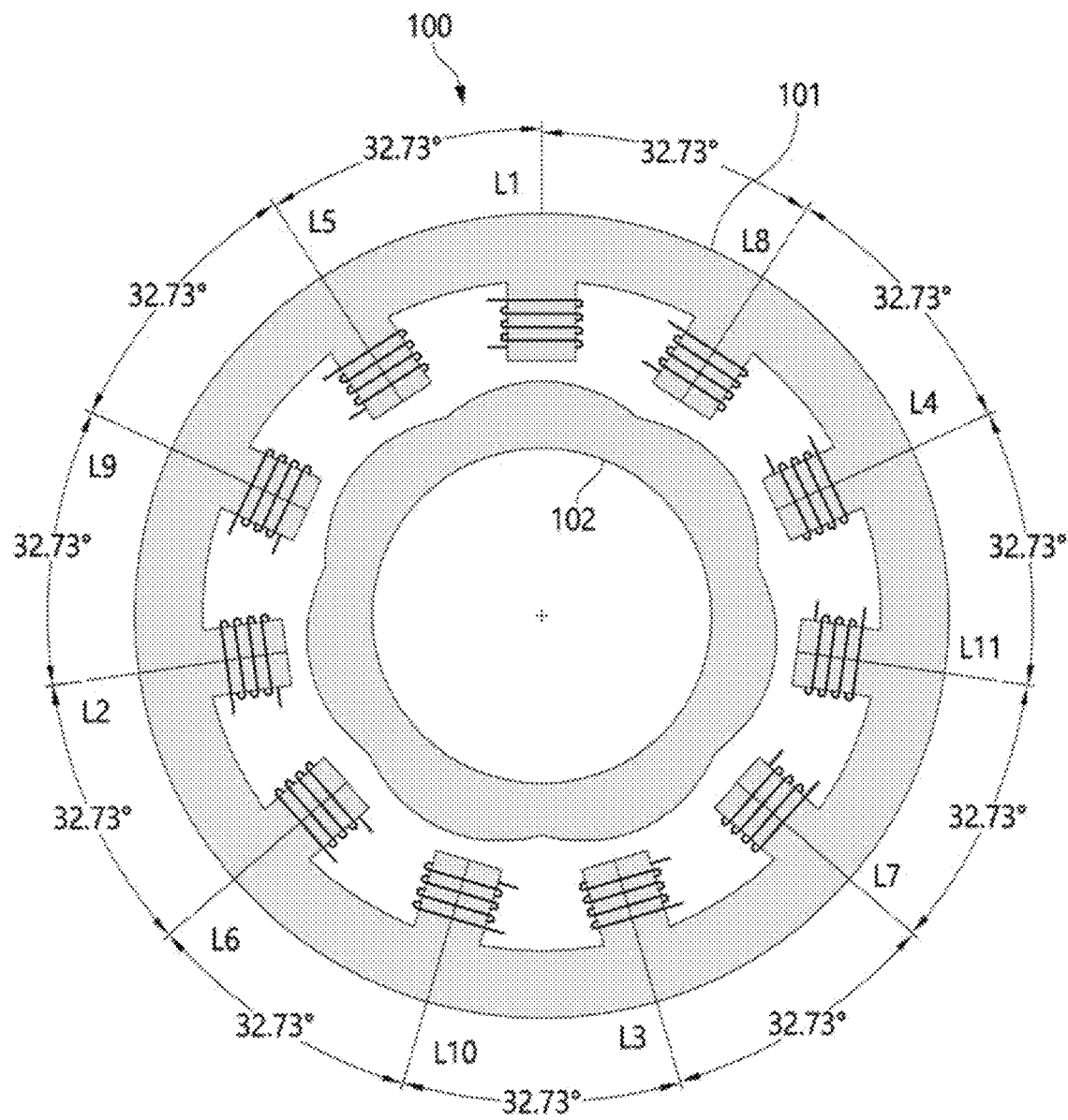
Figure 11H:
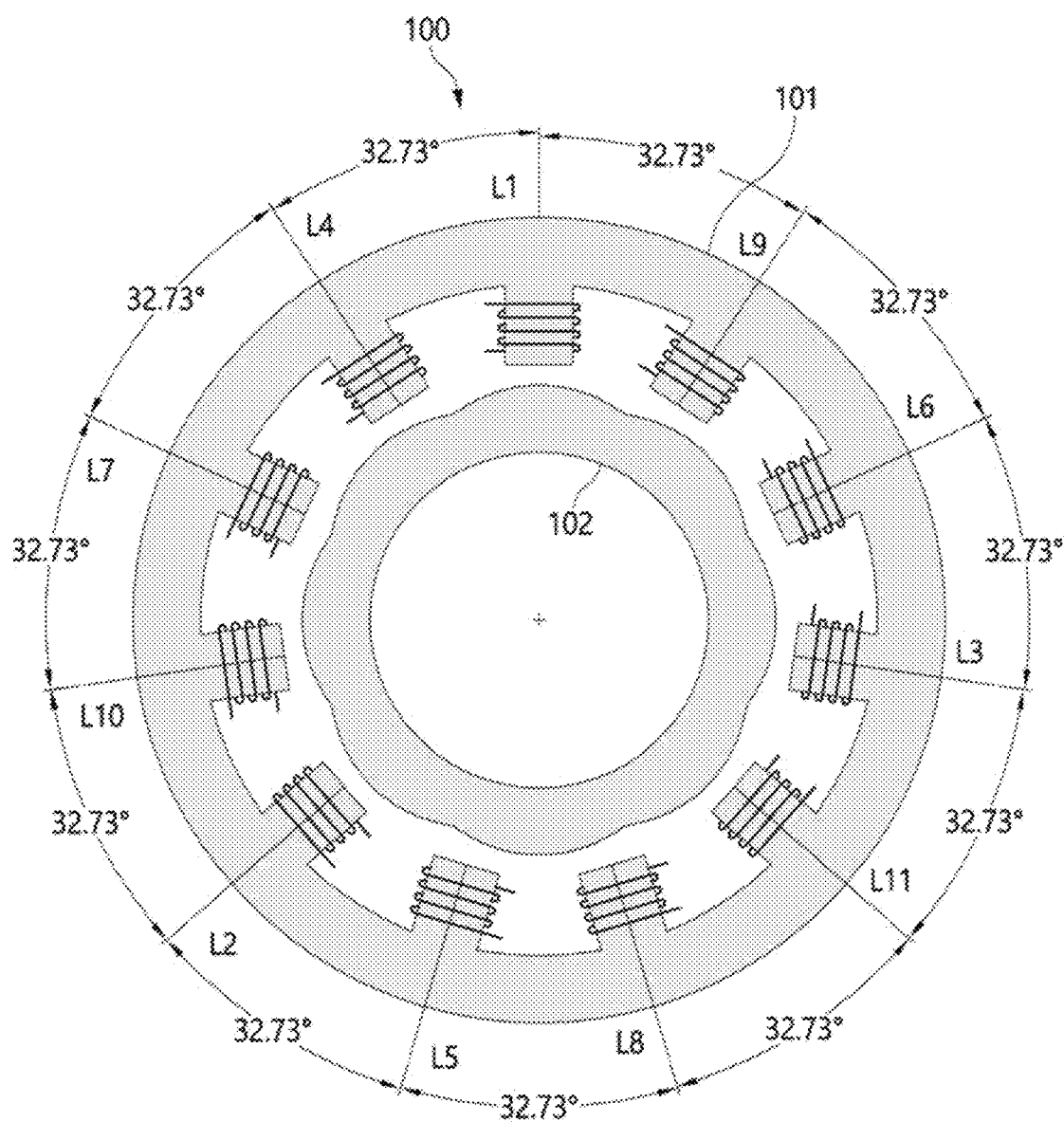
Figure 11I:
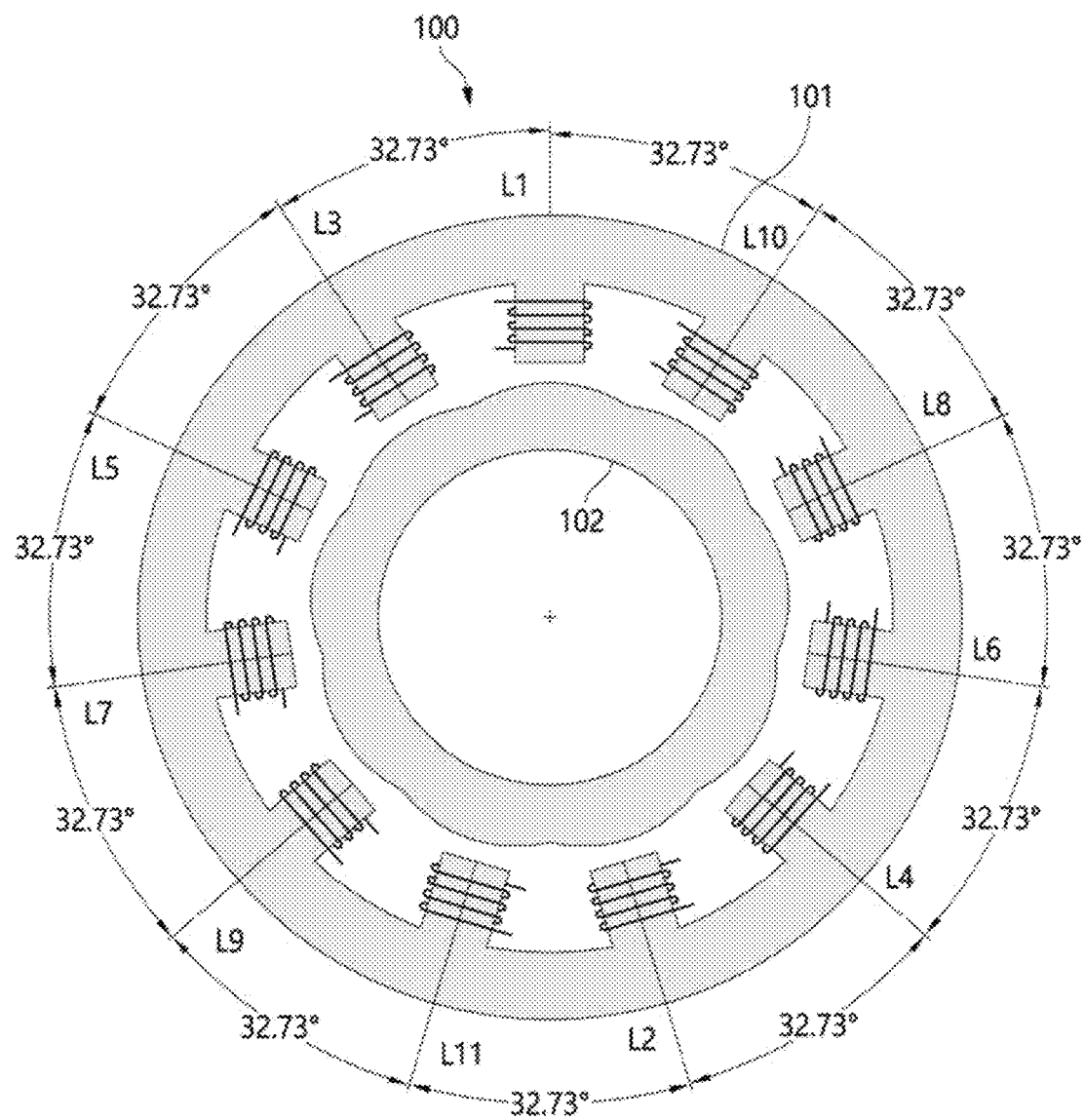
Figure 11J:
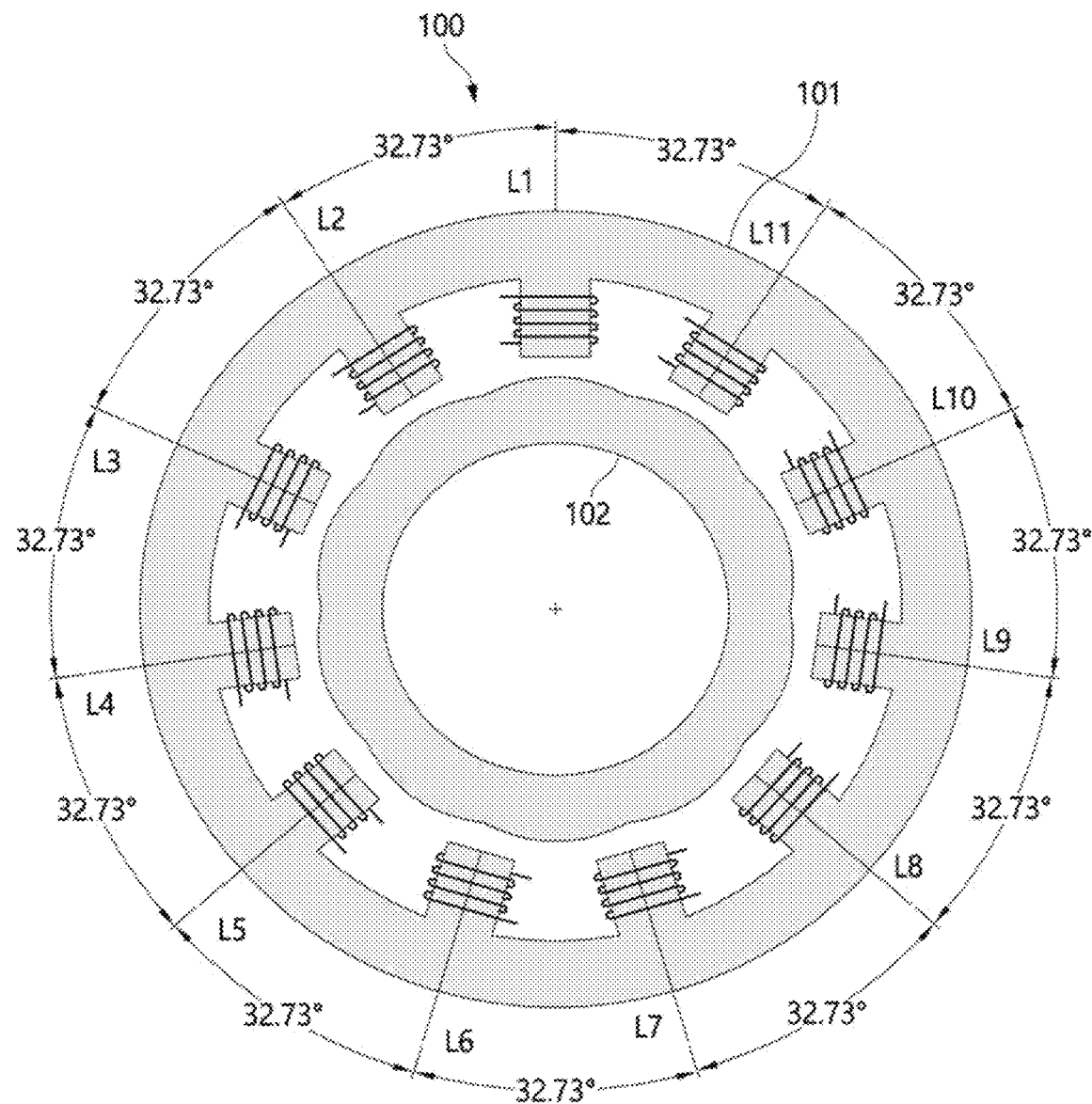
Figure 11K:
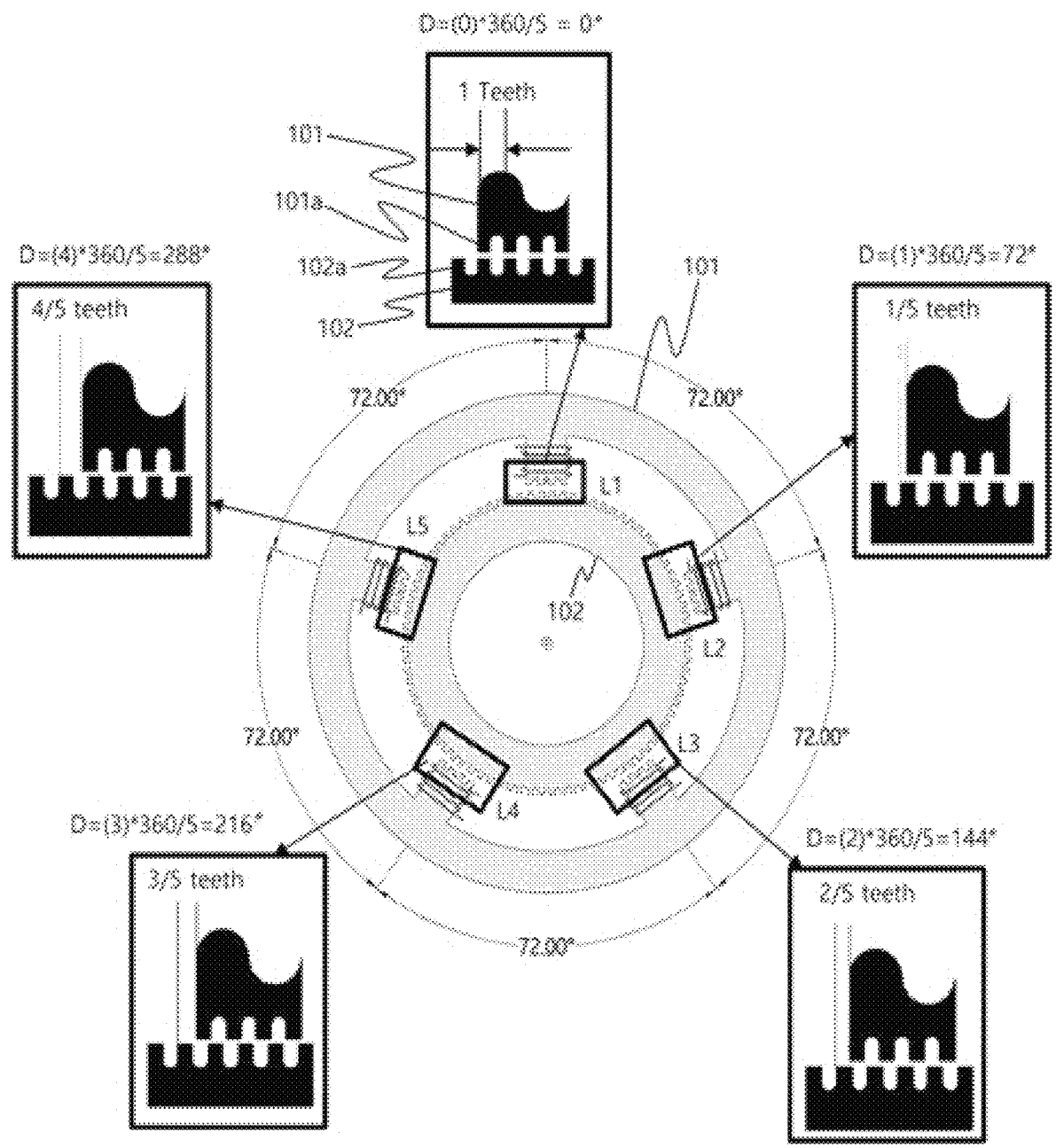
FIG. 11K illustrates an exemplary topology of kX speed 5-phase VR resolver, where the stator has 5 stator teeth, each successively ⅕th teeth shifted, and k rotor teeth (102a) lobe is installed according to the present invention.

In detail, in FIG. 11K, 5 sensing coils (L1, L2, L3, L4, L5) are placed at evenly spaced positions around the stator (101), and k rotor teeth (102a) lobe are formed around the rotor (102). Each sensing coil has several stator teeth (101a), then each rotor tooth period can be regarded as one electrical period of 360°. The stator teeth (101a) on each of the 5 stator coil-poles are configured to successively $\frac{1}{5}^{th}$ period delayed, i.e., 0/5$^{th}$ teeth delay at L1, and $\frac{1}{5}^{th}, \frac{2}{5}^{th}, \frac{3}{5}^{th}, \frac{4}{5}^{th}$ teeth delay at L2, L3, L4, L5, respectively. Therefore, 5 sequentially phase-delayed displacement signals are sensed at 5 stator coil-poles with kX speed over one mechanical turn as the rotor rotates. In practical applications, k would be greater than or equal to 15 and the number of teeth on each stator would be around 2-10.

So far, the explanations, exemplary illustrations and drawings regarded the rotary resolvers with in-rotor configuration, but the present invention can also be equally applied to the out-rotor configuration as well as to the linear resolvers.

The Demodulation and Carrier Recovery of Amplitude Modulated Displacement Signals As digital circuit technology advances, digital processor or application specific integrated circuit (ASIC) can be advantageously used to process the signal of multi-phase VR resolver after A/D conversion. The resolver output signal, amplitude modulated by the excitation signal carrier, is firstly A/D converted. In removing the carrier signal component, the Hilbert Transform can be conveniently applied to the resolver signal.

The V sin and V cos signal, the output of the differential ZF synthesis module (200), can be processed by a commercially available R/D converter (300) to calculate the position information. Phase sensitive demodulation may also be applied when the excitation signal frequency is very high or when high speed signal processing is required to minimize the delay.

Figure 12A:
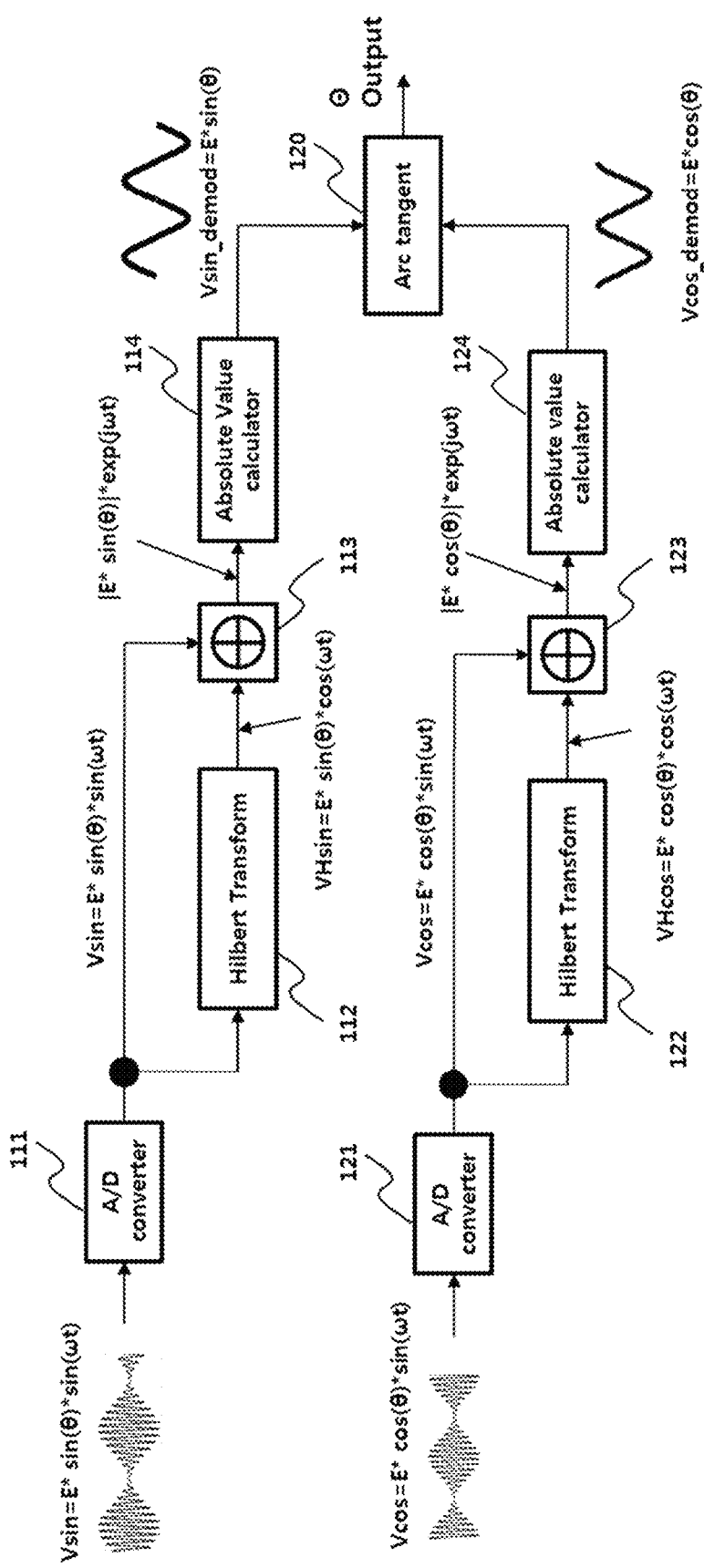
FIG. 12A draws an exemplary block diagram of digital demodulation of the amplitude modulated signal by Hilbert Transform according to the present invention.

In FIG. 12A, an exemplary demodulation by Hilbert Transform is shown. Hilbert Transformer (112, 122) shifts only the phase of carrier $\sin(\omega t)$ by 90° in V $\sin=E*\sin(\theta)*\sin(\omega t)$ and V $\cos=E*\cos(\theta)*\sin(\omega t)$ as the displacement frequency of the envelope of V sin and V cos is much lower than that of the carrier signal. The output signal of Hilbert Transformer is added to the original signal, of which carrier phase is not shifted, at the Adder (113, 123). The absolute value is taken from the complex signal of the Adder output at the Absolute Calculator (114, 124). The position ($\theta$) of the resolver is calculated by taking the arctangent of V sin_demod/V cos_demod at the Arc Tangent Calculator (120).

Figure 12B:
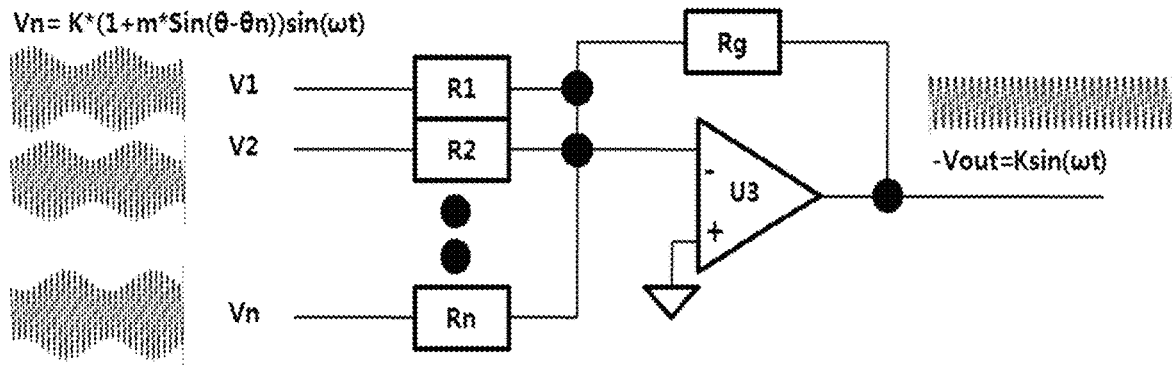
FIG. 12B draws an exemplary block diagram of recovering the carrier signal from N-phase amplitude modulated displacement signals sensed on N-phase resolver according to the present invention.

FIG. 12B shows an exemplary diagram of the circuit that extracts the carrier signal from N-phase amplitude modulated displacement signals. All $V_1, V_2, \ldots, V_N$ signals are amplified by the same gain, and added to the negative port of Op-amp adder (U3). When all coefficient resistor values are set to equal, $R1=R2=\ldots=Rn$, and let the feedback gain resister be Rg, then the pure un-modulated carrier signal component is recovered as the sum of all N-phase displacement signals is zero under the ideal condition.

The amplitude of the recovered un-modulated carrier represents the flux balance status of the magnetic circuit formed in the stator-airgap-rotor, and should be constant under the ideal condition. However, in practical realizations, the amplitude will deviate from the constant value depending on airgap eccentricity between the rotor lobe and the stator, or mechanical error, or misalignment, etc.

By utilizing this constant amplitude property, the recovered carrier signal can be utilized in evaluating the manufacturing accuracy or in adjusting or fine tuning the multi-phase VR resolver. When the phase sensitive demodulation is executed, the recovered carrier signal can serve as a reference signal as well.

The Multi-Phase Synchro

Figure 12C:
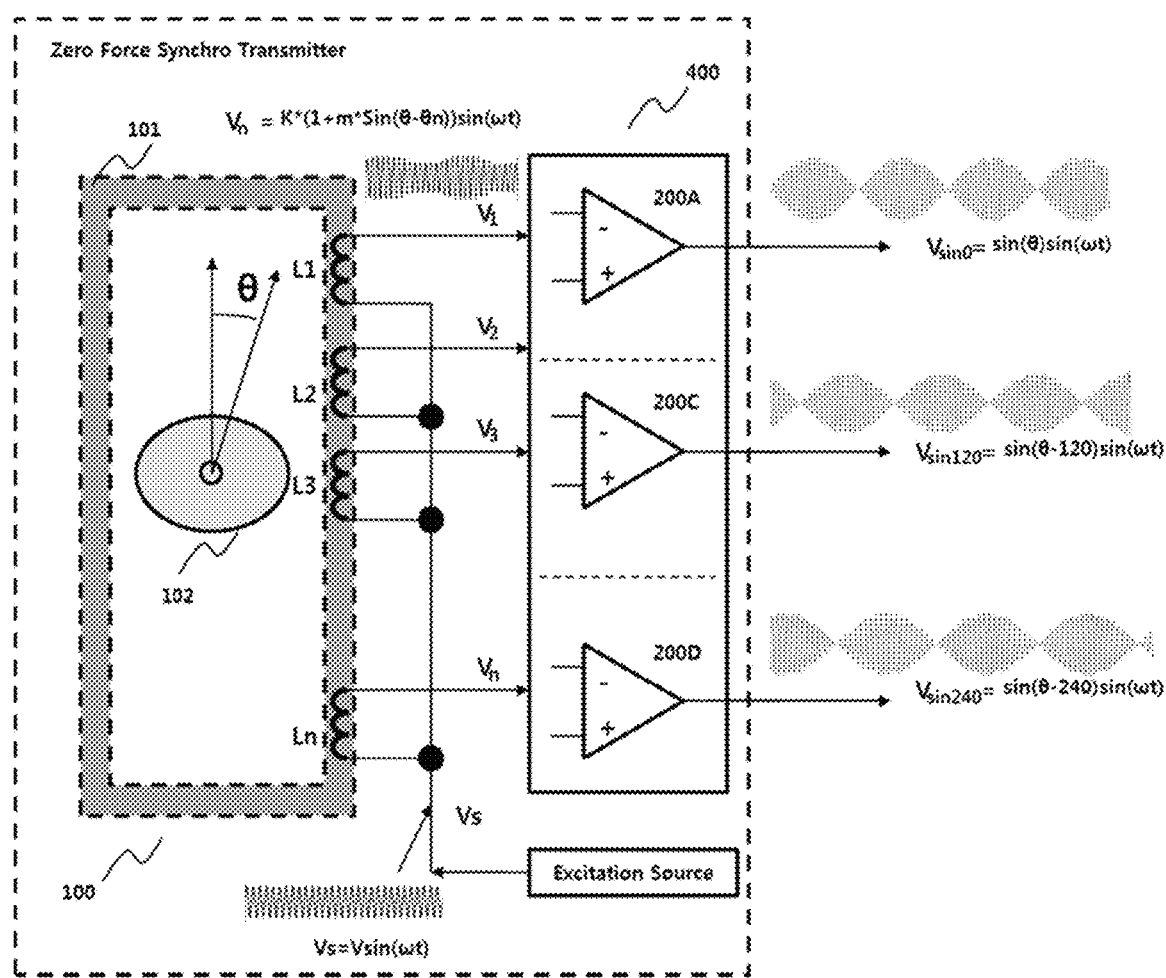
FIG. 12C draws an exemplary block diagram of synchro transmitter, generating three-phase displacement signals from N-phase resolver according to the present invention.

In general, synchros output three-phase displacement signals that are offset by 120° phase, whereas resolvers output two-phase orthogonal signals with 90° offset. Synchro transmitter is widely used in remote control, manipulation, or monitoring system applications in combination with synchro receiver. In FIG. 12C, a multi-phase VR synchro is exemplarily drawn, where carrier modulated three-phase displacement signals of $\sin(\theta)\sin(\omega t)$, $\sin(\theta-120°)\sin(\omega t)$, and $\sin(\theta-240°)\sin(\omega t)$, can be generated from the N-phase displacement signals.

The multi-phase synchro comprises of the resolver body (100) and three differential synthesis modules of 200A, 200C, and 200D, for $\sin(\theta)\sin(\omega t)$, $\sin(\theta-120°)\sin(\omega t)$, and $\sin(\theta-240°)\sin(\omega t)$ generation, respectively. The $\sin(\theta)\sin(\omega t)$ synthesis module (200A) is the same as that of in FIG. 5. The $\sin(\theta-120°)\sin(\omega t)$ synthesis module (200C) and $\sin(\theta-240°)\sin(\omega t)$ synthesis module (200D) is implemented by an identical OP-Amp circuitry of 200A except the synthesis coefficients, namely the sensing resistor values, which can be calculated by the ZF transformation. The amplitude of the multi-phase synchro output signal is also adjusted by a gain of 200A, 200C, and 200D modules. The output signals, $V_{sin0}$, $V_{sin120}$, and $V_{sin240}$, are the three-phase displacement signals typically found in synchro transmitters.

The Multi-Phase Wound-Rotor (WR) Resolver

Figure 12D:
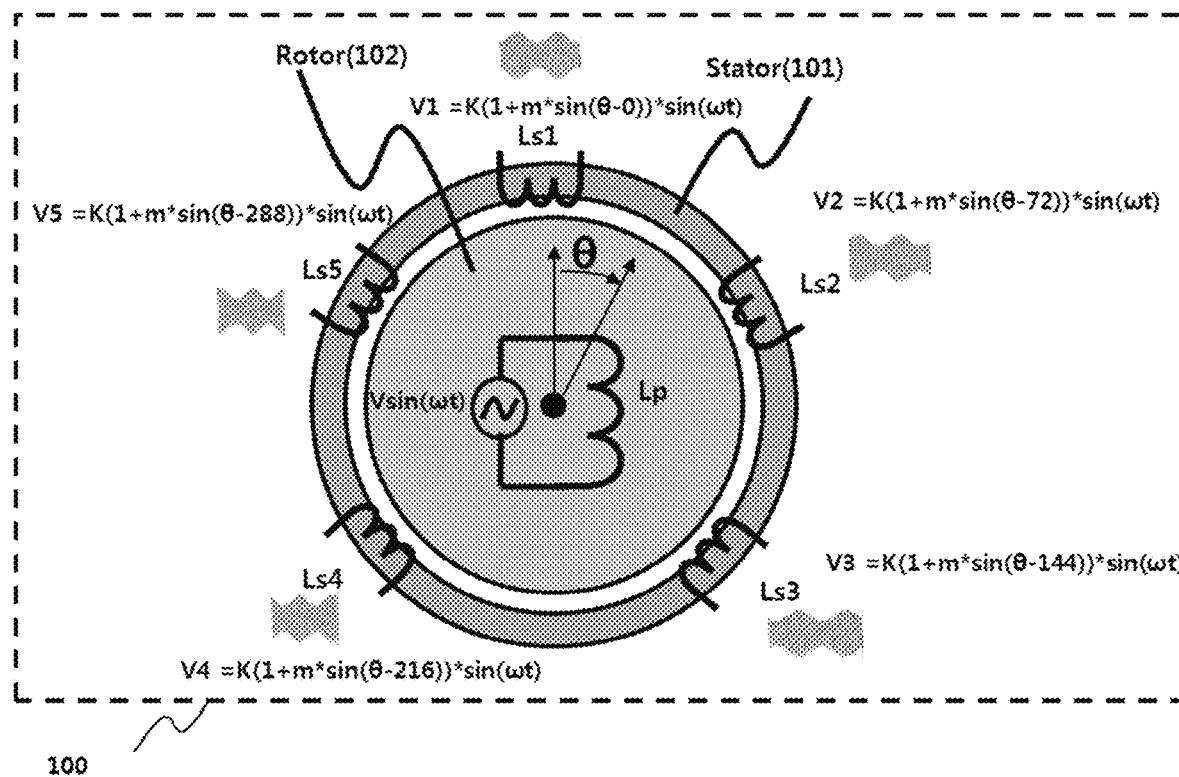
FIG. 12D draws an exemplary topology of 5-phase wound-rotor resolver according to the present invention.

The novel topology of multi-phase VR resolver can be equally applied to the wound-rotor (WR) type resolvers as they share the basic operational principle. In the WR resolver, the rotor is wound by an excitation coil that has a sinusoidally distributed winding instead of the rotor lobe in VR resolver. In FIG. 12D, an exemplary topology of 5-phase WR resolver is drawn, where the primary (excitation) coil (Lp) is wound on the rotor (102) and 5 secondary (sensing) coils (Ls1, Ls2, . . . , Ls5) are wound on the stator (101) at evenly spaced positions. In general, a brush or ring transformer is used in applying the driving carrier signal to Lp. As for the case of the conventional WR resolvers, the excitation coil (Lp) has a sinusoidally distributed winding on the rotor such that single or multiple electrical periods of sinusoidal signals are generated on the stator per one turn of the rotor from the varying mutual inductances between the excitation coil and sensing coils.

As the rotor rotates by $\theta°$, amplitude modulated 5 sequentially phase-delayed displacement signals, V1, V2, . . . , V5, are induced on the 5 sensing coils, where un-modulated carrier signal may be included depending on the specific rotor windings. In conventional WR resolvers, in order to achieve precise and 100% amplitude modulation, techniques like skewing the core construction, damper winding, or increased number of coil-poles distribution are employed in removing the harmonic frequencies, which is a major cause of distortion in sensing displacement signals. In multi-phase WR resolvers, the complicated techniques can be avoided as the final two-phase phase displacement signals are optimally synthesized on synthesis coefficients from the multi-phase sensed signals. Accordingly, as the complicated coil windings and techniques to remove the harmonics are circumvented, the size of multi-phase WR resolver is reduced and its manufacturing process becomes more simplified.

When each of the N sensing coils are subdivided into a plural number of coils, a balance-wired WR resolver is also feasible by connecting serially the subdivided coils that are located at 180° difference in mechanical or electrical angle on the stator with alternating polarity to balance the magnetic flux, where the subdivided coils can be distributed along single stator or dual stators to increase the directional anti-noise performance anti-noise performance.

The Multi-Phase Capacitive Resolver

The conventional resolvers or multi-phase VR resolvers so far disclosed sense the inductive variations of coils upon the displacement of the rotor. Capacitive resolvers (or encoders) sense the capacitive variations between the stator electrodes and the rotor electrodes. In general, the conventional capacitive encoders output amplitude modulated two-phase orthogonal displacement signals directly from the electrodes of capacitive sinusoidal patterns on the stator or the rotor.

Figure 12E:
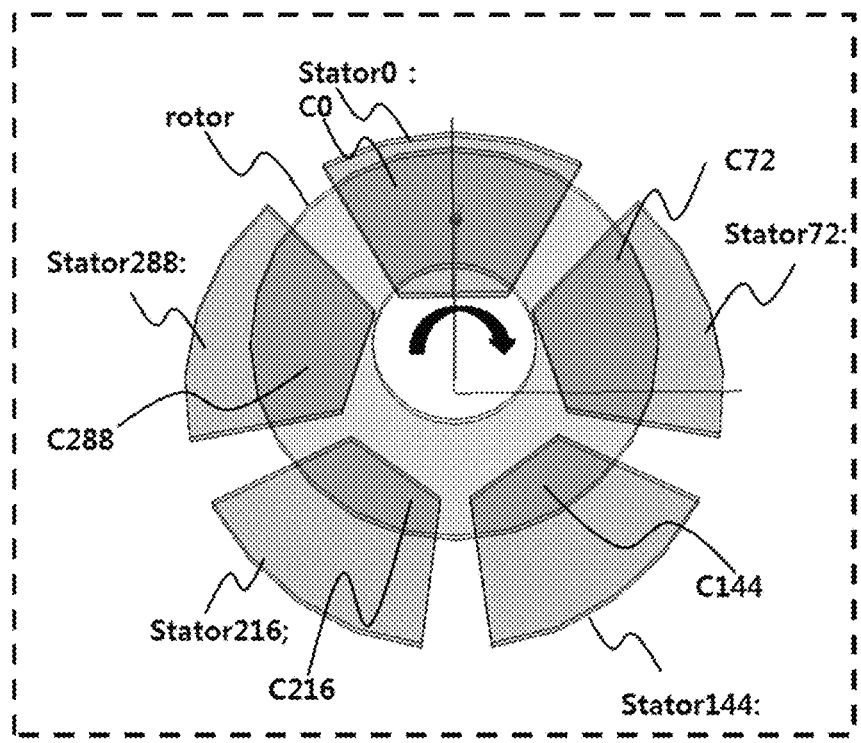
FIG. 12E draws an exemplary topology of 5-phase capacitive resolver according to the present invention.

FIG. 12E illustrates an exemplary topology of multi-phase capacitive resolver body for 5-phase case, where 5 stator electrodes (stator0, stator72, stator144, stator216, and stator288), are spaced at 72° intervals. The rotor electrode is installed in parallel to the stator electrodes with a thin airgap around the rotational shaft. The stator electrodes behave as capacitive elements, and the capacitance of capacitive element C0, C72, C144, C216, and C288, is set to be sinusoidally proportional to a shared area between the rotor and stator0, stator72, stator144, stator216, and stator288, respectively. Thus, the stator electrodes and rotor lobe electrode are designed such that the capacitance of capacitive elements varies sinusoidally on the rotor displacement.

Figure 12F:
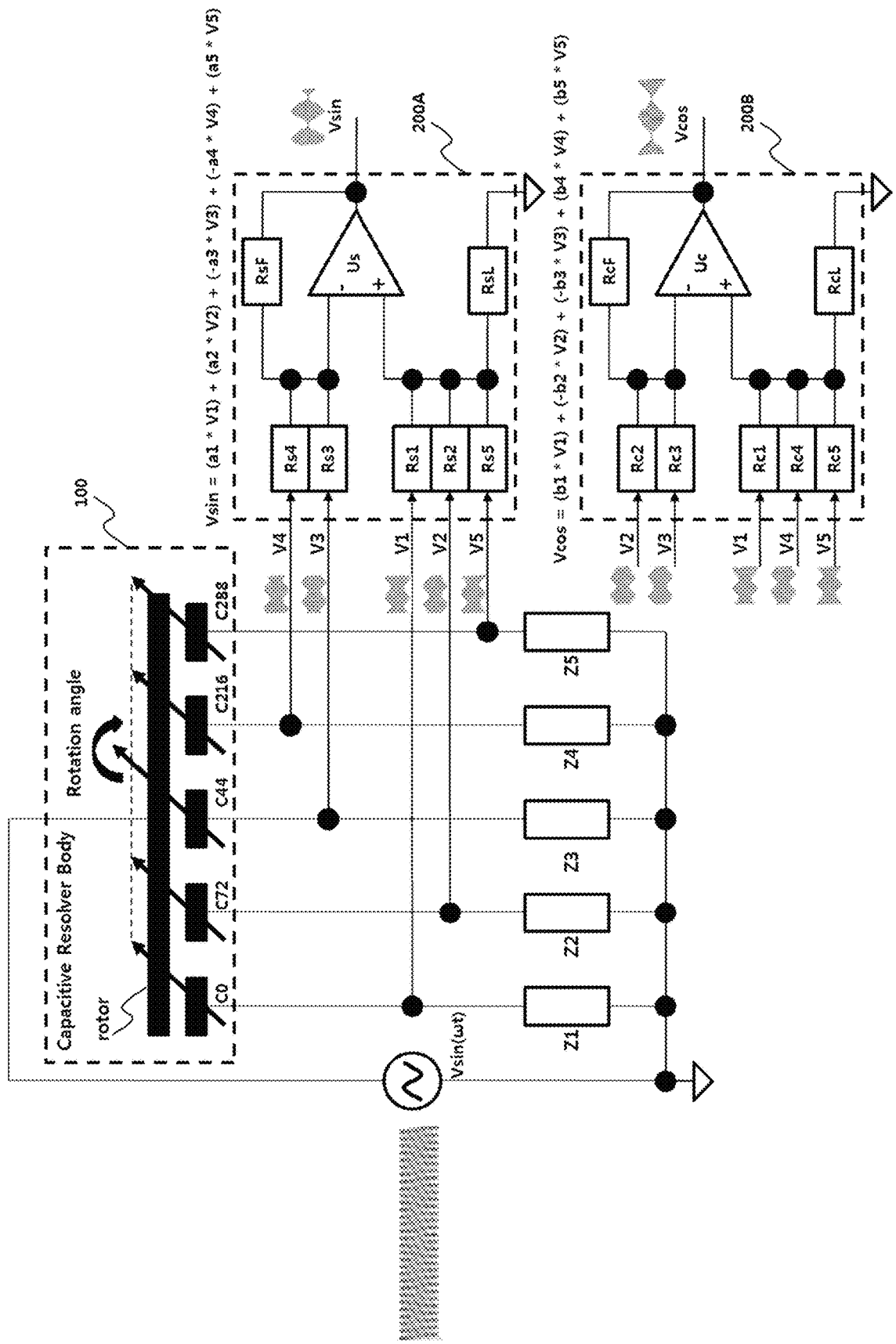
FIG. 12F draws a functional and differential synthesis circuitry diagram of the 5-phase capacitive resolver according to the present invention.

FIG. 12F shows a functional and differential synthesis circuitry diagram of the 5-phase capacitive resolver. When the carrier signal of a few hundred to a few mega-hertz is applied to the rotor and the stator, as the rotor rotates, sequentially 5 phase-delayed and under-modulated displacement signals, V1, V2, V3, V4, and V5 are sensed on detection device, Z1, Z2, Z3, Z4, and Z5, respectively, upon the capacitive variations on the resolver body (100), in response to the displacement between the rotor electrode and stator electrodes.

The differential synthesis module (200A and 200B) in FIG. 12F has the same circuitry in FIG. 7 (or FIG. 8), and in which the un-modulated carrier signal, shown in FIG. 6, is removed with common mode rejection as described in earlier sections.

The Exemplary Fabrication of 9-Phase VR Resolvers

The novel multi-phase resolver topology, and the method and apparatus of its signal processing presented in the invention, is evaluated and verified by the fabricated two types of multi-phase VR resolvers and two types of rotor lobes: the single-wound 9-phase VR resolver and the balance-wired 9-phase VR resolver; the 1× quasi-square waveform saliency rotor lobe and the 4× sinusoidal-waveform saliency rotor lobe.

The stator is made of lamination-coated and stacked electrical steel, of which the radius is 150 mm and the height is 50 mm. As illustrated in FIG. 3A, the 9 coil-poles single-wound VR resolver is fabricated, in which each of the 9 excitation-sensing coil windings has around 10 mH inductance and is wound with the same polarity, located evenly at 40° phase-angle positions over one period of the stator.

FIG. 9A illustrates the balance-wired 9-phase VR resolver. Here, twice (9×2=18) of excitation-sensing coil-poles are evenly placed with 20° spacing over one period of the stator.

The quasi-square waveform rotor lobe with 1× speed, as illustrated in FIG. 10A, is fabricated. The sinusoidal-waveform rotor lobe with 4× speed, as illustrated in FIG. 11D, is fabricated.

The differential synthesis module is implemented on the PCB by differential OP-amp circuitry, where 10 kHz carrier frequency of excitation signal is applied, and R/D converter of commercially available AD1210 (Analog Device) R/D converter is used.

Figure 13A:
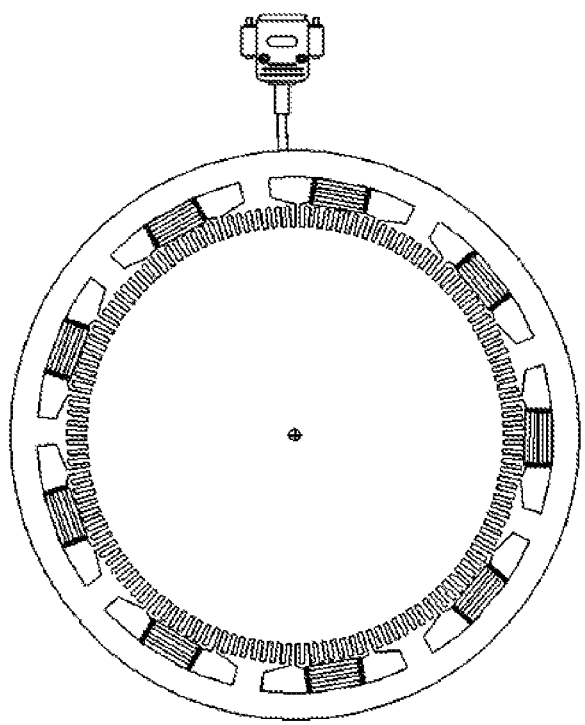
FIG. 13A is a picture of fabricated stator coil-windings of single-wound 9-phase VR resolver according to the present invention.
Figure 13B:
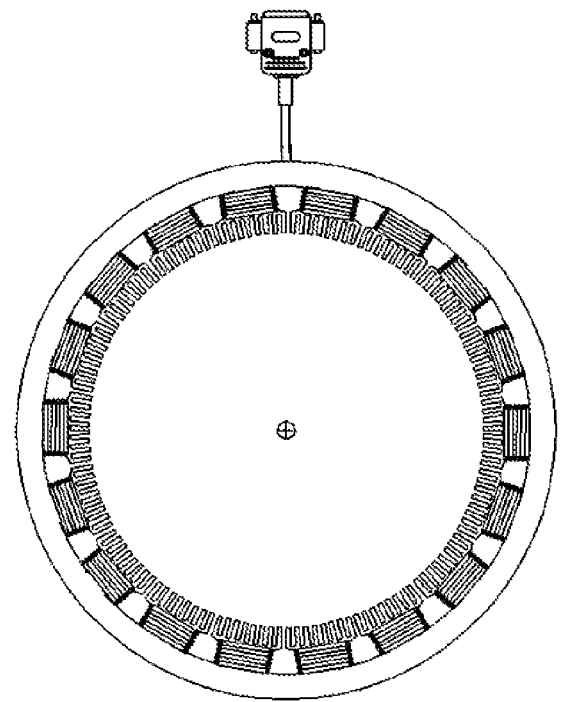
FIG. 13B is a picture of fabricated stator coil-windings of balance-wired 9-phase VR resolver according to the present invention.

In FIG. 13A and FIG. 13B, photos of the fabricated stators of single-wound 9-phase VR resolver and balance-wired 9-phase VR resolver are shown, respectively.

Figure 14A:
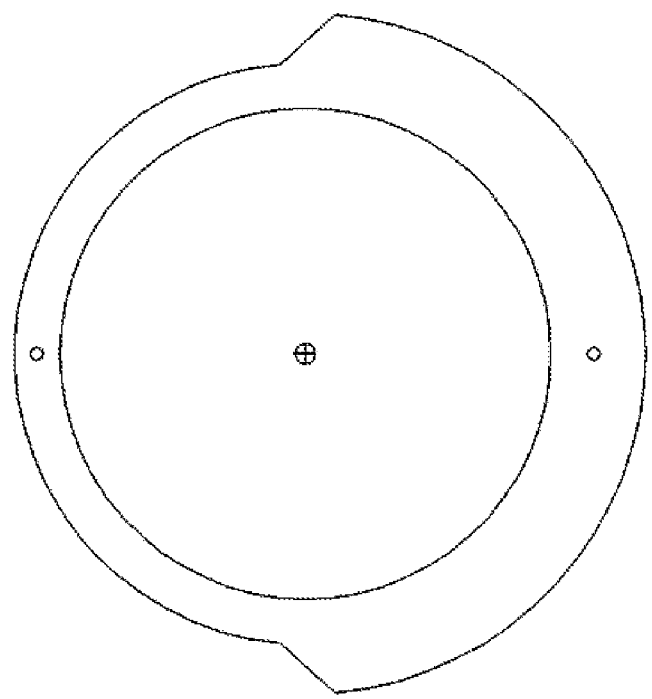
FIG. 14A is a picture of fabricated rotor lobe of 1× quasi-square waveform according to the present invention.
Figure 14B:
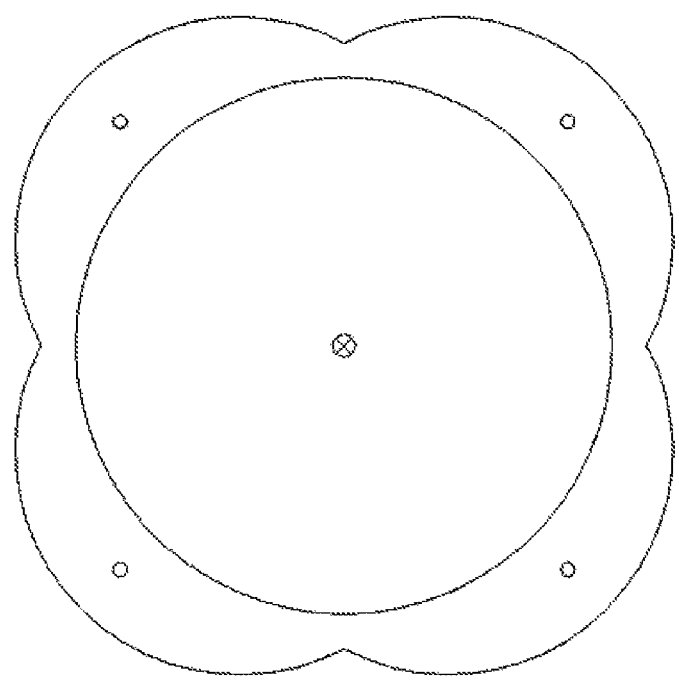
FIG. 14B is a picture of fabricated rotor lobe of 4× sinusoidal-waveform according to the present invention.

In FIG. 14A and FIG. 14B, photos of the fabricated quasi-square waveform rotor lobe (1×) and sinusoidal-waveform rotor lobe (4×) are shown, respectively.

Figure 15A:
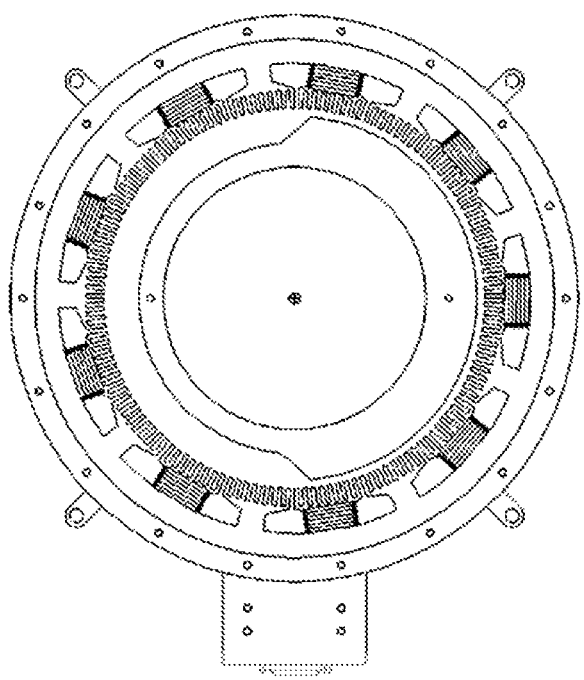
FIG. 15A is a picture of assembled single-wound 9-phase VR resolver according to the present invention.
Figure 15B:
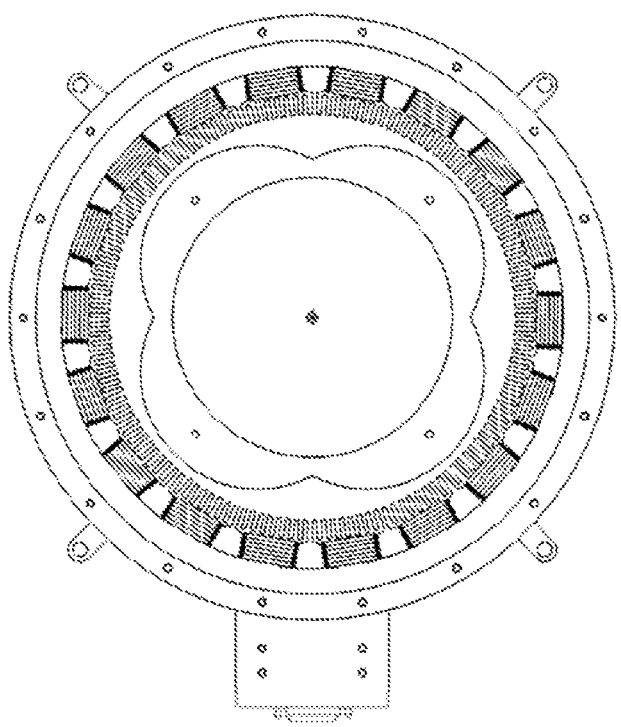
FIG. 15B is a picture of assembled balance-wired 9-phase VR resolver according to the present invention.

In FIG. 15A and FIG. 15B, photos of the assembled single-wound 9-phase VR resolver and balance-wired 9-phase VR resolver are shown, respectively.

It is confirmed that the fabricated 9-phase VR resolver generates 9-phase amplitude modulated sinusoidal or quasi-square waveform displacement signals, depending on the rotor lobe shape installed, without any noticeable distortions. This proves that the newly proposed multi-phase resolver topology achieves a well-balanced magnetic flux state. It is also checked on the scope that the differential synthesis module implemented by the OP-amp circuitry produces clean two-phase orthogonal displacement signals.

Figure 16A:
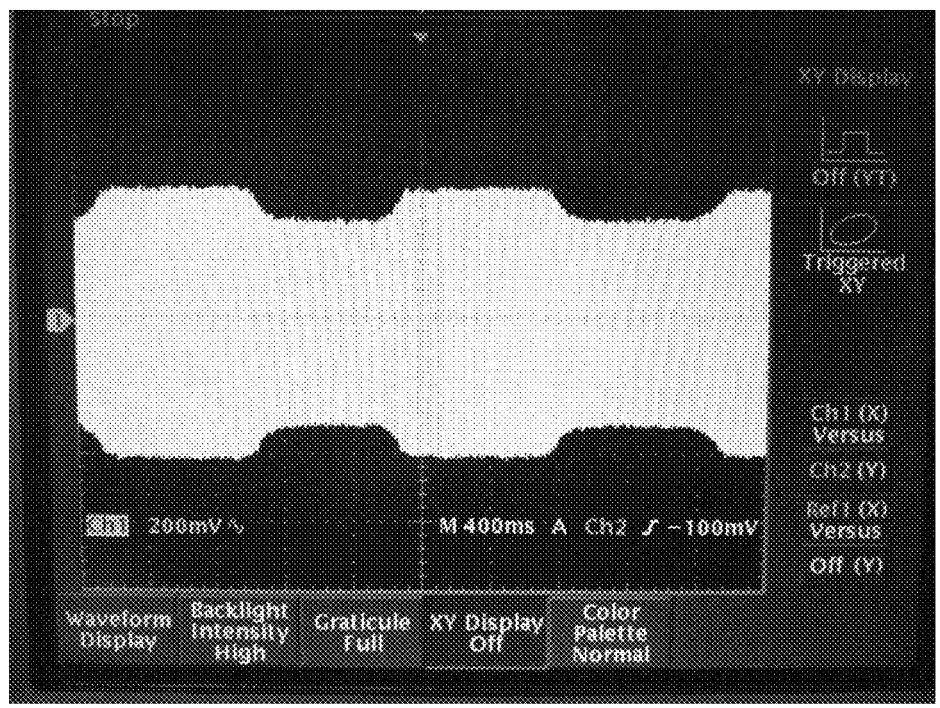
FIG. 16A shows an exemplary captured picture on oscilloscope of a displacement signal sensed on the single-wound 9-phase VR resolver when 1× quasi-square waveform rotor lobe is installed.

To measure the orthogonality of the two-phase orthogonal displacement signals obtained from the fabricated 9-phase VR resolvers, Lissajous graph is drawn on the oscilloscope in X-Y mode. FIG. 16A shows a quasi-square waveform signal captured on the oscilloscope sensed at the excitation-sensing coil of the single-wound 9-phase VR resolver when the quasi-square waveform rotor lobe (1×) is installed. It is seen that the carrier frequency of the signal is 10 kHz and its envelope is a quasi-square (trapezoidal) waveform.

Figure 16B:
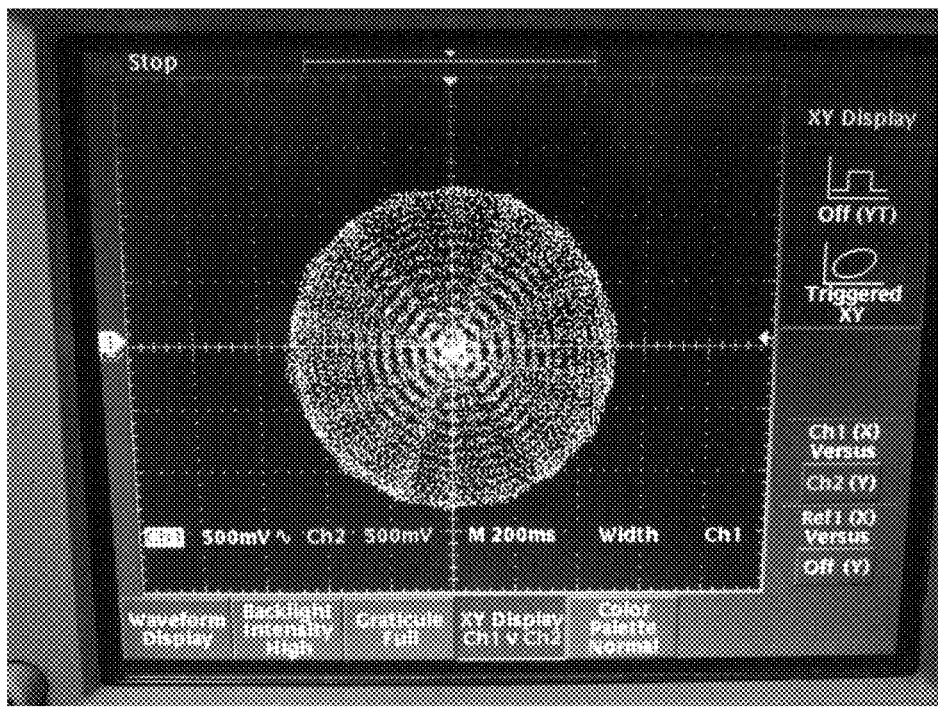
FIG. 16B shows an exemplary captured picture on oscilloscope of a Lissajous graph for two-phase orthogonal displacement signals obtained from single-wound 9-phase VR resolver when 1× quasi-square waveform rotor lobe is installed.

The 9 phase-delayed quasi-square waveform displacement signals are processed by the differential synthesis module. FIG. 16B shows a Lissajous graph captured on the oscilloscope for the two-phase orthogonal displacement signals produced by the differential synthesis module, where it is seen that the orthogonality is held very well and its outline shape is an 18-gon as expected.

Figure 17A:
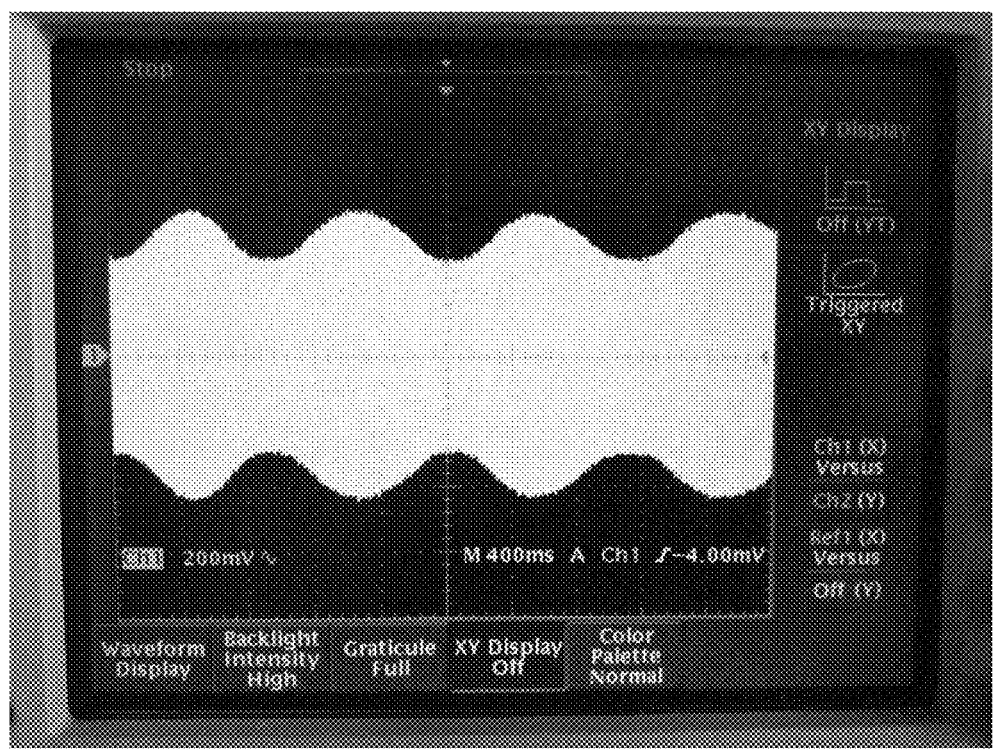
FIG. 17A shows an exemplary captured picture on oscilloscope of a displacement signal sensed on the single-wound 9-phase VR resolver when 4× sinusoidal-waveform rotor lobe is installed.

FIG. 17A shows an amplitude modulated sinusoidal displacement signal captured on the oscilloscope sensed at the excitation-sensing coil of the single-wound 9-phase VR resolver when the sinusoidal-waveform rotor lobe (4×) is installed. It is seen that the carrier frequency of the signal is 10 kHz and its envelope is a sinusoidal waveform having 4 electrical periods (4×) per one mechanical turn.

Figure 17B:
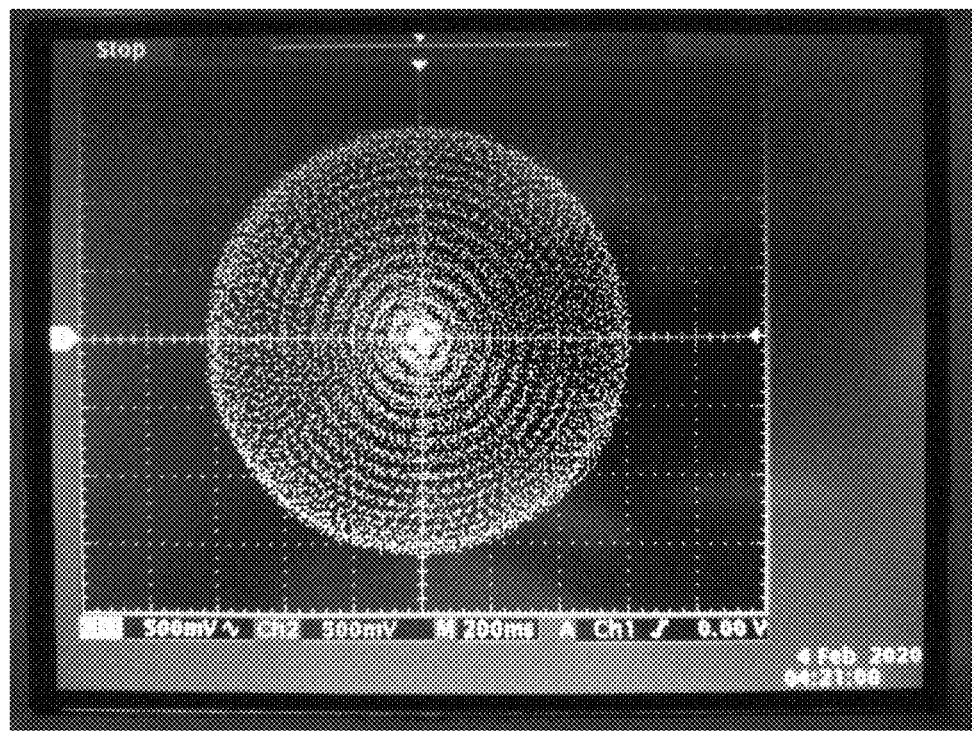
FIG. 17B shows an exemplary captured picture on oscilloscope of a Lissajous graph for two-phase orthogonal displacement signals obtained from single-wound 9-phase VR resolver when 4× sinusoidal-waveform rotor lobe is installed.

The sensed 9 phase-delayed sinusoidal displacement signals are processed by the differential synthesis module. FIG. 17B shows a Lissajous graph captured on the oscilloscope for the two-phase orthogonal displacement signals produced by the differential synthesis module, where it is also seen that the orthogonality is held very well and its outline shape is a near pure circle.

Figure 18A:
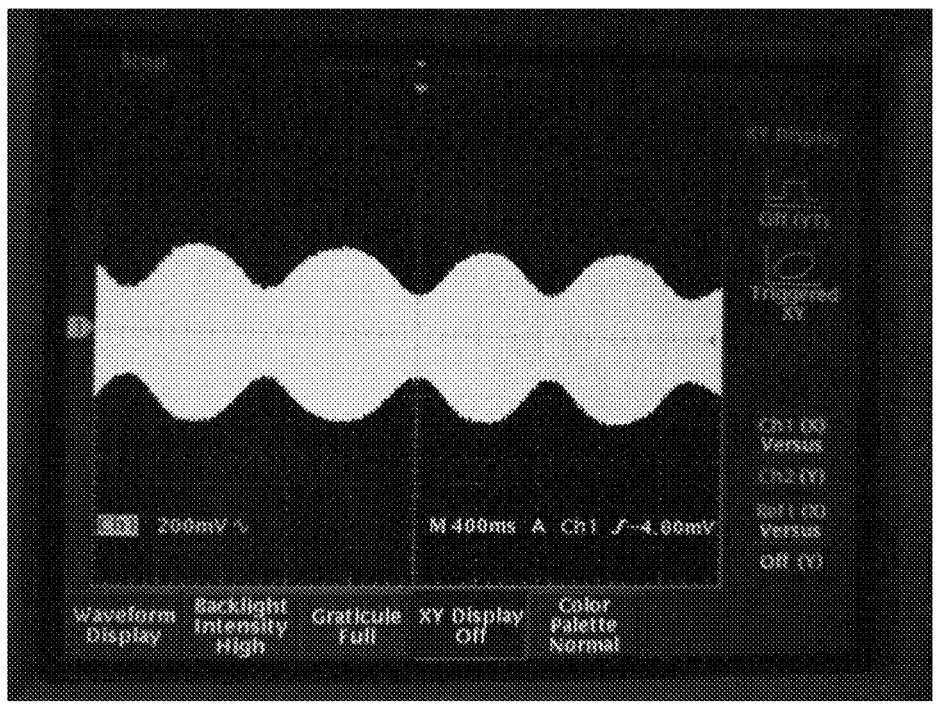
FIG. 18A shows an exemplary captured picture on oscilloscope of a displacement signal sensed on the balance-wired 9-phase VR resolver when 4× sinusoidal-waveform rotor lobe is installed.

FIG. 18A shows an amplitude modulated sinusoidal displacement signal captured on the oscilloscope, sensed at the excitation-sensing coil of the balance-wired 9-phase VR resolver when the sinusoidal-waveform rotor lobe (4×) is installed. Compared to the single-wound resolver signal in FIG. 17A, due to it being balance-wired, the amplitude of the un-modulated carrier signal decreases as the flux distribution in the stator has been changed but the sinusoidal envelope of the signal is more precise than that in FIG. 17A.

Figure 18B:
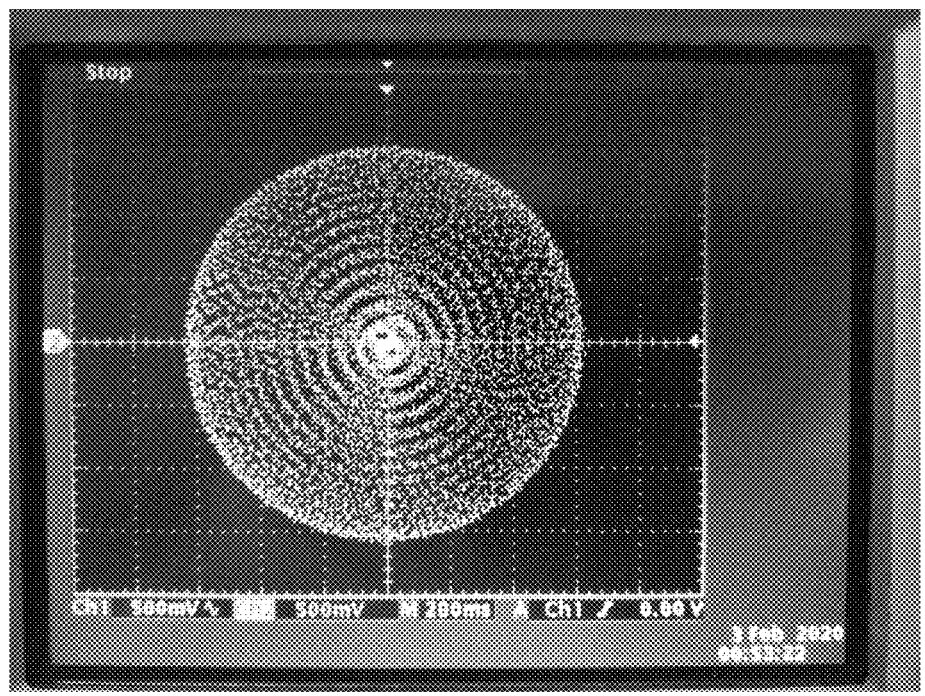
FIG. 18B shows an exemplary captured picture on oscilloscope of a Lissajous graph for two-phase orthogonal displacement signals obtained from balance-wired 9-phase VR resolver when 4× sinusoidal-waveform rotor lobe is installed.

The 9 phase-delayed sinusoidal displacement signals are processed by the differential synthesis module. FIG. 18B shows a Lissajous graph captured on the oscilloscope for the two-phase orthogonal displacement signals produced by the differential synthesis module, where it is also seen that its outline shape is closer to a pure-circle than that of the single-wound case in FIG. 17B.

The precise displacement position ($\theta$) of the rotor is calculated by taking the arctangent of two-phase orthogonal displacement signals in a commercially available resolver to digital (R/D) converter or an interpolator after demodulation.

The test and evaluation results of the fabricated 9-phase VR resolvers verify the validity of newly proposed multi-phase resolver topology in producing N-phase sinusoidal or quasi-square waveform displacement signals, depending on the rotor lobe shape installed. Also, it is confirmed that the differential synthesis module realized by the differential OP-amp circuitry produces clean two-phase orthogonal displacement signals, from which the accurate and precise position information is determined as their Lissajous graph shape is close to a pure-circle or 2N-gon.

In the disclosed multi-phase VR resolver, the state of balanced magnetic flux distribution is achieved by the topology of the resolver body itself, circumventing the extremely complicated coil-winding tasks and significantly reducing the rotor lobe's sophisticated design and precise manufacturing requirements. The prevailing difficulty to achieve precise and 100% amplitude modulated signals in the conventional VR resolvers are also effectively reduced as the under-modulated signals are allowed in multi-phase VR resolver. The signal processing of the differential synthesis module optimally converts the multi-phase displacement signals into the two-phase orthogonal signals as well, while removing the common mode noise and component of un-modulated carrier signal if any un-modulated signal is included.

The newly proposed multi-phase resolver provides a more economic and practical way to build and manufacture a variety of resolvers that are used in industries while achieving increased flexibility in multi-speed operation, improved accuracy in position detection, and enhanced reliability in coil insulation.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A differential synthesis apparatus adapted to sense a plurality of amplitude modulated phase-delayed displacement signals and outputs amplitude modulated two-phase orthogonal displacement signals,
   wherein the differential synthesis apparatus utilizes sine synthesis coefficients and cosine synthesis coefficients being selectable from a Zero-Force transformation, and
   wherein the differential synthesis apparatus removes at least one of a common mode noise induced by an external disturbance flux and an unmodulated carrier signal component.

2. The differential synthesis apparatus of claim 1, wherein the differential synthesis apparatus is realized by an electrical circuitry and comprises:
   a differential sine synthesis module implemented in an OP-amp circuitry, wherein the OP-amp circuitry comprises:
      an N number of sensing resistors, each connected to a primary differential OP-amp, wherein the N number of sensing resistors are sorted into a group of negative-sign sensing resistors for the negative sine synthesis coefficients and a group of positive-sign sensing resistors for the positive sine synthesis coefficients; and
      the primary differential OP-amp, wherein the negative-sign sensing resistors are connected to a negative (−) input port of the primary OP-amp, and the positive-sign sensing resistors are connected to a positive (+) input port of the primary OP-amp,
      wherein the negative input port and an output of the primary OP-amp is connected by a primary feedback gain register, while the positive input port and the reference level (ground) is connected by a primary match register such that each resistor value is determined by a ratio between the value of the primary feedback gain resistor and the value of corresponding sine synthesis coefficient under a specific condition that the value of the primary feedback gain register is equal to that of the primary match register,
      wherein an un-modulated carrier signal component and common mode noise in a signal, if any included, is removed through the primary differential OP-amp as a common mode noise rejection; and
   a differential cosine synthesis module implemented in an OP-amp circuitry, wherein the OP-amp circuitry comprises:
      an N number of sensing resistors, each connected to a secondary differential OP-amp, wherein the N number of sensing resistors are sorted into a group of negative-sign sensing resistors for the negative cosine synthesis coefficients and a group of positive-sign sensing resistors for the positive cosine synthesis coefficients; and
      the secondary differential OP-amp, wherein the negative-sign sensing resistors are connected to the negative (−) input port of the secondary OP-amp, and the positive-sign sensing resistors are connected to the positive (+) input port of the secondary OP-amp,
      wherein the negative input port and the output of the secondary OP-amp is connected by a secondary feedback gain register, while the positive input port and the reference level (ground) is connected by a secondary match register such that each resistor value is determined by the ratio between the value of the secondary feedback gain resistor and the value of a corresponding cosine synthesis coefficient under a specific condition that the value of the secondary feedback gain register is equal to that of the secondary match register,
      wherein an un-modulated carrier signal component and common mode noise in a signal, if any included, is removed through the secondary differential OP-amp as a common mode noise rejection.

3. The differential synthesis apparatus of claim 1, further comprising:
   a stator including an N number of magnetic sensors, wherein N being an odd integer greater than or equal to 5, wherein the magnetic sensors being equidistant over a mechanical period or an electrical period of the stator from another magnetic sensor; and
   a rotor including a plurality of magnets wherein each turn of the rotor generates at least one electrical period on the stator,
   wherein the stator outputs a plurality of phase-delayed displacement signals as the rotor rotates, wherein each one of the displacement signals is sequentially phase-delayed, wherein a plurality of displacement signals are obtained from the N number of magnetic sensors, and wherein the number of the plurality of displacement signal is the same as the N number of magnetic sensors over one mechanical turn of the rotor.

4. The differential synthesis apparatus of claim 1, further comprising:
   a mover including an N number of magnetic sensors, wherein N being an odd integer greater than or equal to 5, wherein the magnetic sensors being equidistant over a mechanical period or an electrical period of the mover from another magnetic sensor; and
   a stator including a plurality of magnets wherein a displacement of the mover generates at least one electrical period on the stator,
   wherein the mover outputs a plurality of phase-delayed displacement signals as the mover moves, wherein each one of the displacement signals is sequentially phase-delayed, wherein a plurality of displacement signals are obtained from the N number of magnetic sensors, and wherein the number of the plurality of displacement signals is the same as the N number of magnetic sensors over one mechanical turn of the mover.

5. The differential synthesis apparatus according to claim 1, further comprising:
   a phase-sensitive demodulator to demodulate the amplitude modulated two-phase orthogonal displacement signals, and converts them into two-phase orthogonal displacement signals without the carrier; and
   an interpolator to determine an absolute position or incremental position of a rotor.

6. The differential synthesis apparatus according to claim 1, further comprising:
   an A/D converter adapted to convert an orthogonal displacement signal into a digital signal and outputs a digital orthogonal displacement signal;
   a Hilbert Transformer adapted to shift the carrier phase of the digital orthogonal displacement signal by 90°;
   an adder adapted to add the output signal of the Hilbert Transformer and the original signal of which carrier phase is not shifted and outputs an complex signal; and
   an absolute calculator adapted to calculate an absolute value of the complex signal and outputs a carrier-removed orthogonal displacement signal.

7. The differential synthesis apparatus according to claim 1,
   wherein the differential synthesis apparatus outputs amplitude modulated three-phase displacement signals,
   wherein the amplitude modulated three-phase displacement signals have phases of 0°, 120°, and 240°,
   wherein the differential synthesis apparatus utilizes three sets of synthesis coefficients being selectable from a Zero-Force transformation.

* * * * *